(12) United States Patent
Blum et al.

(10) Patent No.: US 11,166,112 B2
(45) Date of Patent: *Nov. 2, 2021

(54) HEARING AID ADAPTED FOR WIRELESS POWER RECEPTION

(71) Applicant: POGOTEC, INC., Roanoke, VA (US)

(72) Inventors: Ronald D. Blum, Roanoke, VA (US); William Kokonaski, Belfair, WA (US); Stefan Bauer, Bern (CH); Jean-Noel Fehr, Neuchatel (CH); Amitava Gupta, Roanoke, VA (US); Richard Clompus, Trinidad, CA (US)

(73) Assignee: Pogotec, Inc., Roanoke, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/453,667

(22) Filed: Jun. 26, 2019

(65) Prior Publication Data

US 2019/0327567 A1 Oct. 24, 2019

Related U.S. Application Data

(63) Continuation of application No. 15/337,796, filed on Oct. 28, 2016, now Pat. No. 10,341,787.

(Continued)

(51) Int. Cl.
*H04R 25/00* (2006.01)
*H02J 7/02* (2016.01)
(Continued)

(52) U.S. Cl.
CPC ............ *H04R 25/554* (2013.01); *H02J 7/025* (2013.01); *H02J 50/12* (2016.02); *H02J 50/27* (2016.02);
(Continued)

(58) Field of Classification Search
CPC .. H04R 25/554; H04R 2225/31; H04R 25/30; H04R 2225/33; H04R 25/602;
(Continued)

(56) References Cited

U.S. PATENT DOCUMENTS 3,476,467 A 11/1969 Curry
3,593,449 A 7/1971 Nielson
(Continued)

FOREIGN PATENT DOCUMENTS

CA 154079 S 12/2014
CN 1117593 A 2/1996
(Continued)

OTHER PUBLICATIONS

First Office Action for TW Application No. 105135181, dated Nov. 8, 2017, pp. all.

(Continued)

*Primary Examiner* — Oyesola C Ojo
(74) *Attorney, Agent, or Firm* — Woods Rogers PLC; Nathan A. Evans

(57) ABSTRACT

A hearing aid system according to some examples includes a hearing aid which includes a microphone, amplifier, speaker, and a telecoil. In some examples, the hearing aid may include a battery or a capacitor for storing power wirelessly received from a distance separated wireless power transfer unit. The telecoil may be configured to receive audio signals and couple the audio signals to audio processing circuitry of the hearing aid. The telecoil may be further configured to receive power signals from the base unit and couple the power signals to power supply circuitry of the hearing aid, for example for charging the battery of the hearing aid. Examples of transmitter and receiver coils, and of distance and orientation optimization are described. Examples of wireless charging systems that may be used (Continued)

with hearing aids or other medical assistance devices are described.

21 Claims, 38 Drawing Sheets

Related U.S. Application Data

(60) Provisional application No. 62/293,975, filed on Feb. 11, 2016, provisional application No. 62/287,361, filed on Jan. 26, 2016, provisional application No. 62/279,521, filed on Jan. 15, 2016, provisional application No. 62/255,624, filed on Nov. 16, 2015, provisional application No. 62/254,836, filed on Nov. 13, 2015, provisional application No. 62/252,645, filed on Nov. 9, 2015, provisional application No. 62/249,051, filed on Oct. 30, 2015, provisional application No. 62/247,883, filed on Oct. 29, 2015.

(51) Int. Cl.
*H02J 50/80* (2016.01)
*H02J 50/12* (2016.01)
*H02J 50/27* (2016.01)
*H02J 7/00* (2006.01)

(52) U.S. Cl.
CPC ............ *H02J 50/80* (2016.02); *H04R 25/602* (2013.01); *H02J 7/0029* (2013.01); *H02J 7/00302* (2020.01); *H04R 25/30* (2013.01); *H04R 2225/31* (2013.01); *H04R 2225/33* (2013.01); *H04R 2225/55* (2013.01)

(58) Field of Classification Search
CPC ...... H04R 2225/55; H02J 50/80; H02J 50/12; H02J 50/27; H02J 7/025; H02J 7/00302; H02J 7/0029
See application file for complete search history.

(56) References Cited

U.S. PATENT DOCUMENTS

| | | |
|---|---|---|
| 3,780,918 A | 12/1973 | Curtis |
| 4,351,086 A | 9/1982 | Drlik |
| 4,379,988 A | 4/1983 | Mattatall |
| 4,405,213 A | 9/1983 | Kolkmann |
| 4,457,461 A | 7/1984 | Docking et al. |
| 4,506,961 A | 3/1985 | Palmieri |
| 4,516,157 A | 5/1985 | Campbell |
| 4,781,315 A | 11/1988 | Nordskog |
| 4,791,963 A | 12/1988 | Gronert et al. |
| 4,816,031 A | 3/1989 | Pfoff |
| 4,845,755 A | 7/1989 | Busch et al. |
| 4,918,737 A | 4/1990 | Luethi |
| 5,181,051 A | 1/1993 | Townsend et al. |
| D354,505 S | 1/1995 | Francavilla |
| 5,416,537 A | 5/1995 | Sadler |
| 5,568,207 A | 10/1996 | Chao |
| 5,606,743 A | 2/1997 | Vogt et al. |
| 5,608,808 A | 3/1997 | Da Silva |
| 5,623,703 A | 4/1997 | Takagi et al. |
| 5,636,775 A | 6/1997 | Kartsotis et al. |
| D385,290 S | 10/1997 | Totsuka et al. |
| 5,786,789 A | 7/1998 | Janky |
| 5,913,815 A | 6/1999 | Ball et al. |
| 5,915,588 A | 6/1999 | Stoken et al. |
| 6,017,119 A | 1/2000 | Huang |
| 6,020,920 A | 2/2000 | Anderson |
| 6,028,413 A | 2/2000 | Brockmann |
| 6,036,309 A | 3/2000 | Liu et al. |
| 6,076,927 A | 6/2000 | Owens |
| 6,091,546 A | 7/2000 | Spitzer |
| 6,120,146 A | 9/2000 | Harris |
| 6,157,291 A | 12/2000 | Kuenster et al. |
| 6,158,860 A | 12/2000 | Huang |
| 6,215,460 B1 | 4/2001 | Mizoguchi et al. |
| 6,275,681 B1 | 8/2001 | Vega et al. |
| 6,282,302 B1 | 8/2001 | Hara |
| 6,349,001 B1 | 2/2002 | Spitzer |
| 6,467,902 B2 | 10/2002 | Wang-lee |
| 6,474,813 B1 | 11/2002 | Yeh |
| 6,543,896 B1 | 4/2003 | Huang |
| D477,011 S | 7/2003 | Jamin |
| 6,657,673 B2 | 12/2003 | Ishikawa et al. |
| 6,711,744 B1 | 3/2004 | Hockenbury |
| 6,735,897 B1 | 5/2004 | Schmitter |
| 6,783,238 B1 | 8/2004 | Stepper |
| 6,809,358 B2 | 10/2004 | Hsieh et al. |
| 6,977,479 B2 | 12/2005 | Hsu |
| 7,003,353 B1 | 2/2006 | Parkhouse |
| 7,043,041 B2 * | 5/2006 | Švajda ................ H04R 25/554 381/312 |
| 7,092,763 B1 | 8/2006 | Griffith et al. |
| 7,126,558 B1 | 10/2006 | Dempski |
| D531,656 S | 11/2006 | Della Valle |
| 7,158,096 B1 | 1/2007 | Spitzer |
| 7,172,283 B1 | 2/2007 | Asta |
| 7,203,134 B1 | 4/2007 | Jackson |
| 7,229,168 B2 | 6/2007 | Kidouchim |
| 7,236,356 B2 | 6/2007 | Ulla et al. |
| 7,320,514 B2 | 1/2008 | Smith |
| D563,454 S | 3/2008 | Miklitarian |
| 7,409,234 B2 | 8/2008 | Glezerman |
| 7,435,019 B2 | 10/2008 | Lee |
| 7,597,440 B1 | 10/2009 | Magal |
| 7,618,260 B2 | 11/2009 | Daniel et al. |
| 7,656,439 B1 | 2/2010 | Manico et al. |
| 7,684,868 B2 | 3/2010 | Tai et al. |
| 7,793,361 B2 | 9/2010 | Ishihara et al. |
| D637,644 S | 5/2011 | Gonzalez |
| 7,937,880 B1 | 5/2011 | Fidlow |
| 7,979,963 B2 | 7/2011 | Lee-Holowka et al. |
| 7,988,283 B2 | 8/2011 | Jannard |
| 8,011,783 B1 | 9/2011 | Leblang |
| 8,046,948 B2 | 11/2011 | Mauch et al. |
| 8,068,169 B2 | 11/2011 | Chang |
| D650,411 S | 12/2011 | Fuchs |
| D653,202 S | 1/2012 | Hasbrook et al. |
| 8,109,629 B2 | 2/2012 | Howell et al. |
| 8,111,042 B2 | 2/2012 | Bennett |
| 8,123,352 B2 | 2/2012 | Matsumoto et al. |
| D659,094 S | 5/2012 | Brand et al. |
| 8,175,660 B2 | 5/2012 | Porwal |
| 8,193,781 B2 | 6/2012 | Lin et al. |
| D666,144 S | 8/2012 | Brand et al. |
| 8,299,877 B2 | 10/2012 | Hong et al. |
| D670,703 S | 11/2012 | Hasbrook et al. |
| D671,493 S | 11/2012 | Hasbrook et al. |
| D671,590 S | 11/2012 | Klinar et al. |
| 8,334,620 B2 | 12/2012 | Park et al. |
| D675,625 S | 2/2013 | Hasbrook et al. |
| D675,668 S | 2/2013 | Johnson et al. |
| D676,432 S | 2/2013 | Hasbrook et al. |
| 8,367,235 B2 | 2/2013 | Huang |
| 8,378,524 B2 | 2/2013 | Mita |
| 8,401,595 B2 | 3/2013 | Zhu et al. |
| 8,432,129 B2 | 4/2013 | Lee et al. |
| D682,914 S | 5/2013 | Fuchs |
| 8,469,508 B2 | 6/2013 | Silver et al. |
| 8,473,004 B2 | 6/2013 | Warren |
| 8,493,287 B2 | 7/2013 | Yamamoto |
| 8,534,514 B2 | 9/2013 | Zhu et al. |
| 8,541,975 B2 | 9/2013 | Park et al. |
| 8,571,609 B2 | 10/2013 | Hwang et al. |
| 8,587,241 B2 | 11/2013 | Maeda |
| 8,653,909 B2 | 2/2014 | Park et al. |
| D704,765 S | 5/2014 | Markovitz et al. |
| 8,716,899 B2 | 5/2014 | Yi et al. |
| 8,754,548 B2 | 6/2014 | Hong et al. |
| 8,778,022 B2 | 7/2014 | Blum et al. |
| 8,787,970 B2 | 7/2014 | Warren |
| D711,962 S | 8/2014 | Thixton |

(56) References Cited

U.S. PATENT DOCUMENTS

| | | | |
|---|---|---|---|
| D712,452 S | 9/2014 | Fuchs | |
| 8,823,215 B2 | 9/2014 | Park et al. | |
| 8,829,724 B2 | 9/2014 | Ryu et al. | |
| 8,830,888 B2 | 9/2014 | Shin et al. | |
| 8,842,635 B2 | 9/2014 | Kim et al. | |
| 8,868,140 B2 | 10/2014 | Zhu et al. | |
| 8,890,954 B2 | 11/2014 | O'Donnell et al. | |
| 8,896,694 B2 | 11/2014 | O'Donnell et al. | |
| 8,915,588 B2 | 12/2014 | Blum et al. | |
| 8,922,161 B2 | 12/2014 | Choi et al. | |
| D720,800 S | 1/2015 | Shin | |
| 8,927,881 B2 | 1/2015 | Wittenberg et al. | |
| 8,929,245 B2 | 1/2015 | Sivanesan et al. | |
| 8,931,896 B2 | 1/2015 | Blum et al. | |
| 8,934,045 B2 | 1/2015 | Karn et al. | |
| 8,953,827 B2 * | 2/2015 | Sacha | H04R 25/554 381/323 |
| 8,957,629 B2 | 2/2015 | Ryu et al. | |
| D724,134 S | 3/2015 | Wu | |
| 8,971,039 B2 | 3/2015 | Huang et al. | |
| 8,987,942 B2 | 3/2015 | Kim et al. | |
| D726,140 S | 4/2015 | Park et al. | |
| D729,650 S | 5/2015 | Phillips et al. | |
| 9,024,484 B2 | 5/2015 | Park et al. | |
| 9,026,165 B2 | 5/2015 | Kim et al. | |
| 9,030,052 B2 | 5/2015 | Kim et al. | |
| 9,048,682 B2 | 6/2015 | Lee et al. | |
| 9,048,683 B2 | 6/2015 | Lee et al. | |
| 9,048,695 B2 | 6/2015 | Hwang et al. | |
| 9,065,488 B2 | 6/2015 | Kim et al. | |
| 9,075,249 B2 | 7/2015 | Heinrich et al. | |
| 9,088,167 B2 | 7/2015 | Kim et al. | |
| 9,088,171 B2 | 7/2015 | Won et al. | |
| D737,889 S | 9/2015 | Yoo | |
| 9,122,083 B2 | 9/2015 | Blum et al. | |
| D741,943 S | 10/2015 | Keplinger | |
| 9,152,130 B2 | 10/2015 | Pattikonda et al. | |
| D742,372 S | 11/2015 | Christopher et al. | |
| D743,477 S | 11/2015 | Strecker | |
| D743,479 S | 11/2015 | Keplinger | |
| D745,922 S | 12/2015 | Shen | |
| D746,358 S | 12/2015 | Markovitz et al. | |
| D755,787 S | 5/2016 | Zander et al. | |
| 9,344,686 B2 | 5/2016 | Moharir | |
| 9,344,816 B2 * | 5/2016 | Larsen | H01Q 1/00 |
| 9,380,374 B2 * | 6/2016 | Sprague | H04R 25/65 |
| D763,951 S | 8/2016 | Chae | |
| D765,765 S | 9/2016 | Clegg | |
| D766,770 S | 9/2016 | Devaney et al. | |
| D767,013 S | 9/2016 | Hsu | |
| D767,014 S | 9/2016 | Fuchs | |
| 9,461,501 B2 * | 10/2016 | Partovi | H02J 7/007 |
| D772,330 S | 11/2016 | Hsu | |
| 9,524,530 B2 | 12/2016 | Moharir | |
| 9,584,705 B2 | 2/2017 | Nordstrom et al. | |
| D781,952 S | 3/2017 | Fuchs | |
| 9,628,707 B2 | 4/2017 | Blum et al. | |
| 9,635,222 B2 | 4/2017 | Blum et al. | |
| D787,582 S | 5/2017 | Desodt et al. | |
| 9,823,494 B2 | 11/2017 | Blum et al. | |
| 9,930,257 B2 | 3/2018 | Blum et al. | |
| D820,348 S | 6/2018 | Serlenga | |
| D823,931 S | 7/2018 | Shin | |
| 10,185,163 B2 | 1/2019 | Blum et al. | |
| 10,241,351 B2 | 3/2019 | Blum et al. | |
| 2001/0026684 A1 | 10/2001 | Sorek et al. | |
| 2001/0041073 A1 | 11/2001 | Sorek et al. | |
| 2002/0170147 A1 | 11/2002 | Heller | |
| 2003/0044180 A1 | 3/2003 | Lindberg | |
| 2004/0033058 A1 | 2/2004 | Reich | |
| 2004/0080299 A1 | 4/2004 | Forster et al. | |
| 2004/0088051 A1 | 5/2004 | Seligman | |
| 2004/0221370 A1 | 11/2004 | Hannula et al. | |
| 2005/0046786 A1 | 3/2005 | Smith | |
| 2005/0083579 A1 | 4/2005 | Volkenandt et al. | |
| 2005/0088811 A1 | 4/2005 | Ulla et al. | |
| 2005/0151511 A1 | 7/2005 | Chary | |
| 2005/0167558 A1 | 8/2005 | Smith | |
| 2005/0248717 A1 | 11/2005 | Howell et al. | |
| 2006/0004546 A1 | 1/2006 | Slanec | |
| 2006/0008257 A1 | 1/2006 | Mahashin et al. | |
| 2006/0023158 A1 | 2/2006 | Howell et al. | |
| 2006/0034478 A1 | 2/2006 | Davenport | |
| 2006/0055786 A1 | 3/2006 | Ollila | |
| 2006/0082730 A1 | 4/2006 | Franks | |
| 2006/0095128 A1 | 5/2006 | Blum et al. | |
| 2006/0121639 A1 | 6/2006 | Tai et al. | |
| 2006/0268217 A1 | 11/2006 | Teng | |
| 2007/0009253 A1 | 1/2007 | Nikkanen et al. | |
| 2007/0013864 A1 | 1/2007 | Dietz | |
| 2007/0023496 A1 | 2/2007 | Hall | |
| 2007/0030442 A1 | 2/2007 | Howell et al. | |
| 2007/0153639 A1 | 7/2007 | Lafever et al. | |
| 2008/0034637 A1 | 2/2008 | Summers | |
| 2008/0088791 A1 | 4/2008 | Smith | |
| 2008/0116847 A1 | 5/2008 | Loke et al. | |
| 2008/0137890 A1 * | 6/2008 | Petersen | H01M 10/052 381/323 |
| 2008/0163536 A1 | 7/2008 | Koch et al. | |
| 2008/0180537 A1 | 7/2008 | Weinberg et al. | |
| 2008/0183028 A1 | 7/2008 | Guillen Garcia et al. | |
| 2008/0192114 A1 | 8/2008 | Pearson et al. | |
| 2008/0208335 A1 | 8/2008 | Blum et al. | |
| 2008/0231721 A1 | 9/2008 | Chou et al. | |
| 2008/0239232 A1 | 10/2008 | Guerrero | |
| 2008/0259269 A1 | 10/2008 | Grogan et al. | |
| 2008/0266448 A1 | 10/2008 | Reiner et al. | |
| 2008/0301846 A1 | 12/2008 | Brillouet | |
| 2009/0009410 A1 | 1/2009 | Dolgin et al. | |
| 2009/0040308 A1 | 2/2009 | Temovskiy | |
| 2009/0110386 A1 | 4/2009 | Kamada et al. | |
| 2009/0169120 A1 | 7/2009 | Otani | |
| 2009/0173760 A1 | 7/2009 | Good | |
| 2009/0189981 A1 | 7/2009 | Siann et al. | |
| 2009/0207701 A1 | 8/2009 | Jacques | |
| 2009/0243397 A1 | 10/2009 | Cook et al. | |
| 2009/0251661 A1 | 10/2009 | Fuziakm, Jr. | |
| 2009/0262205 A1 | 10/2009 | Smith | |
| 2009/0264966 A1 | 10/2009 | Blum et al. | |
| 2009/0273755 A1 | 11/2009 | Laventure | |
| 2009/0307828 A1 | 12/2009 | Ludlow | |
| 2010/0017578 A1 | 1/2010 | Maansson et al. | |
| 2010/0036773 A1 | 2/2010 | Bennett | |
| 2010/0045114 A1 | 2/2010 | Sample et al. | |
| 2010/0053555 A1 | 3/2010 | Enriquez et al. | |
| 2010/0073262 A1 | 3/2010 | Matsumoto | |
| 2010/0073478 A1 | 3/2010 | Kalous | |
| 2010/0077334 A1 | 3/2010 | Yang et al. | |
| 2010/0103076 A1 | 4/2010 | Yamamoto | |
| 2010/0157432 A1 | 6/2010 | Sugihara et al. | |
| 2010/0164295 A1 | 7/2010 | Ichikawa et al. | |
| 2010/0174629 A1 | 7/2010 | Taylor et al. | |
| 2010/0177476 A1 | 7/2010 | Hotelling et al. | |
| 2010/0187910 A1 | 7/2010 | Brengauz | |
| 2010/0245585 A1 | 9/2010 | Fisher et al. | |
| 2010/0245757 A1 | 9/2010 | Sugihara et al. | |
| 2010/0256481 A1 | 10/2010 | Mareci et al. | |
| 2010/0265655 A1 | 10/2010 | Metzler et al. | |
| 2010/0284683 A1 | 11/2010 | Fressola et al. | |
| 2010/0287683 A1 | 11/2010 | Neal | |
| 2010/0315586 A1 | 12/2010 | Mansuy | |
| 2010/0319096 A1 | 12/2010 | Scott et al. | |
| 2011/0046699 A1 | 2/2011 | Mazanec | |
| 2011/0074349 A1 | 3/2011 | Ghovanloo | |
| 2011/0115429 A1 | 5/2011 | Toivola et al. | |
| 2011/0121042 A1 | 5/2011 | Weiss | |
| 2011/0156639 A1 | 6/2011 | Ryu et al. | |
| 2011/0181238 A1 | 7/2011 | Soar | |
| 2011/0184320 A1 | 7/2011 | Shipps et al. | |
| 2011/0185538 A1 | 8/2011 | Hotelier et al. | |
| 2011/0188677 A1 | 8/2011 | Rothkopf et al. | |
| 2011/0193963 A1 | 8/2011 | Hess et al. | |
| 2011/0221389 A1 | 9/2011 | Won et al. | |
| 2011/0221390 A1 | 9/2011 | Won et al. | |

(56) References Cited

U.S. PATENT DOCUMENTS

| | | |
|---|---|---|
| 2011/0222154 A1 | 9/2011 | Choi et al. |
| 2011/0225073 A1 | 9/2011 | Won et al. |
| 2011/0234012 A1 | 9/2011 | Yi et al. |
| 2011/0241438 A1 | 10/2011 | Kim et al. |
| 2011/0241612 A1 | 10/2011 | Ryu et al. |
| 2012/0015534 A1 | 1/2012 | Wavra et al. |
| 2012/0032631 A1 | 2/2012 | Bourilkov et al. |
| 2012/0062173 A1 | 3/2012 | Choi et al. |
| 2012/0075571 A1 | 3/2012 | Silver |
| 2012/0081658 A1 | 4/2012 | Sugihara et al. |
| 2012/0105740 A1 | 5/2012 | Jannard et al. |
| 2012/0127423 A1 | 5/2012 | Blum et al. |
| 2012/0130252 A1 | 5/2012 | Pohjanen et al. |
| 2012/0146575 A1 | 6/2012 | Armstrong et al. |
| 2012/0153903 A1 | 6/2012 | Kim et al. |
| 2012/0164943 A1 | 6/2012 | Bennett |
| 2012/0169272 A1 | 7/2012 | Khalepari |
| 2012/0169278 A1 | 7/2012 | Choi et al. |
| 2012/0189146 A1 | 7/2012 | Wuidart |
| 2012/0193996 A1 | 8/2012 | Ryu et al. |
| 2012/0206334 A1 | 8/2012 | Osterhout et al. |
| 2012/0212593 A1 | 8/2012 | Na'Aman et al. |
| 2012/0280575 A1 | 11/2012 | Kim et al. |
| 2012/0281961 A1 | 11/2012 | Forbes |
| 2012/0286581 A1 | 11/2012 | Ryu et al. |
| 2012/0286582 A1 | 11/2012 | Kim et al. |
| 2012/0286726 A1 | 11/2012 | Kim et al. |
| 2012/0293008 A1 | 11/2012 | Park et al. |
| 2012/0293009 A1 | 11/2012 | Kim et al. |
| 2012/0293010 A1 | 11/2012 | Lee et al. |
| 2012/0294478 A1 | 11/2012 | Publicover et al. |
| 2012/0299390 A1 | 11/2012 | Kim et al. |
| 2012/0300872 A1 | 11/2012 | Kim et al. |
| 2012/0306269 A1 | 12/2012 | Kim et al. |
| 2012/0306284 A1 | 12/2012 | Lee et al. |
| 2012/0307229 A1 | 12/2012 | Conroy et al. |
| 2012/0309304 A1 | 12/2012 | Kim et al. |
| 2012/0309305 A1 | 12/2012 | Kim et al. |
| 2012/0309306 A1 | 12/2012 | Kim et al. |
| 2012/0309308 A1 | 12/2012 | Kim et al. |
| 2012/0313445 A1 | 12/2012 | Park et al. |
| 2012/0313447 A1 | 12/2012 | Park et al. |
| 2012/0328043 A1 | 12/2012 | Kwon et al. |
| 2012/0329405 A1 | 12/2012 | Lee et al. |
| 2013/0007949 A1 | 1/2013 | Kurs et al. |
| 2013/0015813 A1 | 1/2013 | Kim et al. |
| 2013/0026847 A1 | 1/2013 | Kim et al. |
| 2013/0033117 A1 | 2/2013 | Kim et al. |
| 2013/0035034 A1 | 2/2013 | Kim et al. |
| 2013/0039395 A1 | 2/2013 | Norconk et al. |
| 2013/0043734 A1 | 2/2013 | Stone et al. |
| 2013/0043737 A1 | 2/2013 | Yeo et al. |
| 2013/0044128 A1 | 2/2013 | Liu et al. |
| 2013/0049456 A1 | 2/2013 | Kim et al. |
| 2013/0049483 A1 | 2/2013 | Kim et al. |
| 2013/0057079 A1 | 3/2013 | Park et al. |
| 2013/0058379 A1 | 3/2013 | Kim et al. |
| 2013/0058380 A1 | 3/2013 | Kim et al. |
| 2013/0059533 A1* | 3/2013 | Kwon ............... H04B 5/0031 455/41.1 |
| 2013/0062963 A1 | 3/2013 | Chernokalov et al. |
| 2013/0062964 A1 | 3/2013 | Chernokalov et al. |
| 2013/0062965 A1 | 3/2013 | Chernokalov et al. |
| 2013/0063082 A1 | 3/2013 | Lee et al. |
| 2013/0063083 A1 | 3/2013 | Park et al. |
| 2013/0063873 A1 | 3/2013 | Wodrich et al. |
| 2013/0082651 A1 | 4/2013 | Park et al. |
| 2013/0093255 A1 | 4/2013 | Jung et al. |
| 2013/0099588 A1 | 4/2013 | Yeo et al. |
| 2013/0099591 A1 | 4/2013 | Yeo et al. |
| 2013/0099732 A1 | 4/2013 | Lee et al. |
| 2013/0099733 A1 | 4/2013 | Park et al. |
| 2013/0099734 A1 | 4/2013 | Lee et al. |
| 2013/0101133 A1 | 4/2013 | Yoon et al. |
| 2013/0113296 A1 | 5/2013 | Ryu et al. |
| 2013/0113298 A1 | 5/2013 | Ryu et al. |
| 2013/0119780 A1 | 5/2013 | Kim et al. |
| 2013/0119929 A1 | 5/2013 | Partovi |
| 2013/0127410 A1 | 5/2013 | Park et al. |
| 2013/0128364 A1 | 5/2013 | Wheeler et al. |
| 2013/0130621 A1 | 5/2013 | Kim et al. |
| 2013/0134791 A1 | 5/2013 | Park et al. |
| 2013/0134927 A1 | 5/2013 | Park et al. |
| 2013/0147427 A1 | 6/2013 | Polu et al. |
| 2013/0154387 A1 | 6/2013 | Lee et al. |
| 2013/0154557 A1 | 6/2013 | Lee et al. |
| 2013/0154558 A1 | 6/2013 | Lee et al. |
| 2013/0162200 A1 | 6/2013 | Terry et al. |
| 2013/0176652 A1 | 7/2013 | Kim et al. |
| 2013/0176653 A1 | 7/2013 | Kim et al. |
| 2013/0181665 A1 | 7/2013 | Lee et al. |
| 2013/0182002 A1 | 7/2013 | Macciola et al. |
| 2013/0187475 A1 | 7/2013 | Vendik et al. |
| 2013/0187598 A1 | 7/2013 | Park et al. |
| 2013/0200844 A1 | 8/2013 | Lee et al. |
| 2013/0201440 A1 | 8/2013 | Howell et al. |
| 2013/0207479 A1 | 8/2013 | Vendik et al. |
| 2013/0207851 A1 | 8/2013 | Dabov |
| 2013/0210378 A1 | 8/2013 | Zhu et al. |
| 2013/0214734 A1 | 8/2013 | Kang et al. |
| 2013/0214735 A1 | 8/2013 | Kang et al. |
| 2013/0215374 A1 | 8/2013 | Blum et al. |
| 2013/0216085 A1 | 8/2013 | Honeycutt |
| 2013/0221912 A1 | 8/2013 | Kang et al. |
| 2013/0221914 A1 | 8/2013 | Kim et al. |
| 2013/0221915 A1 | 8/2013 | Son et al. |
| 2013/0225082 A1 | 8/2013 | Kang et al. |
| 2013/0229614 A1 | 9/2013 | Marini et al. |
| 2013/0235234 A1 | 9/2013 | Cucci et al. |
| 2013/0235332 A1 | 9/2013 | Blum et al. |
| 2013/0241308 A1 | 9/2013 | Bilbrey et al. |
| 2013/0249306 A1 | 9/2013 | Kim et al. |
| 2013/0250135 A1 | 9/2013 | Blum et al. |
| 2013/0250232 A1 | 9/2013 | Belbey et al. |
| 2013/0252669 A1 | 9/2013 | Nhiayi |
| 2013/0264997 A1 | 10/2013 | Lee et al. |
| 2013/0270920 A1 | 10/2013 | Yoon et al. |
| 2013/0278072 A1 | 10/2013 | Yoon et al. |
| 2013/0278207 A1 | 10/2013 | Yoo |
| 2013/0282117 A1 | 10/2013 | Van Heugten et al. |
| 2013/0300204 A1 | 11/2013 | Partovi |
| 2013/0320736 A1 | 12/2013 | Teufel et al. |
| 2013/0322753 A1 | 12/2013 | Lim et al. |
| 2013/0329183 A1 | 12/2013 | Blum et al. |
| 2013/0343585 A1* | 12/2013 | Bennett ............... H04R 25/554 381/315 |
| 2014/0009627 A1 | 1/2014 | Tanaka et al. |
| 2014/0021796 A1 | 1/2014 | Song et al. |
| 2014/0022765 A1 | 1/2014 | Waters |
| 2014/0027521 A1 | 1/2014 | Pedicano et al. |
| 2014/0042824 A1* | 2/2014 | Fells .................. H01F 38/14 307/104 |
| 2014/0043580 A1 | 2/2014 | Steele |
| 2014/0044281 A1 | 2/2014 | Ganem et al. |
| 2014/0049211 A1 | 2/2014 | Park et al. |
| 2014/0058506 A1 | 2/2014 | Tai et al. |
| 2014/0062395 A1 | 3/2014 | Kwon |
| 2014/0065948 A1 | 3/2014 | Huang |
| 2014/0070623 A1 | 3/2014 | Keeling et al. |
| 2014/0070624 A1 | 3/2014 | Kim et al. |
| 2014/0070625 A1 | 3/2014 | Kim et al. |
| 2014/0071644 A1 | 3/2014 | Yoon et al. |
| 2014/0077613 A1 | 3/2014 | Song et al. |
| 2014/0077614 A1 | 3/2014 | Park et al. |
| 2014/0084688 A1 | 3/2014 | Tzanidis et al. |
| 2014/0084858 A1 | 3/2014 | Kim et al. |
| 2014/0103873 A1 | 4/2014 | Partovi et al. |
| 2014/0111018 A1 | 4/2014 | Kwon et al. |
| 2014/0111153 A1 | 4/2014 | Kwon et al. |
| 2014/0113689 A1 | 4/2014 | Lee |
| 2014/0125278 A1 | 5/2014 | Kim et al. |
| 2014/0135592 A1 | 5/2014 | Ohnemus et al. |
| 2014/0139180 A1 | 5/2014 | Kim et al. |
| 2014/0139637 A1 | 5/2014 | Mistry et al. |

(56) References Cited

U.S. PATENT DOCUMENTS

| | | |
|---|---|---|
| 2014/0140420 A1 | 5/2014 | Ghovanloo et al. |
| 2014/0146282 A1 | 5/2014 | Lu |
| 2014/0152116 A1 | 6/2014 | Kim et al. |
| 2014/0152516 A1 | 6/2014 | Kim et al. |
| 2014/0153760 A1* | 6/2014 | Newton ................ H02J 7/34 381/323 |
| 2014/0159503 A1 | 6/2014 | Murakami et al. |
| 2014/0159654 A1 | 6/2014 | Lee et al. |
| 2014/0183967 A1 | 7/2014 | Ryu et al. |
| 2014/0191593 A1 | 7/2014 | Moh |
| 2014/0197785 A1 | 7/2014 | Lee et al. |
| 2014/0203657 A1 | 7/2014 | Song et al. |
| 2014/0204235 A1 | 7/2014 | Wexler et al. |
| 2014/0222462 A1 | 8/2014 | Shakil et al. |
| 2014/0223462 A1 | 8/2014 | Aimone et al. |
| 2014/0232980 A1 | 8/2014 | Harms et al. |
| 2014/0239280 A1 | 8/2014 | Takada et al. |
| 2014/0241555 A1 | 8/2014 | Terlizzi |
| 2014/0252875 A1 | 9/2014 | Lee |
| 2014/0253028 A1 | 9/2014 | Lee et al. |
| 2014/0253322 A1 | 9/2014 | Chapin |
| 2014/0265614 A1 | 9/2014 | Kim et al. |
| 2014/0265615 A1 | 9/2014 | Kim et al. |
| 2014/0266020 A1 | 9/2014 | van Lammeren et al. |
| 2014/0266988 A1 | 9/2014 | Fisher et al. |
| 2014/0267874 A1 | 9/2014 | Ratcliff et al. |
| 2014/0268008 A1 | 9/2014 | Howell et al. |
| 2014/0268017 A1 | 9/2014 | Sweis et al. |
| 2014/0270688 A1 | 9/2014 | Han et al. |
| 2014/0285139 A1 | 9/2014 | Ahn et al. |
| 2014/0285141 A1 | 9/2014 | Lee et al. |
| 2014/0285142 A1 | 9/2014 | Lee et al. |
| 2014/0285416 A1 | 9/2014 | Priyantha et al. |
| 2014/0307902 A1* | 10/2014 | Ku ...................... H04R 25/554 381/315 |
| 2014/0308987 A1 | 10/2014 | Wilson et al. |
| 2014/0312834 A1 | 10/2014 | Tanabe et al. |
| 2014/0313471 A1 | 10/2014 | Eubanks |
| 2014/0319927 A1* | 10/2014 | Cho ...................... B60L 53/39 307/104 |
| 2014/0327319 A1 | 11/2014 | Byun et al. |
| 2014/0327393 A1 | 11/2014 | Lee et al. |
| 2014/0327409 A1 | 11/2014 | Lee et al. |
| 2014/0333153 A1 | 11/2014 | Tanaka et al. |
| 2014/0340033 A1 | 11/2014 | Kim et al. |
| 2014/0346888 A1 | 11/2014 | Kim et al. |
| 2014/0347006 A1 | 11/2014 | Kim et al. |
| 2014/0354880 A1 | 12/2014 | Han |
| 2014/0361736 A1 | 12/2014 | Kwon et al. |
| 2014/0361738 A1 | 12/2014 | Lee et al. |
| 2014/0375246 A1 | 12/2014 | Boysen, III et al. |
| 2014/0375256 A1 | 12/2014 | Lee et al. |
| 2015/0035991 A1 | 2/2015 | Sachs et al. |
| 2015/0046418 A1 | 2/2015 | Akbacak et al. |
| 2015/0049001 A1 | 2/2015 | Rahman et al. |
| 2015/0049201 A1 | 2/2015 | Liu et al. |
| 2015/0060506 A1 | 3/2015 | Cameron et al. |
| 2015/0061589 A1 | 3/2015 | Wodrich et al. |
| 2015/0070596 A1 | 3/2015 | Gadjali |
| 2015/0072744 A1 | 3/2015 | Huang |
| 2015/0086175 A1 | 3/2015 | Lorenzetti |
| 2015/0091389 A1 | 4/2015 | Byrne et al. |
| 2015/0102995 A1 | 4/2015 | Shen et al. |
| 2015/0103304 A1 | 4/2015 | Darcy |
| 2015/0137746 A1* | 5/2015 | Lee ...................... H02J 7/00036 320/108 |
| 2015/0168727 A1 | 6/2015 | Qaddoura |
| 2015/0168729 A1 | 6/2015 | Kobayashi |
| 2015/0172538 A1 | 6/2015 | Nordstrom et al. |
| 2015/0180286 A1 | 6/2015 | Asanuma et al. |
| 2015/0193949 A1 | 7/2015 | Katz et al. |
| 2015/0193980 A1 | 7/2015 | Pedley |
| 2015/0204949 A1 | 7/2015 | Von Novak, III |
| 2015/0234201 A1 | 8/2015 | Levesque |
| 2015/0236521 A1 | 8/2015 | Park et al. |
| 2015/0244204 A1 | 8/2015 | Lee et al. |
| 2015/0244341 A1 | 8/2015 | Ritter et al. |
| 2015/0244427 A1 | 8/2015 | Kim et al. |
| 2015/0244910 A1 | 8/2015 | Marston et al. |
| 2015/0249361 A1 | 9/2015 | Kim et al. |
| 2015/0249916 A1 | 9/2015 | Schlub et al. |
| 2015/0256021 A1 | 9/2015 | Kwon et al. |
| 2015/0261013 A1 | 9/2015 | Dobson et al. |
| 2015/0312533 A1 | 10/2015 | Moharir |
| 2016/0025996 A1 | 1/2016 | Bacon |
| 2016/0026156 A1 | 1/2016 | Jackson et al. |
| 2016/0033792 A1 | 2/2016 | Blum et al. |
| 2016/0037025 A1 | 2/2016 | Blum |
| 2016/0066656 A1 | 3/2016 | Ferris |
| 2016/0072296 A1 | 3/2016 | Nejatali et al. |
| 2016/0104284 A1 | 4/2016 | Maguire et al. |
| 2016/0125656 A1 | 5/2016 | James et al. |
| 2016/0154239 A9 | 6/2016 | Layson, Jr. |
| 2016/0163010 A1 | 6/2016 | Moharir |
| 2016/0172870 A1 | 6/2016 | Blum et al. |
| 2016/0174669 A1 | 6/2016 | Ferris |
| 2016/0182826 A1 | 6/2016 | Blum et al. |
| 2016/0190859 A1 | 6/2016 | Blum et al. |
| 2016/0203359 A1 | 7/2016 | von und zu Liechtenstein |
| 2016/0206056 A1 | 7/2016 | Pluemer et al. |
| 2016/0225191 A1 | 8/2016 | Mullins |
| 2016/0261147 A1 | 9/2016 | Blum et al. |
| 2016/0294225 A1 | 10/2016 | Blum et al. |
| 2016/0349533 A1 | 12/2016 | Grassi |
| 2016/0363787 A1 | 12/2016 | Blum et al. |
| 2017/0024612 A1 | 1/2017 | Wexler et al. |
| 2017/0069192 A1 | 3/2017 | Sood et al. |
| 2017/0127196 A1 | 5/2017 | Blum et al. |
| 2017/0134645 A1 | 5/2017 | Kim et al. |
| 2017/0147756 A1 | 5/2017 | Moharir |
| 2017/0150049 A1 | 5/2017 | Blum et al. |
| 2017/0185738 A1 | 6/2017 | Moharir et al. |
| 2017/0195529 A1 | 7/2017 | Blum |
| 2017/0223236 A1 | 8/2017 | Oberlander et al. |
| 2017/0272640 A1 | 9/2017 | Fuller et al. |
| 2017/0329365 A1 | 11/2017 | Wong et al. |
| 2017/0363885 A1 | 12/2017 | Blum et al. |
| 2018/0042369 A1 | 2/2018 | Blum et al. |
| 2018/0063433 A1 | 3/2018 | Blum et al. |
| 2018/0088355 A1 | 3/2018 | Blum et al. |
| 2018/0116384 A1 | 5/2018 | Blum et al. |
| 2018/0129078 A1 | 5/2018 | Blum et al. |
| 2018/0131847 A1 | 5/2018 | Kokonaski et al. |
| 2018/0249078 A1 | 8/2018 | Blum et al. |
| 2018/0249079 A1 | 8/2018 | Blum et al. |
| 2018/0262055 A1 | 9/2018 | Schoenbart et al. |
| 2019/0179173 A1 | 6/2019 | Blum et al. |

FOREIGN PATENT DOCUMENTS

| | | |
|---|---|---|
| CN | 200972550 Y | 11/2007 |
| CN | 101529899 A | 9/2009 |
| CN | 201318005 | 9/2009 |
| CN | 202033546 U | 11/2011 |
| CN | 202153283 U | 2/2012 |
| CN | 202407553 | 9/2012 |
| CN | 202419070 | 9/2012 |
| CN | 202424276 | 9/2012 |
| CN | 202424277 | 9/2012 |
| CN | 202424278 | 9/2012 |
| CN | 202424279 | 9/2012 |
| CN | 202424807 | 9/2012 |
| CN | 102777487 | 11/2012 |
| CN | 202635909 | 1/2013 |
| CN | 202635910 | 1/2013 |
| CN | 202635911 | 1/2013 |
| CN | 202636015 | 1/2013 |
| CN | 202647093 | 1/2013 |
| CN | 202647094 | 1/2013 |
| CN | 202647101 | 1/2013 |
| CN | 202647104 | 1/2013 |
| CN | 202647111 | 1/2013 |
| CN | 202649874 | 1/2013 |
| CN | 202649875 | 1/2013 |

(56) References Cited

FOREIGN PATENT DOCUMENTS

| | | |
|---|---|---|
| CN | 202651825 | 1/2013 |
| CN | 202652281 | 1/2013 |
| CN | 202652282 | 1/2013 |
| CN | 202652304 | 1/2013 |
| CN | 202652305 | 1/2013 |
| CN | 202800463 | 3/2013 |
| CN | 202800547 | 3/2013 |
| CN | 202811809 | 3/2013 |
| CN | 202818399 | 3/2013 |
| CN | 202904151 U | 4/2013 |
| CN | 203084344 U | 7/2013 |
| CN | 203178585 | 9/2013 |
| CN | 203708487 U | 7/2014 |
| CN | 104273891 A | 1/2015 |
| DE | 202009015991 | 4/2010 |
| EP | 0736268 | 10/1996 |
| ES | 2165795 | 3/2002 |
| GB | 2472120 A | 1/2011 |
| JP | 07099596 A | 4/1995 |
| JP | H08505238 A | 6/1996 |
| JP | 2000138858 A | 5/2000 |
| JP | 4006856 B2 | 11/2007 |
| JP | 2008067285 A | 3/2008 |
| JP | 3150547 U | 4/2009 |
| JP | 2012063641 A | 3/2012 |
| JP | 2017013087 A | 1/2017 |
| JP | 2017013088 A | 1/2017 |
| JP | 2017013089 A | 1/2017 |
| JP | 2017013090 A | 1/2017 |
| JP | 2017013091 A | 1/2017 |
| JP | 2017013092 A | 1/2017 |
| KR | 1020090047255 A | 5/2009 |
| KR | 1020140053341 A | 5/2014 |
| KR | 101421046 B1 | 7/2014 |
| KR | 20140091195 A | 7/2014 |
| KR | 101646541 | 8/2016 |
| TW | M300818 U | 11/2006 |
| TW | 200843277 A | 11/2008 |
| TW | 201036430 A | 10/2010 |
| TW | M395176 U | 12/2010 |
| TW | 201145748 A1 | 12/2011 |
| TW | 201415753 A | 4/2014 |
| TW | 201520976 A | 6/2015 |
| TW | 201610506 A | 3/2016 |
| WO | 9208157 A1 | 5/1992 |
| WO | 0106298 A1 | 1/2001 |
| WO | 02/45044 A1 | 6/2002 |
| WO | 2009018391 A1 | 2/2009 |
| WO | 2009/052705 A1 | 4/2009 |
| WO | 2010137495 A1 | 12/2010 |
| WO | 2011041733 A1 | 4/2011 |
| WO | 2012/039738 A1 | 3/2012 |
| WO | 2012/093986 A1 | 7/2012 |
| WO | 2013118162 A1 | 8/2013 |
| WO | 2013/188343 A1 | 12/2013 |
| WO | 2014/012536 A1 | 1/2014 |
| WO | 2014012451 A1 | 1/2014 |
| WO | 2014045571 A1 | 3/2014 |
| WO | 2014122538 A2 | 8/2014 |
| WO | 2014152004 A1 | 9/2014 |
| WO | 2014161083 A1 | 10/2014 |
| WO | 2015029215 A1 | 3/2015 |
| WO | 2016022499 A1 | 2/2016 |
| WO | 2016100339 A1 | 6/2016 |
| WO | 2016105480 A2 | 6/2016 |
| WO | 2016106577 A1 | 7/2016 |
| WO | 2016141349 A1 | 9/2016 |
| WO | 2016201261 A1 | 12/2016 |
| WO | 2016205373 A1 | 12/2016 |
| WO | 2017075405 | 5/2017 |
| WO | 20170223042 A1 | 12/2017 |
| WO | 20180031684 A1 | 2/2018 |
| WO | 2018075916 A1 | 4/2018 |
| WO | 2018089533 A1 | 5/2018 |
| WO | 2018165622 A1 | 9/2018 |

OTHER PUBLICATIONS

U.S. Appl. No. 15/964,910 titled "Wearable Camera System" filed Apr. 27, 2018, pp. all.

U.S. Appl. No. 15/965,396 titled "Wearable Camera System", filed Apr. 27, 2018, pp. all.

U.S. Appl. No. 15/627,759, filed Jun. 20, 2017 entitled "Image Alignment Systems and Methods", pp. all.

U.S. Appl. No. 15/672,971 entitled "Connectors for Attaching One or More Wearable Devices to Eyewear", filed Aug. 9, 2017, pp. all.

U.S. Appl. No. 15/789,574, entitled "Architecture for and Camera Devoid of Viewfinder", filed Oct. 20, 2017, pp. all.

U.S. Appl. No. 15/802,782 entitled "Wearable Camera System" filed Nov. 3, 2017, pp. all.

U.S. Appl. No. 15/807,308 entitled "A Smart Case for Electronic Wearable Device", filed Nov. 8, 2017, pp. all.

U.S. Appl. No. 15/809,383 entitled "Wearable Camera Systems and Apparatus and Method for Attaching Camera Systems or Other Electronic Devices to Wearable Articles" filed Nov. 10, 2017, pp. all.

U.S. Appl. No. 15/842,112 entitled "Magnetic Attachment Mechanism for Electronic Wearable Device" filed Dec. 14, 2017, pp. all.

U.S. Appl. No. 15/843,639 entitled "Connectors for Attaching One or More Wearable Devices to Eyewear" filed Dec. 15, 2017, pp. all.

U.S. Appl. No. 15/863,474, entitled "Wearable Camera Systems and Apparatus and Method for Attaching Camera Systems or Other Electronic Devices to Wearable Articles", filed Jan. 5, 2018, pp. all.

U.S. Appl. No. 15/917,413 entitled "Wireless Power Conversion System" filed Mar. 9, 2018, pp. all.

U.S. Appl. No. 16/450,752 titled "Wearable Camera System", filed Jun. 24, 2019, pp. all.

"Alpha—The World's Smallest 4K Action Camera", https://www.indiegogo.com/projects/alpha-the-world-s-smallest-4k-action-camera-sports captured Oct. 9, 2017, pp. all.

"Inductive Limits in the Frequency Range 9 kHz to 148.5 kHz", ECC Report 135, Bordeaux, Sep. 2009, p. 1-16.

"International Search Report and Written Opinion", International Search Report and Written Opinion received for PCT Appl. PCT/US2016/059395 dated Mar. 2, 2017, pp. all.

U.S. Appl. No, 15/337,796, entitled "Hearing Aid Adapted for Wireless Power Reception", filed Oct. 28, 2016, pp. all.

U.S. Appl. No. 29/588,270, entitled "Eyewear Temple", filed Dec. 19, 2016, pp. all.

Design U.S. Appl. No. 29/556,571, entitled "Eyewear Temple", filed Mar. 1, 2016, pp. all.

U.S. Appl. No. 15/179,018, entitled "Eyewear With Magnetic Track for Electronic Wearable Device", filed Jun. 10, 2016, pp. All.

U.S. Appl. No. 15/183,368, entitled "Wireless Power Systems and Methods Suitable for Charging Wearable Electronic Devices", filed Jun. 15, 2016, pp. all.

CT Band: "Make Your Watch Smart!", http://www.ct-band.com/en/ captured Nov. 10, 2016, pp. all.

Griffin: "Sleepsport Band", http://www.officesupplynow.com/xcart/GRFGB40139-Griffin-Case-sleepsport-Band-bk.html?gclid=CjwKEAjwnebABRCjpvr13dHL8DsSJABB-ILJBcOqYMmKeCs3g_rcvbST3HVWtuup_HzVQ3-lv5YFOBoCck_w_wcB captured Nov. 10, 2016, pp. all.

Kairos: "Kairos T-Band Only", https://kairoswatctes.com/tbands/tband/ captured Nov. 10, 2016, pp. all.

Kiwi Wearable Technologies Ltd.: "Glance: World'S First Smart Accessory for Your Watch", https://www.kickstarter.com/projects/1742184757/glance-worlds-first-smart-accessory-for-your-watch captured Nov. 10, 2016, pp. all.

Lynnette: "Fitbit Pouch for Watch Strap", https://www.etsy.com/listing/186507712/fitbit-pouch-for-watch-strap captured Nov. 10, 2016, pp. all.

Main Tool: "Classi: the World'S First Leather Smart Strap for Classic Watches", http://www.maintool.me/classi.html captured Nov. 10, 2016, pp. all.

Marathon: "Marathon Watch Band Clip Compass", http://www/chronoworld.com/marathon-watch-band-clip-compass-co194004.html captured Nov. 10, 2016, pp. all.

(56) References Cited

OTHER PUBLICATIONS

Modillion: "Modillion Turns Any "Dumb" Watch Into a Smart Watch", http://newatlas.com/modillian-smartwatch-strap/32059/ captured Nov. 10, 2016, pp. all.
Montblac-Simplo Gmbh: "Wearable Technology Meets the Art of Fine Watchmaking", http://www.montblanc.com/en-us/discover/specials/montblanc-introduces-e-strap.html captured Nov. 10, 2016, pp. all.
"Multi Functional Pouch Armband Ankel Band Wristband for Fitbit Flex Fitbit One Clip . . . ", https://www.amazon.com/functional-armband-wristband-smartband-withings/dp/B00WALZXCW captured Nov. 10, 2016, pp. all.
"Review of 1Bandid Sports & GPS Watch Id Bands", https://www.dcrainmaker.com/2011/09/review-of-1bandid-sports-gps-watch-id.html captured Nov. 10, 2016, pp. all.
"This Weird Strap Lets You Make Phone Calls From Your Regular Watch", https://www.kickstarter.com/projects/hotsmartwatch/hot-band-the-smart-watch-band-for-any-watch?token=5d08da6f captured Nov. 10, 2016, pp. all.
Nico Gerard: "Skyview Pinnacle", https://www.nicogerard.com/nico-gerard-skyview-pinnacle captured Nov. 10, 2016, pp. all.
Pogocam: Capture Life in the Moment With a Camera for Glasses, http://web.archive.org/web/20171101052751/https://pogotec.com/products/pogocam Oct. 2017, pp. all.
Smid, Peter: Chapter 1: Part Program Development, http://www.globalspec.com/reference/56201 /203279/chapter-1-part-program-development> Published Dec. 29, 2011, pp. all.
Taser International, Inc: Taser Axon Flex System User Manual, Taser International Inc., 2015, p. 1-21.
Tombot: "Custom Watchband Holder for Fitbit Flex", http://www.shapeways.com/product/YWXHN5VYP/custom-watchband-holder-for-fitbit-flex?optionId=17995763 captured Nov. 10, 2016, pp. all.
Ubirds: ""Unique" Hand-Made Strap Discretely Adds Smart Features to Any Watch", http://newatlas.com/unique-smartwatch-strap/39458/ captured Nov. 10, 2016, pp. all.
Wotch: "Transform Your Wristwatch Into a Smart Device", http://www.wotch.de/ captured Nov. 10, 2016, pp. all.

* cited by examiner

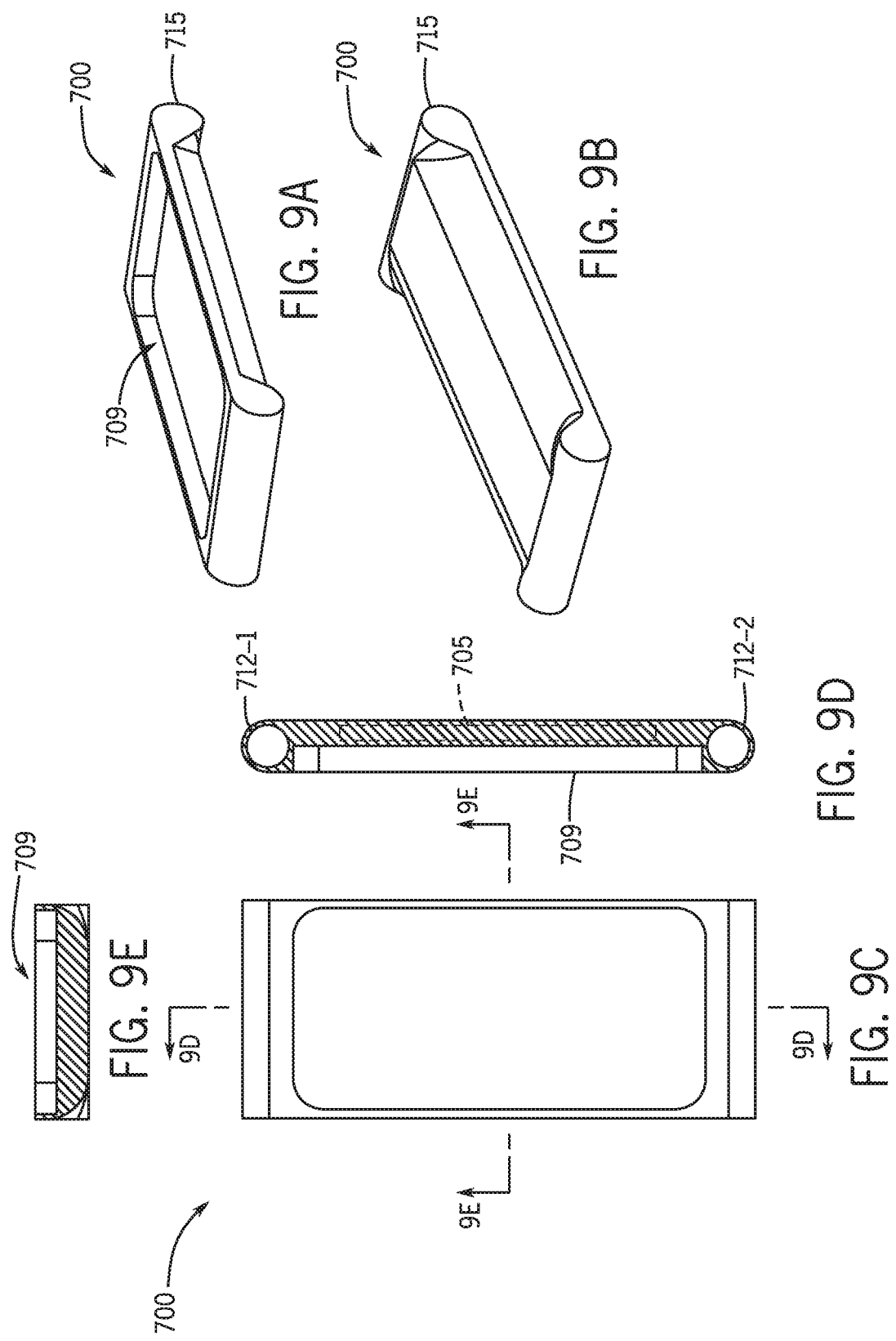

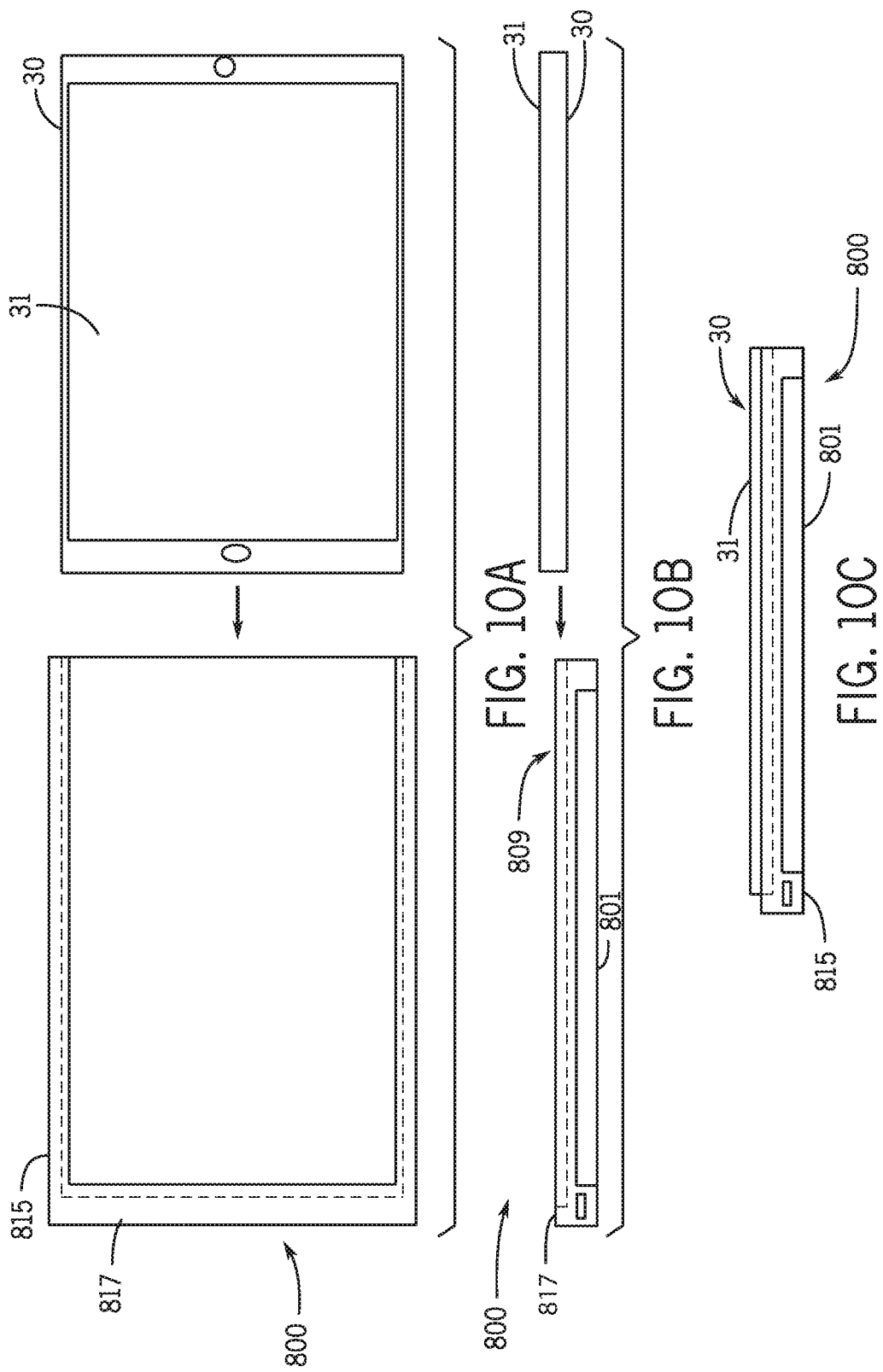

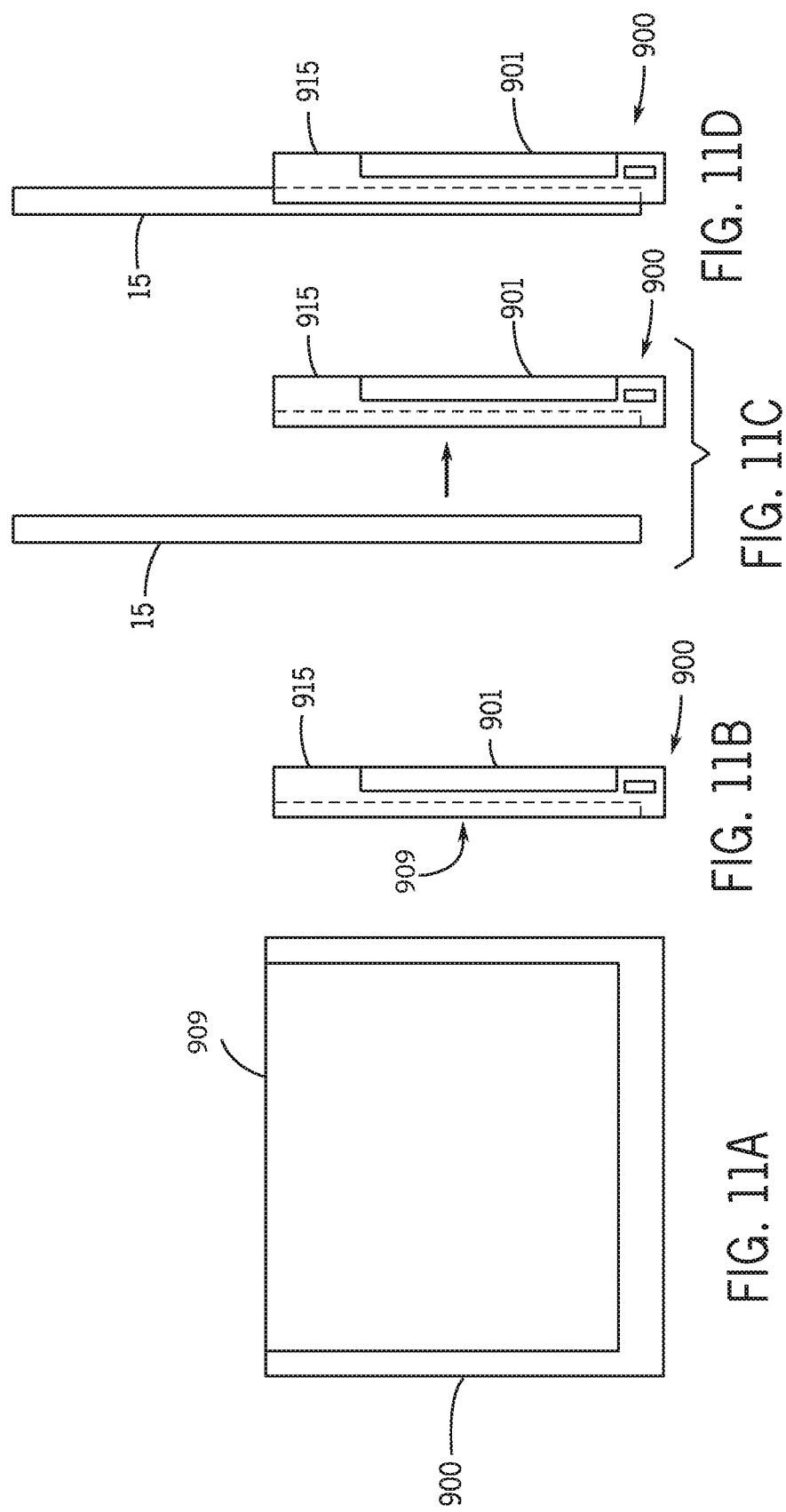

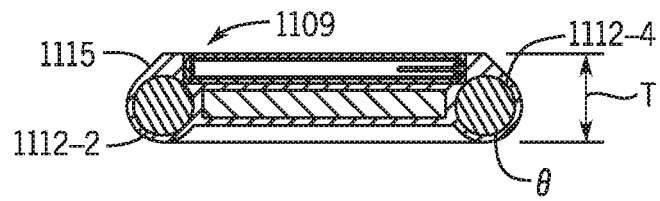
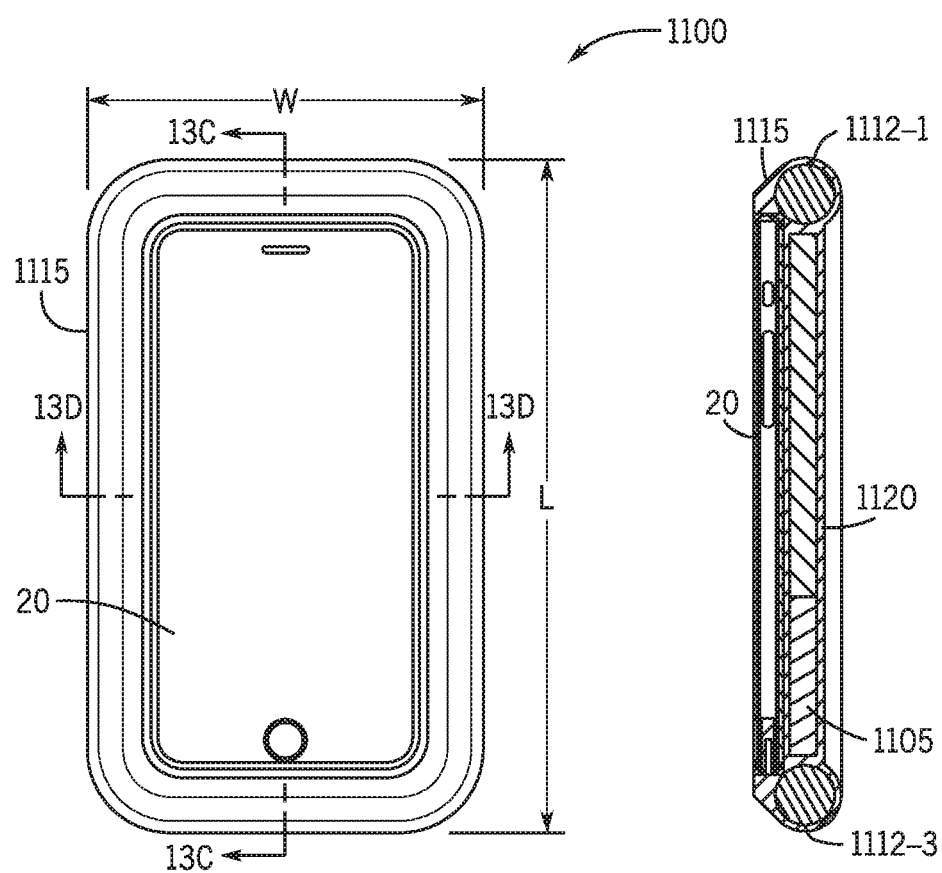
FIG. 14A
FIG. 14B
FIG. 14C

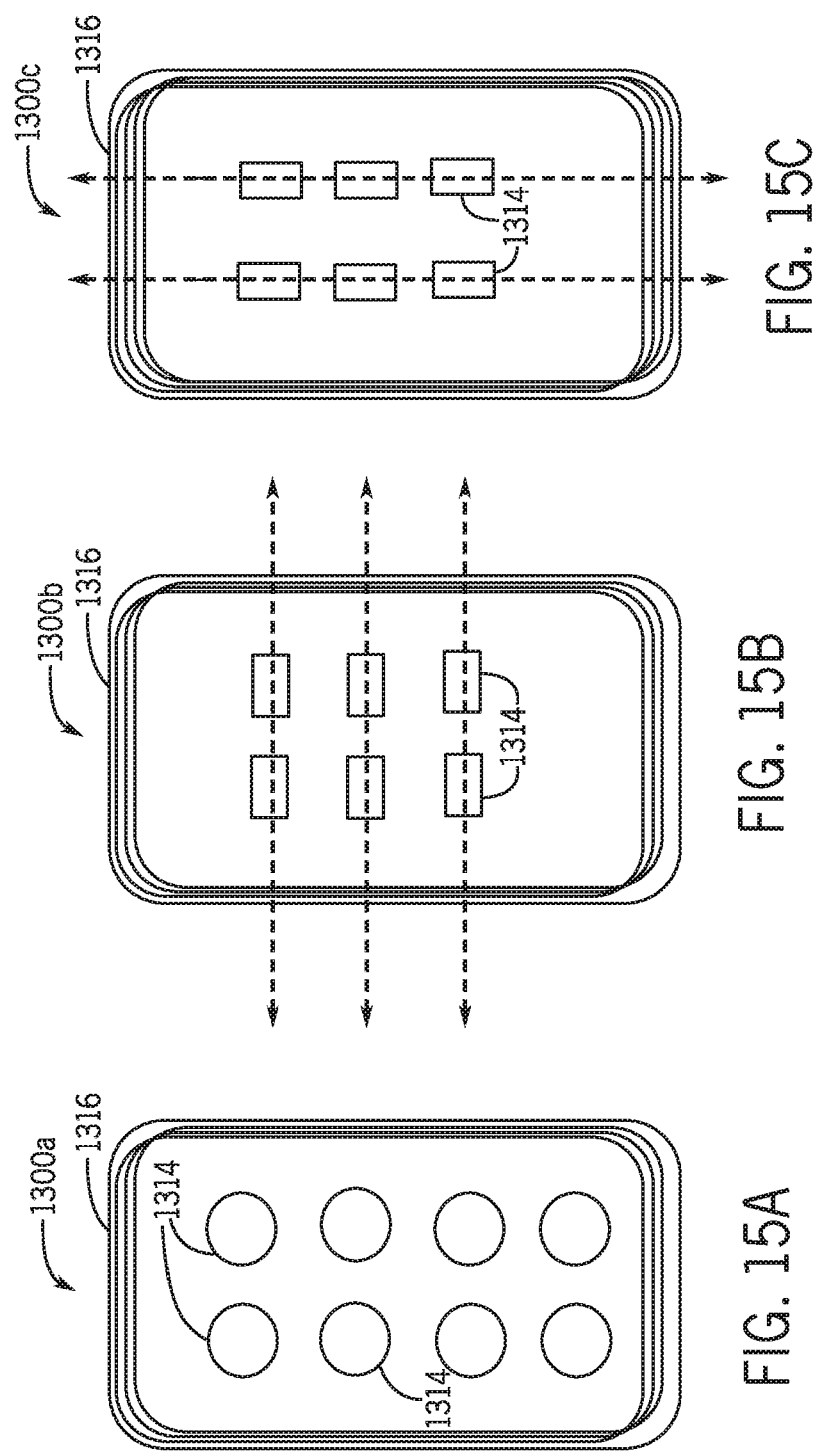

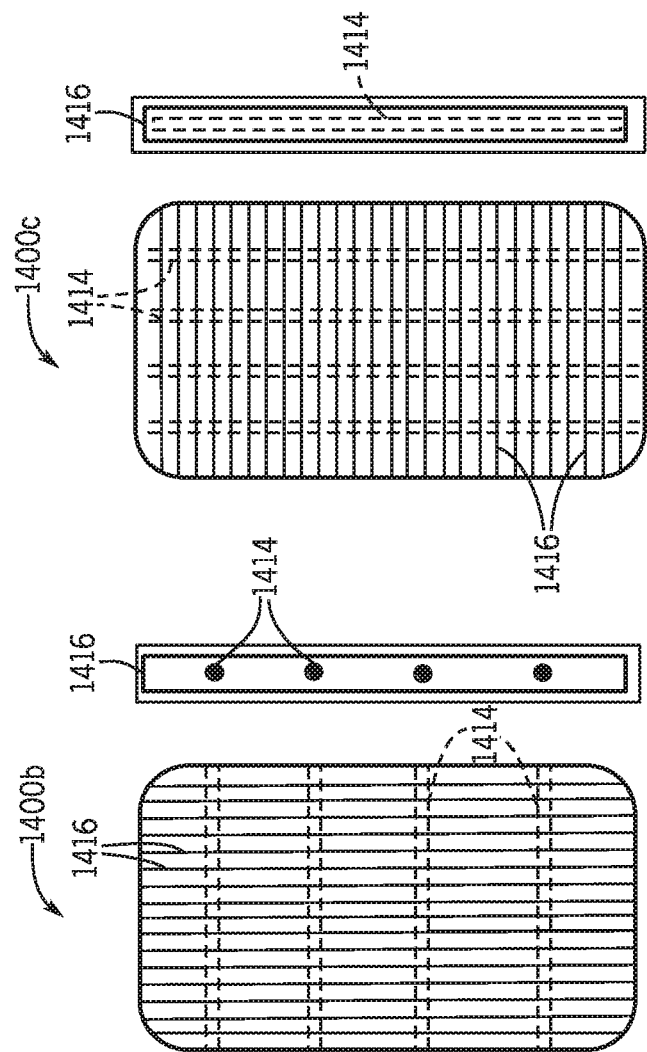
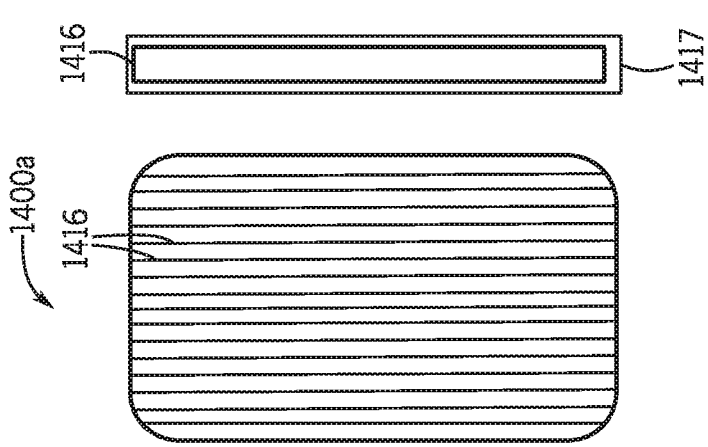
FIG. 16C
FIG. 16B
FIG. 16A

HEARING AID ADAPTED FOR WIRELESS POWER RECEPTION

CROSS REFERENCE TO RELATED APPLICATIONS

This application is a continuation of pending U.S. patent application Ser. No. 15/337,796 filed Oct. 28, 2016. The aforementioned application is incorporated herein by reference, in its entirety, for any purpose.

U.S. patent application Ser. No. 15/337,796 claims the benefit under 35 U.S.C. § 119(e) of the earlier filing date of U.S. Provisional Application 62/247,883 entitled "Mobile Wireless Power Transfer Hearing System Aid System," filed Oct. 29, 2015, and which provisional application is hereby incorporated by reference in its entirety for any purpose.

U.S. patent application Ser. No. 15/337,796 claims the benefit under 35 U.S.C. § 119(e) of the earlier filing date of U.S. Provisional Application 62/249,051 entitled "Mobile Wireless Energy Transfer System Comprising a Wire Wrapped Magnetic Material Core," filed Oct. 30, 2015, and which provisional application is hereby incorporated by reference in its entirety for any purpose.

U.S. patent application Ser. No. 15/337,796 claims the benefit under 35 U.S.C. § 119(e) of the earlier filing date of U.S. Provisional Application 62/252,645 entitled "Dual Purpose Receiving Coil for Hearing Aids," filed Nov. 9, 2015, and which provisional application is hereby incorporated by reference in its entirety for any purpose.

U.S. patent application Ser. No. 15/337,796 claims the benefit under 35 U.S.C. § 119(e) of the earlier tiling date of U.S. Provisional Application 62/254,836 entitled "Dual Purpose Receiving Hearing Aid Coil," filed Nov. 13, 2015, and which provisional application is hereby incorporated by reference in its entirety for any purpose.

U.S. patent application Ser. No. 15/337,796 claims the benefit under 35 U.S.C. § 119(e) of the earlier filing date of U.S. Provisional Application 62,255,624 entitled "Advanced Mobile Wireless Energy Transfer System Comprising a Wire Wrapped Magnetic Material Core," filed Nov. 16, 2015, and which provisional application is hereby incorporated by reference in its entirety for any purpose.

U.S. patent application Ser. No. 15/337,796 claims the benefit under 35 U.S.C. § 119(e) of the earlier filing date of U.S. Provisional Application 62/279,521 entitled "Wireless Power Charging With Remote Transmitter," filed Jan. 15, 2016, and which provisional application is hereby incorporated by reference in its entirety for any purpose.

U.S. patent application Ser. No. 15/337,796 claims the benefit under 35 U.S.C. § 119(e) of the earlier filing date of U.S. Provisional Application 62/287,361 entitled "Safe Wireless Power Transfer for Implants," filed Jan. 26, 2016, and which provisional application is hereby incorporated by reference in its entirety for any purpose.

U.S. patent application Ser. No. 15/337,796 claims the benefit under 35 U.S.C. § 119(e) of the earlier filing date of U.S. Provisional Application 62/293,975 entitled "Positioned Multiple Coil Transmitter," filed Feb. 11, 2016, and which provisional application is hereby incorporated by reference in its entirety for any purpose.

TECHNICAL FIELD

Examples described herein relate to systems and methods for wirelessly powering a hearing aid and/or charging a battery-powered hearing aid.

BACKGROUND

In many modern hearing aids, the space available within the hearing aid device is usually quite limited and designers of such products are loath to add more components to provide wireless power or charging to the hearing aid. This is particularly true for hearing aids placed within the ear canal, where space is a premium.

Normally, a hearing aid picks up sound with its microphone then amplifies the sound for the wearer to hear that sound more clearly. In many modem hearing aids, a telecoil is used as the input source instead of (or in addition to) the microphone, such as to improve hearing aid function when a person is using a telephone with a dynamic speaker. In this manner, the hearing aid can pick up a magnetic signal which represents sound produce by the speaker in the phone. In some cases, a telecoil is employed to bypass the microphone in the hearing aid to avoid a feedback between the microphone and the telephone speaker when the hearing aid wearer is speaking on a telephone. This is accomplished by avoiding the sound from the speaker in the phone from being picked up by the microphone by muting the microphone circuit and instead using the telecoil to pick up the magnetic field variations from the telephone speaker and using that signal for the audio input of the hearing aid system.

SUMMARY

Examples of hearing aids and hearing aid systems are described herein. An example system may include a hearing aid and a base unit. The hearing aid may include a microphone configured to detect ambient sounds, and audio processing circuitry including an amplifier operatively coupled to the microphone to receive signals corresponding to the ambient sounds and amplify the signals, and a speaker configured to receive the amplified signals and generate an amplified sound corresponding to the amplified signal. The hearing aid may further include power supply circuitry configured to power the microphone, the amplifier, and the speaker, a receiver operatively coupled to the audio processing circuitry and the power supply circuitry, wherein the receiver comprises at least one receiving coil configured to receive radiofrequency (RF) signals, and a switching circuit configured to generate first signals responsive to RF signals in a first frequency range and couple the first signals to the audio processing circuitry and further configured to generate second signals responsive to RF signals in a second frequency range and couple the second signals to the power supply circuitry. In some examples, the at least one receiving coil may include a telecoil, a communication coil, or a combination of the two. In some examples, either one of the telecoil and the communication coil may be configured to receive signals for wireless power reception in addition to other functionality provided by the coils (e.g., audio reception, data reception, etc.)

In yet further examples, a hearing aid may include a microphone configured to detect ambient sounds, and audio processing circuitry including an amplifier operatively coupled to the microphone to receive signals corresponding to the ambient sounds and amplify the signals, and a speaker configured to receive the amplified signals and generate an amplified sound corresponding to the amplified signal. The hearing aid may include power supply circuitry configured to power the microphone, the amplifier, and the speaker. The hearing aid may further include, a receiver operatively coupled to the audio processing circuitry and the power supply circuitry, wherein the receiver comprises a receiving coil configured to receive radiofrequency (RF) signals, wherein the receiving coil comprises a magnetic metal core, a first winding connected to the audio processing circuitry, and a second winding connected to the power supply circuitry, wherein the first winding is configured to tune the receiving coil to receive signals in a first frequency range and the second winding is configured to tune the receiving coil to receive signals in a second higher frequency range.

In some examples, the base unit may include a transmitter configured to transmit radio signals in the second frequency range. Signals transmitted from the base unit in the second frequency range may be used to power and/or recharge the hearing aid.

BRIEF DESCRIPTION OF THE DRAWINGS

Features, aspects and attendant advantages of the present invention will become apparent from the following detailed description of various embodiments, including the best mode presently contemplated of practicing the invention, when taken in conjunction with the accompanying drawings, in which:

FIGS. 9A-9E illustrate views of a base unit according to some examples of the present disclosure;

FIG. 10A-10C illustrate views of a base unit implemented in the form of a case for a communication device, such as a tablet;

FIGS. 11A-11D illustrate views of a base unit implemented as a partial case for a communication device;

FIGS. 14A-14C illustrate views of the base unit in FIG. 13;

FIGS. 15A-15C illustrate arrangements of transmitting coils of base units according to examples of the present disclosure;

FIGS. 16A-16C illustrate arrangements of transmitting coils of base units according to further examples of the present disclosure;

DETAILED DESCRIPTION

Systems, methods and apparatuses for wirelessly powering electronic devices, for example a hearing aid, are described. Systems and methods in accordance with the examples herein may provide wireless power at greater distance separation between the power transmitting and receiving coils than commercially available systems. Additional advantages may be improved thermal stability and orientation freedom, as will be described further below.

According to some examples herein, a wireless power transfer system, and more specifically a weakly resonant system with relatively broad resonance amplification with moderate frequency dependence, is described. In accordance with some examples herein, dependence on the relative sizes of the inductive coils and orientation between the coils may be reduced as compared to such dependence on coil sizes and orientation typically found in commercially available systems with strong resonant coupling at Q factors exceeding 100. In some examples according to the present disclosure, wireless power transfer systems may operate at Q value less than 100. Unlike commercially available systems, which typically use air core coils, according to some examples herein, the shape of the magnetic field between the coils may be augmented, for example by using a medium with high permeability such as ferrite. According to some examples, guided flux or partially guided flux may be used to improve the performance of the system in a given orientation. An appropriate frequency, for example a body safe frequency, is used for power broadcast. The broadcast frequency may be tuned to reduce losses that may result from shielding effects.

Figure 1:
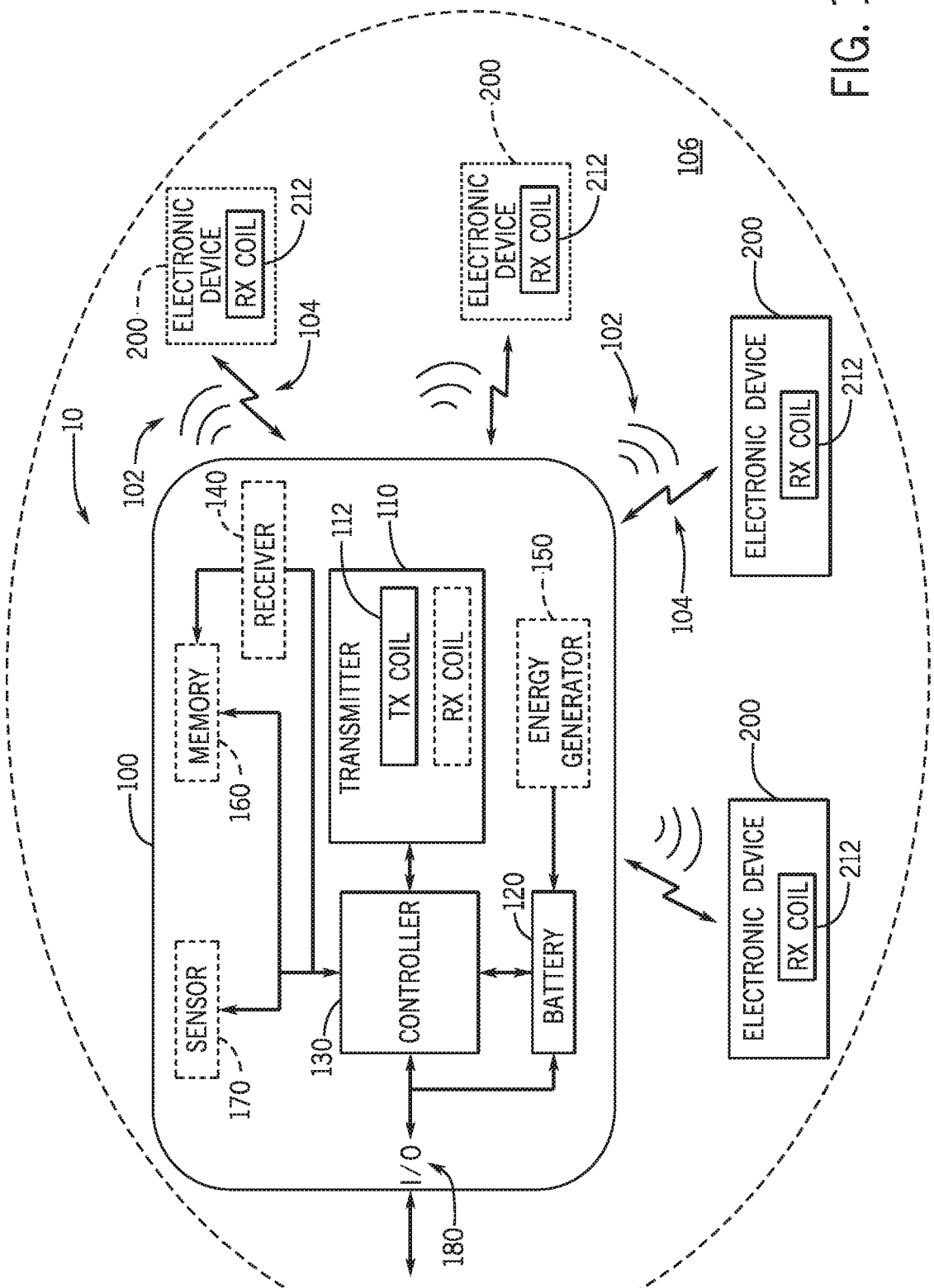
FIG. 1 illustrates a block diagram of a system according to examples of the present disclosure.

FIG. 1 shows a block diagram of a system for wirelessly powering one or more electronic devices according to some examples of the present disclosure. The system 10 includes a base unit 100 and one or more electronic devices 200. The base unit 100 is configured to wirelessly provide power to one or more of the electronic devices 200, which may be separated from the base unit by a distance. In some examples, the distance may be 0.5 mm, 1 mm, 2 mm, 5 mm, 10 mm, 20 mm, 30 mm, 50 mm or greater. The base unit 100 is configured to provide power wirelessly to an electronic device 200 while the electronic device remains within a threshold distance (e.g., a charging range or charging zone 106) of the base unit 100. The base unit 100 may be configured to selectively transmit power wirelessly to any number of electronic devices (e.g., 1, 2, 3, 4, 5, 6, 7, 8, 9, or 10 although a greater number than 10 devices may be charged in some examples) detected to be within a proximity (e.g., within the charging range) of the base unit 100. Although the electronic device 200 may typically be charged (e.g., coupled to the base unit for charging) while being distance-separated from the base unit 100, it is envisioned and within the scope of this disclosure that the base unit 100 may operate to provide power wirelessly to an electronic device 200 when the electronic device 200 is adjacent to or in contact with the base unit 100. In some examples, the base unit may be mechanically disconnected or decoupled from the electronic device to which the base unit is capable of transmitting power. That is, in some examples, the base unit is movable with respect to the electronic device while the base unit is transmitting power to the electronic device.

The base unit 100 may include a transmitter 110, a battery 120, and a controller 130. The transmitter 110 includes at least one transmitting coil 112 (interchangeably referred to as Tx coil). The transmitting coil 112 may include a magnetic core with conductive windings. The windings may include copper wire (also referred to as copper windings). In some examples, the copper wire may be monolithic copper wire (e.g., single-strand wire). In some examples, the copper wire may be multi-strand copper wire (e.g., Litz wire), which may reduce resistivity due to skin effect in some examples, which may allow for higher transmit power because resistive losses may be lower. In some examples, the magnetic core may be a ferrite core (interchangeably referred to as ferrite rod). The ferrite core may comprise a medium permeability ferrite, for example 78 material supplied by Fair-Rite Corporation. In some examples, the ferrite core may comprise a high permeability material, such as Vitroperm 500F supplied by Vacuumschmelze in Germany. Ferrite cores comprising other ferrite materials may be used. In some examples, the ferrite may have a medium permeability of micro-i ($\mu$) of about 2300. In some examples, the ferrite may have permeability of micro-i ($\mu$) ranging from about 200 to about 5000. In some examples, different magnetic material may be used for the magnetic core. Generally, transmitting coils described herein may utilize magnetic cores which may in some examples shape the field provided by the transmitting coil, as the field lines preferentially go through the magnetic core, in this manner, partially guided flux may be used where a portion of the flux is guided by the magnetic core.

The transmitting coil 112 may be configured to inductively couple to a receiving coil 210 in the electronic device 200. In this manner, power may be transmitted from the transmitting coil. 112 to the receiving coil 210 (e.g. through inductive coupling). In some examples, the transmitter 110 may be additionally configured as a receiver and may thus be interchangeably referred to as transmitter/receiver. For example, the transmitting coil of the transmitter/receiver may additionally be configured as a receiving coil. In some examples, the transmitter/receiver may additionally include a receiving coil. In yet further examples, the base unit may include a separate receiver 140 comprising a receiving coil. The transmitter/receiver or separate receiver of the base unit may be configured to wirelessly receive power (102) and/or data (104) as will be further described below.

In some examples, the transmitter 110 may include a single transmitting coil 112. The transmitting coil 112 may be placed in an optimal location and/or orientation to provide an optimum charging zone 106. In some examples, the transmitting coil may be placed in a location within the base unit selected to provide a large number of charging opportunities during a typical use of the device. For example, the transmitting coil 112 may be placed near a side of the base unit which most frequently comes in proximity to an electronic device (e.g., a top side of a base unit implemented as a mobile phone case as illustrated in the example in FIG. 6).

In some examples, the transmitter 110 includes a plurality of transmitting coils 112. The transmitting coils 112 may be arranged in virtually any pattern. For example, the base unit may include a pair of coils which are angled to one another. In some examples, the coils may be arranged at angles smaller than 90 degrees, for example ranging between 15-75 degrees. In some examples, the coils may be arranged at 45 degrees relative to one another. Other combinations and arrangements may be used, examples of some of which will be further described below.

In some examples, the transmitting coils may be arranged to provide a nearly omnidirectional charging zone 106 (also referred to as charging sphere or hotspot). The charging zone 106 of the base unit may be defined by a three dimensional space around the base unit which extends a threshold distance from the base unit in all three directions (e.g., the x, y, and z directions). Although a three dimensions (3D) space corresponding to a charging range of the base unit may be referred to herein as a sphere, it will be understood that the three dimensions (3D) space corresponding to a charging range need not be strictly spherical in shape. In some examples, the charging sphere may be an ellipsoid or a different shape.

Efficiency of wireless power transfer within the charging zone 106 may be variable, for example, depending on a particular combination of transmitting and receiving coils and/or a particular arrangement of the coils or relative arrangements of the coils in the base unit and electronic device(s). The one or more transmitting coils 112 may be arranged within a housing of the base unit in a manner which improves the omni-directionality of the charging zone 106 and/or improves the efficiency of power transmission within the zone 106. In some examples, one or more transmitting coils 112 may be arranged within the housing in a manner which increases the opportunities for charging during typical use of the base unit. For example, the transmitting coil(s) may extend, at least partially, along one or more sides of the base unit which are most brought near an electronic device (e.g., the top or sides of a mobile phone case base unit which may frequently be moved in proximity with a wearable electronic device such as eyewear camera or a digital wrist watch). In some examples, the base unit may be placed on a surface (e.g., a table or desk) during typical use and electronic devices may be placed around the base unit. In such examples, the transmitting coil(s) may be arranged along a perimeter of the base unit housing.

In some examples, the base unit may be attached to a mobile phone via an attachment mechanism such as adhesive attachment, an elastic attachment, a spring clamp, suction cup(s), mechanical pressure, or others. In some examples, the base unit may be enclosed or embedded in an enclosure (also referred to as housing), which may have a generally planar shape (e.g., a rectangular plate). An attachment mechanism may be coupled to the housing such that the base unit may be removably attached to a mobile phone, a table, or other communication device. In an example, the attachment mechanism may be a biasing member, such as a clip, which is configured to bias the mobile phone towards the base unit in the form of, by way of example only, a rectangular plate. For example, a clip may be provided proximate a side of the base unit and the base unit may be attached to (e.g., clipped to) the mobile phone via the clip in a manner similar to attaching paper or a notebook/notepad to a clip board. In some examples, the base unit may be adhesively or elastically attached to the communication device and/or to a case of the communication device.

In further examples, the base unit may be separate from the communication device. In yet further examples, the base unit may be incorporated into (e.g., integrated into) the communication device. For example, the transmitter 110 may be integrated with other components of a typical mobile phone. The controller 130 may be a separate IC in the mobile phone or its functionality may be incorporated into the processor and/or other circuitry of the mobile phone. Typical mobile phones include a rechargeable battery which may also function as the battery 120 of the base unit. In this manner, a mobile phone may be configured to provide power wirelessly to electronic devices, such as a separated electronic wearable devices.

As previously noted, the base unit 100 may include a battery 120. The battery 120 may be a rechargeable battery, such as a Nickel-Metal Hydride (NiMH), a Lithium ion (Li-ion), or a Lithium ion polymer (Li-ion polymer) battery. The battery 120 may be coupled to other components to receive power. For example, the battery 120 may be coupled to an energy generator 150. The energy generator 150 may include an energy harvesting device which may provide harvested energy to the battery for storage and use in charging the electronic device(s). Energy harvesting devices may include, but not be limited to, kinetic-enemy harvesting devices, solar cells, thermoelectric generators, or radio-frequency harvesting devices. In some examples, the battery 120 may be coupled to an input/output connector 180 such as a universal serial bus (USB) port. It will be understood that the term USB port herein includes any type of USB interface currently known or later developed, for example mini and micro USB type interfaces. Other types of connectors, currently known or later developed, may additionally or alternatively be used. The I/O connector 180 (e.g., USB port) may be used to connect the base unit 100 to an external device, for example an external power source or a computing device (e.g., a personal computer, laptop, tablet, or a mobile phone.

The transmitter 110 may be operatively coupled to the battery 120 to selectively receive power from the battery and wirelessly transmit the power to the electronic device 200. As described herein, in some examples, the transmitter may combine the functionality of transmitter and receiver. In such examples, the transmitter may also be configured to wirelessly receive power from an external power source. In some examples, the base unit may be an intermediate base unit, which may include a capacitor (e.g., a supercapacitor) in addition to or instead of a battery. The intermediate base unit may be configured to store a small amount of power received e.g., from another base unit which is then rebroadcast to be received by an electronic device in proximity. In this regard, the intermediate base unit may act as an intermediary component or a repeater which may increase the charging zone of a main base unit. In some examples, the base unit may be configured such that during transmission of power from the base unit, power may be wirelessly received by any electronic devices within proximity (e.g., within the broadcast distance of the transmitter).

The transmitter 110 may be weakly-coupled to a receiver in the electronic device 200 in some examples. There may not be a tight coupling between the transmitter 110 and the receiver in the electronic device 200. Highly resonant coupling may be considered tight coupling. The weak (or loose) coupling may allow for power transmission over a distance (e.g. from a base unit in or on a mobile phone to a wearable device on eyewear or from a base unit placed on a surface to a wearable device placed on the surface in a neighborhood of, but not on, the base unit). So, for example, the transmitter 110 may be distance separated from the receiver. The distance may be greater than 1 mm in some examples, greater than 10 mm in some examples, greater than 100 mm in some examples, and greater than 1000 mm in some examples. Other distances may be used in other examples, and power may be transferred over these distances.

The transmitter 110 and the receiver in the electronic device 200 may include impedance matching circuits each having an inductance, capacitance, and resistance. The impedance matching circuits may function to adjust impedance of the transmitter 110 to better match impedance of a receiver under normal expected loads, although in examples described herein the transmitter and receiver may have transmit and receive coils, respectively, with different sizes and/or other characteristics such that the impedance of the receiver and transmitter may not be matched by the impedance matching circuits, but the impedance matching circuits may reduce a difference in impedance of the transmitter and receiver. The transmitter 110 may generally provide a wireless power signal which may be provided at a body-safe frequency, e.g. less than 500 kHz in some examples, less than 300 kHz in some examples, less than 200 kHz in some examples, less than 125 kHz in some examples, less than 100 kHz in some examples, although other frequencies may be used. It may be desirable to utilize a frequency which is not regulated, or not heavily regulated. For example, a frequency less than 300 kHz in some examples.

Transmission/broadcasting of power may be selective in that a controller controls when power is being broadcast. The base unit may include a controller 130 coupled to the battery 120 and transmitter 110. The controller 130 may be configured to cause the transmitter 110 to selectively transmit power, as will be further described. A charger circuit may be connected to the battery 120 to protect the battery from overcharging. The Charger circuit may monitor a level of charge in the battery 120 and turn off charging when it detects that the battery 120 is fully charged. The functionality of the charger circuit may, in some examples, be incorporated within the controller 130 or it may be a separated circuit (e.g., separate IC chip).

In some examples, the base unit may include a memory 160. The memory 160 may be coupled to the transmitter 110 and/or any additional transmitters and/or receivers (e.g., receiver 140) for storage of data transmitted to and from the base unit 100. For example, the base unit 100 may be configured to communicate data, such as image data, wirelessly to and from the electronic device 200, e.g., receive images acquired with an electronic device in the form of a wearable camera, or transmit configuration data to the electronic device. In some examples, the data may include configuration parameters for or associated with the electronic device. For example, the base unit may be configured to receive and transmit to the electronic device (e.g., a hearing aid) parameters or settings for configuring the hearing aid or controlling operation of the hearing aid. In some examples, the base unit may be configured to receive data from the hearing aid. In some examples, the memory 160 may be integrated within the transmitter. In some examples, the memory may be a buffer which only temporarily stores data received from one electronic device before it is retransmitted to another electronic device. The base unit may include one or more sensors 170, which may be operatively coupled to the controller. A sensor 170 may detect a status of the base unit such that the transmitter may provide power selectively and/or adjustably under control from controller 130.

The electronic device 200 may be configured to provide virtually any functionality, for example an electronic device configured as a wearable camera, an image display, an audio system, a hearing aid, or any smart device. In addition to circuitry adapted to perform the specific function of the electronic device, the electronic device 200 may further include circuitry associated with wireless charging. The electronic device 200 may include at least one receiving coil 212, which may be configured to receive power from the base unit. In some examples, the receiving coil 212 may be operatively coupled to a rechargeable power cell onboard the electronic device 200 such that the electronic device 200 may be wirelessly recharged by the base unit. In other examples, the electronic device 200 may not include a battery and may instead be configured to be powered wirelessly by a base unit in proximity. In some examples, the receiving coil 212 of such electronic device may be operatively coupled to a capacitor to receive and temporarily store power for operation of the electronic device 200 until the electronic device can again be positioned in proximity of a base unit.

Frequent charging in a manner that is non-invasive or minimally invasive to the user during typical use of the electronic device may be achieved via wireless coupling between the receiving and transmitting coils in accordance with the examples herein. In some examples, the electronic device may be a wearable electronic device, which may interchangeably be referred to herein as electronic wearable devices. The electronic device may have a sufficiently small form factor to make it easily portable by a user. The electronic device 200 may be attachable to clothing or an accessory worn by the user, for example eyewear. For example, the electronic device 200 (e.g., a hearing aid) may be attached to eyewear using a guide 6 (e.g., track) incorporated in or attached to the eyewear, e.g., as illustrated in FIG. 2 (only a portion of eyewear, namely the temple, is illustrated so as not to clutter the drawing).

In some examples, the base unit may additionally be configured as a booster for RF energy—e.g. way of example only, examples of base units described herein may include components that may boost RF energy such as that of Wi-Fi, Bluetooth, ZigBee, or other signals coming from, e.g. a smart phone or mobile communication system that may be inserted into and/or positioned near base units described herein. For example, the base unit may include a transceiver circuit that may pick up the RF energy, by way of example only, one of a; WIFI, Bluetooth, ZigBee signal generated by the smart phone or mobile communication system and rebroadcast the signal at higher ower levels to be, for example, picked up by a wearable electronic device. This rebroadcast can be implemented using, for example, a unidirectional antenna that predominately broadcast the energy in a direction away from the user's head when they are talking on the smart phone or mobile communication system. In some examples, a boost circuit in the base unit may increase power when wearable devices are detected by the base unit or by an application running on the smart phone or mobile communication system. In some examples controls could reside in the application running on the smart phone or mobile communication system. In addition to boosting power for energy transfer, data signals may also be amplified to improve data transfer between a wearable device and the smart phone or mobile communication system.

In some examples, the base unit may generate an RF signal with an RF generating circuit included the base unit. For example, the RF signal may be generated at a frequency consistent with a receiver in an energy harvesting circuit of a wearable device. Such a RF generating transmitter in the base unit maybe turned on, for example, by a signal from a communication system or other electronic device when, for example the communication system or other electronic device receives a message from a wearable device or other indicator that the wearable device may require additional energy that is not available from the environment to produce adequate charging current for a battery or capacitor in the wearable device.

Figure 2:
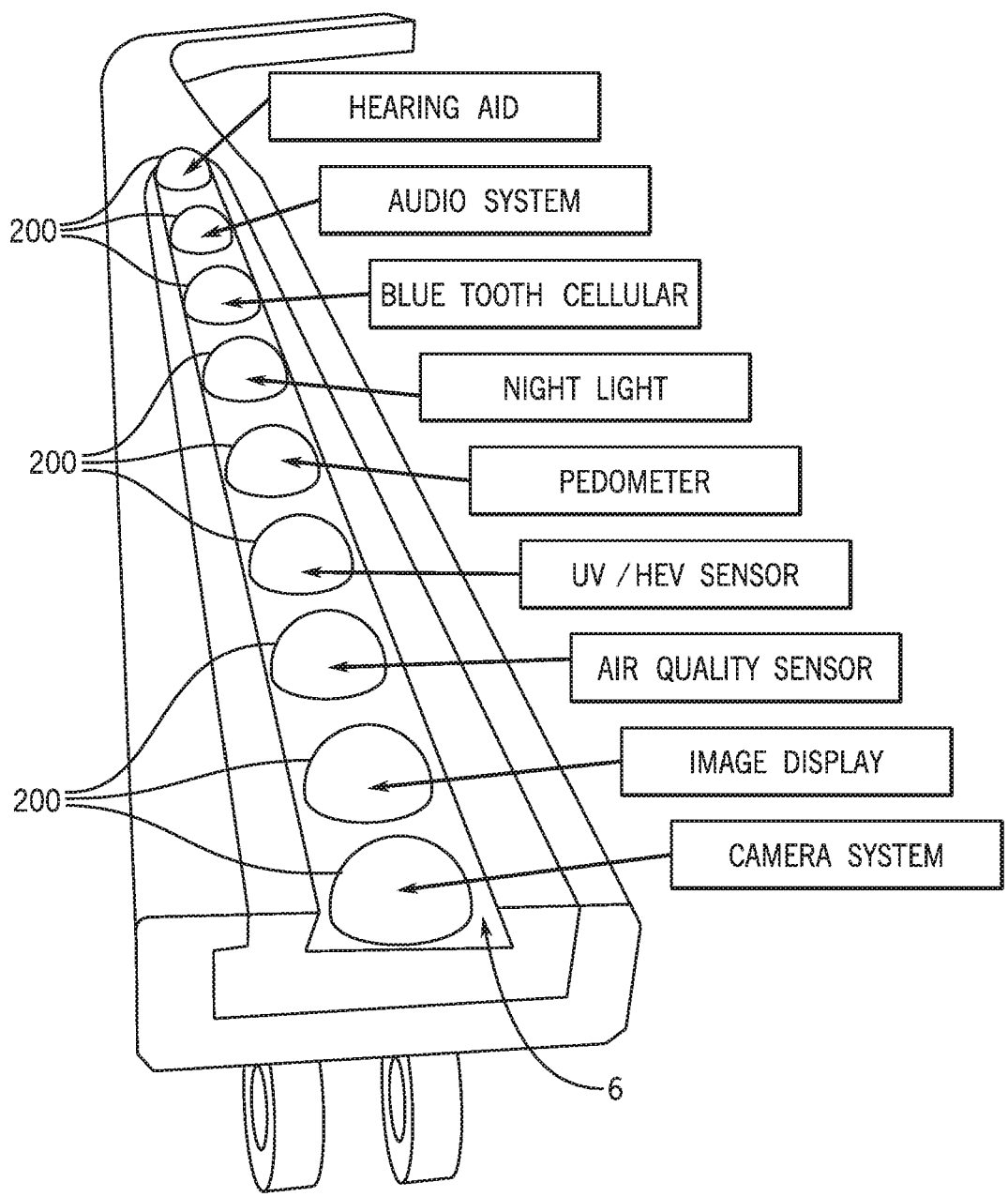
FIG. 2 illustrates examples of electronic devices attached to eyewear in accordance with the present disclosure.

FIG. 2 shows examples of electronic devices 200 which may be configured to receive power wirelessly in accordance with the present disclosure. In some examples, the electronic device may be a camera or any other type of an electronic system attached to eyewear, such as an image display system, an air quality sensor, a UV/HEV sensor, a pedometer, a night light, a blue tooth enabled communication device such as blue tooth headset or another type of audio system. In some examples, the electronic device may be worn elsewhere on the body, for example around the wrist (e.g., an electronic watch or a biometric device, such as a pedometer). In some examples, the electronic device may be at a hearing aid worn inside (e.g., a canal hearing device) or partially inside the ear (e.g., a behind-the-ear device). In some examples, the electronic device may be at least partially internal to the body, for example in the case of an implantable device (e.g., an implanted hearing aid such as COCHLEAR or the like). The electronic device 200 may be another type of electronic device other than the specific examples illustrated. The electronic device 200 may be virtually any miniaturized electronic device, for example and without limitation a camera, image capture device, IR camera, still camera, video camera, image sensor, repeater, resonator, sensor, sound amplifier, directional microphone, eyewear supporting an electronic component, spectrometer, directional microphone, microphone, camera system, infrared vision system, night vision aid, night light, illumination system, sensor, pedometer, wireless cell phone, mobile phone, wireless communication system, projector, laser, holographic device, holographic system, display, radio, GPS, data storage, memory storage, power source, speaker, fall detector, alertness monitor, geo-location, pulse detection, gaming, eye tracking, pupil monitoring, alarm, CO sensor, CO detector, CO2 sensor, CO2 detector, air particulate sensor, air particulate meter, UV sensor, UV meter, IR sensor, IR meter, thermal sensor, thermal meter, poor air sensor, poor air monitor, bad breath sensor, bad breath monitor, alcohol sensor, alcohol monitor, motion sensor, motion monitor, thermometer, smoke sensor, smoke detector, pill reminder, audio playback device, audio recorder, speaker, acoustic amplification device, acoustic canceling device, assisted hearing assisted device, informational earbuds, smart earbuds, smart ear-wearables, video playback device, video recorder device, image sensor, fall detector, alertness sensor, alertness monitor, information alert monitor, health sensor, health monitor, fitness sensor, fitness monitor, physiology sensor, physiology monitor, mood sensor, mood monitor, stress monitor, pedometer, motion detector, geo-location, pulse detection, wireless communication device, gaming device, eyewear comprising an electronic component, augmented reality system, virtual reality system, eye tracking device, pupil sensor, pupil monitor, automated reminder, light, alarm, cell phone device, phone, mobile communication device, poor air quality alert device, sleep detector, doziness detector, alcohol detector, thermometer, refractive error measurement device, wave front measurement device, aberrometer, GPS system, smoke detector, pill reminder, speaker, kinetic energy source, microphone, projector, virtual keyboard, face recognition device, voice recognition device, sound recognition system, radioactive detector, radiation detector, radon detector, moisture detector, humidity detector, atmospheric pressure indicator, loudness indicator, noise indicator, acoustic sensor, range finder, laser system, topography sensor, motor, micro motor, nano motor, switch, battery, dynamo, thermal power source, fuel cell, solar cell, kinetic energy source, thermo electric power source, smart band, smart watch, smart earring, smart necklace, smart clothing, smart belt, smart ring, smart bra, smart shoes, smart footwear, smart gloves, smart hat, smart headwear, smart eyewear, and other such smart devices. In some examples, the electronic device 200 may be a smart device. In some examples, the electronic device 200 may be a micro wearable device or an implanted device.

The electronic device 200 may include a receiver (e.g., Rx coil 212) configured to receive power wirelessly, such as power broadcast by the transmitter (e.g. Tx coil 112) of the base unit 100. The receiver may be configured to automatically receive power from the base unit when the electronic device and thus the receiver is within proximity of the base unit (e.g., when the electronic device is a predetermined distance, or within a charging range, from the base unit). The electronic device 200 may store excess power in a power cell onboard the electronic device. The power cell onboard the electronic device may be significantly smaller than the battery of the base unit. Frequent recharging of the power cell may be effected by virtue of the electronic device frequently coming within proximity of the base unit during normal use. For example, in the case of a wearable electronic device coupled to eyewear and a base unit in the form of a cell phone case, during normal use, the cell phone may be frequently brought to proximity of the user's head to conduct phone calls during which times recharging of the power cell onboard the wearable electronic device may be achieved. In some examples, the wearable electronic device may have limited or no energy storage capability and an intermediate component may be provided in proximity to receive and store the power from the base unit and retransmit the power to the wearable electronic device while the device is worn. In some examples in which the wearable electronic device is a hearing aid, an intermediate base unit may be located in proximity to the hearing aid, such as attached to a user's eyewear or to a user's body part (e.g., on the ear, on a necklace, belt, armband, neck band, headband, etc.) to receive and retransmit power from a main base unit. As described a main base unit may be portable and carried by the user (such as by virtue of being attached to a user's cell phone) and thus typically in proximity to a wearable electronic device or intermediate base unit to provide frequent opportunity for powering or charging an electronic device. In some examples, the electronic device may include an energy harvesting system.

As described, in some examples, the electronic device 200 may not include a battery and may instead be directly powered by wireless power received from the base unit 100. In some examples, the electronic device 200 may include a capacitor (e.g., a supercapacitor or an ultracapacitor) operatively coupled to the Rx coil 212.

Figure 3:
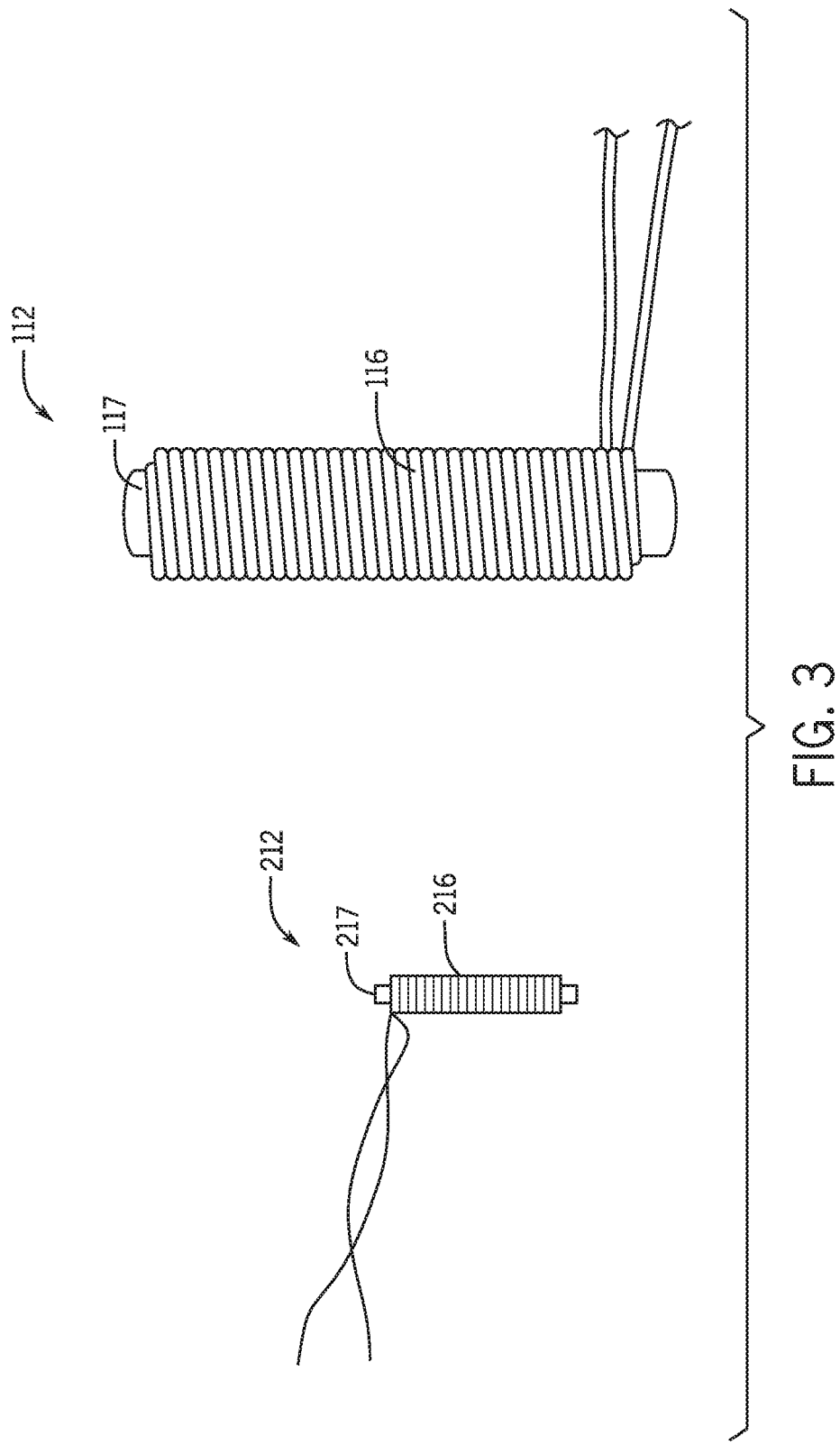
FIG. 3 illustrates an example of a receiving coil for an electronic device and a transmitting coil for a base unit in accordance with the present disclosure.

Typically in existing systems which apply wireless power transfer, transmitting and receiving coils may have the same or substantially the same coil ratios. However, given the smaller form factor of miniaturized electronic devices according to the present disclosure, such implementation may not be practical. In some examples herein, the receiving coil may be significantly smaller than the transmitting coils, e.g., as illustrated in FIG. 3. In some examples, the Tx coil 112 may have a dimension (e.g., a length of the wire forming the windings 116, a diameter of the wire forming the windings 116, a diameter of the coil 112, a number of windings 116, a length of the core 117, a diameter of the core 117, a surface area of the core 117) which is greater, for example twice or more, than a respective dimension of the Rx coil 212 (e.g., a length of the wire forming the windings 216, a diameter of the coil 212, a number of windings 216, a length of the core 217, a surface area of the core 217). In some examples, a dimension of the Tx coil 112 may be two times or greater, five times or greater, 10 times or greater, 20 times or greater, or 50 times or greater than a respective dimension of the Rx coil 212. In some examples, a dimension of the Tx coil 112 may be up to 100 times a respective dimension of the Rx coil 212. For example, the receiving coil 212 (Rx coil) may comprise conductive wire having wire diameter of about 0.2 mm. The wire may be a single strand wire. The Rx coil in this example may have a diameter of about 2.4 mm and a length of about 13 mm. The Rx coil may include a ferrite rod having a diameter of about 1.5 mm and a length of about 15 mm. The number of windings in the Rx coil may be, by way of example only, approximately 130 windings. The transmitting coil 112 (Tx coil) may comprise a conductive wire having a wire diameter of about 1.7 mm. The wire may be a multi-strand wire. The Tx coil in this example may have a diameter of about 14.5 mm and a length of about 67 mm. The Tx coil may include a ferrite rod having a diameter of about 8 mm and a length of about 68 mm. Approximately 74 windings may be used for the Tx coil. Other combinations may be used for the Tx and Rx coils in other examples, e.g., to optimize power transfer efficiency even at distances in excess of approximately 30 cm or more. In some examples, the transfer distance may exceed 12 inches. In some examples herein, the Tx and Rx coils may not be impedance matched, as may be typical in conventional wireless power transfer systems. Thus, in some examples, the Tx and Rx coils of the base unit and electronic device, respectively, may be referred to as being loosely-coupled. According to some examples, the base unit is configured for low Q factor wireless power transfer. For example, the base unit may be configured for wireless power transfer at Q factors less than 500 in some examples, less than 250 in some examples, less than 100 in some examples, less than 80 in some examples, less than 60 in some examples, and other Q factors may be used. While impedance matching is not required, examples in which the coils are at least partially impedance matched are also envisioned and within the scope of this disclosure. While the Tx and Rx coils in wireless powers transfer systems described herein may be typically loosely coupled, the present disclosure does not exclude examples in which the Tx and Rx coils are impedance matched.

The receiving coil (e.g., Rx coil 212) may include conductive windings, for example copper windings. Conductive materials other than copper may be used. In some examples, the windings may include monolithic (e.g., single-strand) or multi-strand wire. In some examples, the core may be a magnetic core which includes a magnetic material such as ferrite. The core may be shaped in the form of a rod. The Rx coil may have a dimension that is smaller than a dimension of the Tx coil, for example a diameter, a length, a surface area, and/or a mass of the core (e.g., rod) may be smaller than a diameter, a length, a surface area, and/or a mass of the core (e.g., rod) of the Tx coil. In some examples, the magnetic core (e.g., ferrite rod) of the Tx coil may have a surface area that is two greater or more than a surface area of the magnetic core (e.g., ferrite rod) of the Rx coil. In some examples, the Tx coil may include a larger number of windings and/or a greater length of wire in the windings when unwound than the number or length of wire of the windings of the Rx coil. In some examples, the length of unwound wire of the Tx coil may be at least two times the length of unwound wire of the Rx coil.

Figure 21:
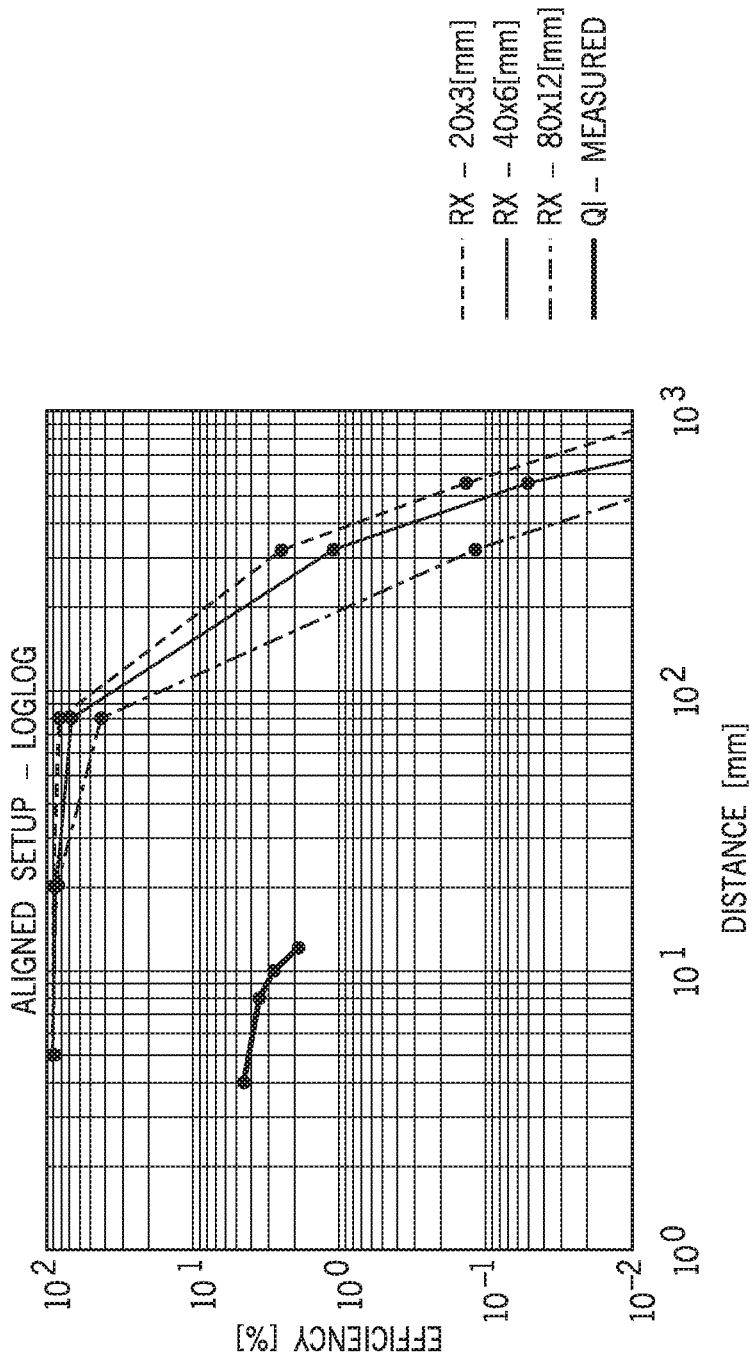
FIG. 21 illustrates a comparison between wireless power transfer systems according to some examples of the present disclosure and Qi standard systems.
Figure 22:
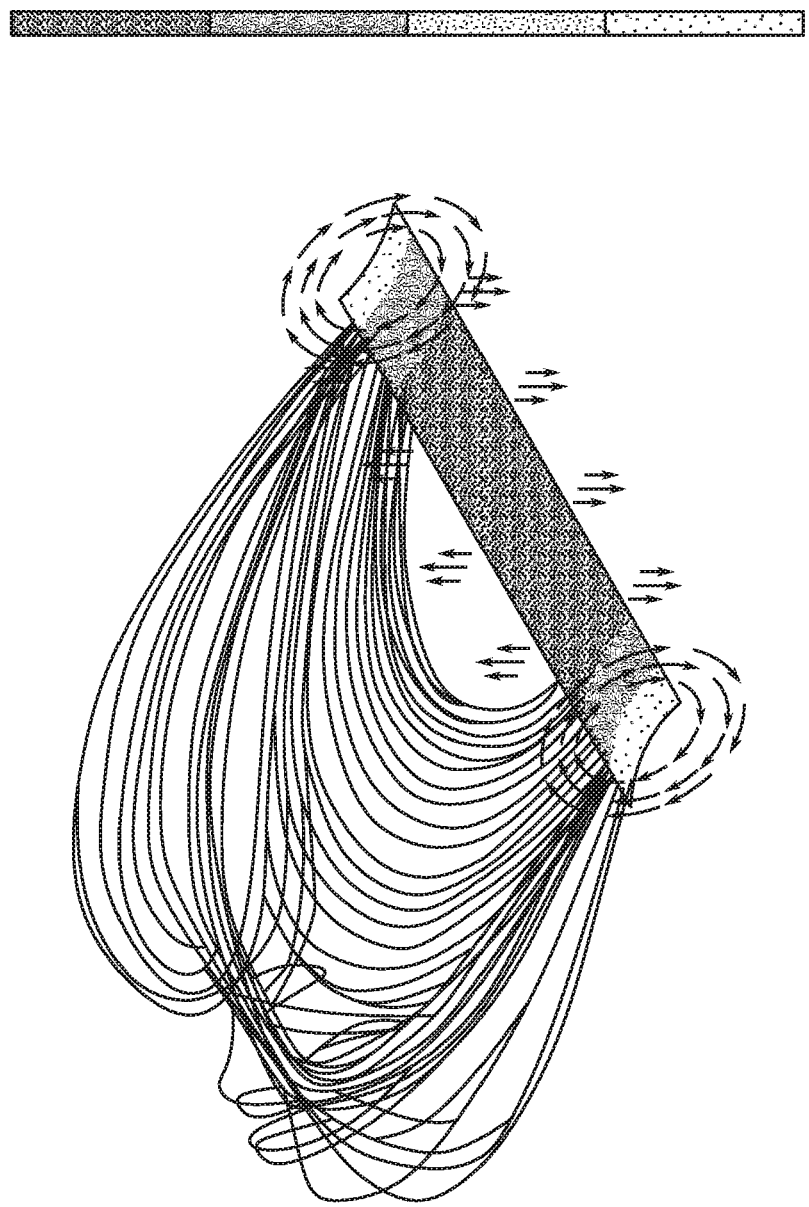
FIG. 22 illustrates magnetic field lines of inductively coupled transmitting and receiving coils in accordance with some examples herein.
Figure 23:
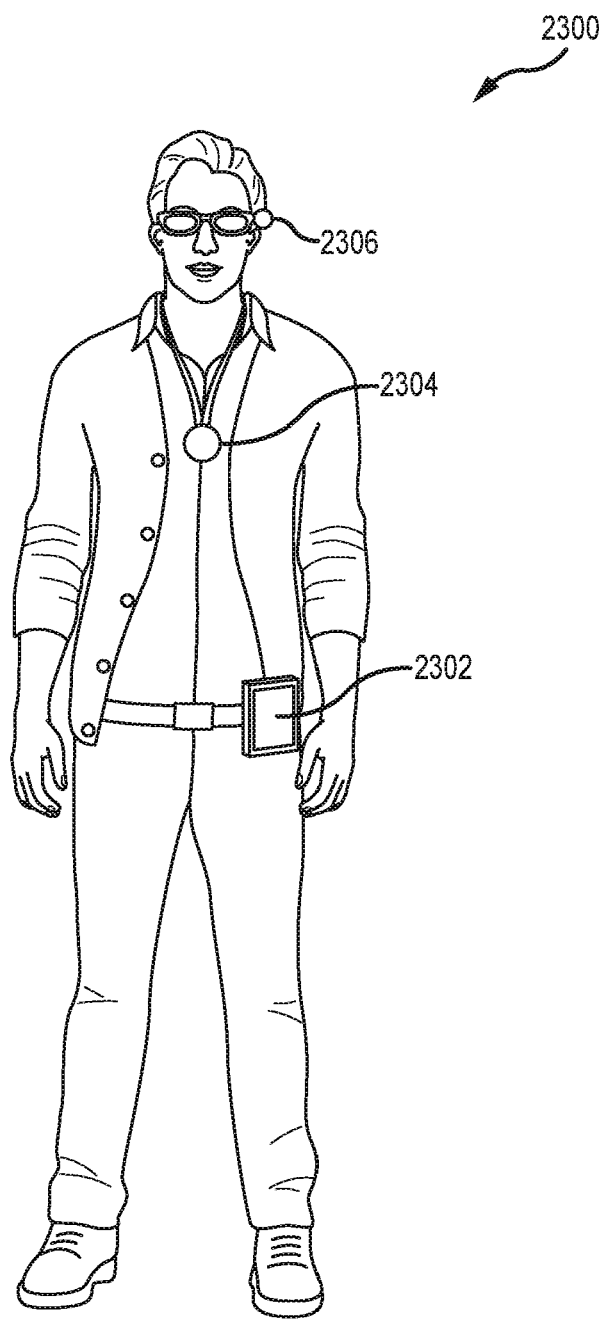
FIG. 23 is a schematic illustration of a system in accordance with examples described herein.

In some examples, an Rx coil 212 may have a length from about 10 mm to about 90 mm and a radius from about 1 mm to about 15 mm. In one example, the performance of an Rx coil 212 having a ferrite rod 20 mm in length and 2.5 mm in diameter with 150 conductive windings wound thereupon was simulated with a Tx coil 112 configured to broadcast power at frequency of about 125 KHz. The Tx coil 112 included a ferrite rod having a length of approximately 67.5 mm and a diameter of approximately 12 mm. The performance of the coils was simulated in an aligned orientation in which the coils were coaxial and in a parallel orientation in which the axes of the coils were parallel to one another, and example results of simulations performed are shown in FIGS. 21 and 22. Up to 20% transmission efficiency was obtained in the aligned orientation at distances of up to 200 mm between the coils. Some improvement was observed in the performance when the coils were arranged in a parallel orientation, in which the Rx coil continued to receive transmitted power until a distance of about 300 mm. Examples of a wireless energy transfer system according to the present disclosure were compared with efficiency achievable by a system configured in accordance with the Qi 1.0 standard. The size of the Tx coil in one simulated system was 52 mm×52 mm×5.6 mm and a size of one Rx coil simulated was 48.2 mm×32.2 mm×1.1 mm, and load impedance was 1 KOhm. Simulations were performed in an aligned configuration with several Rx coil sizes, and example results of simulations performed are shown in FIG. 23.

Figure 4:
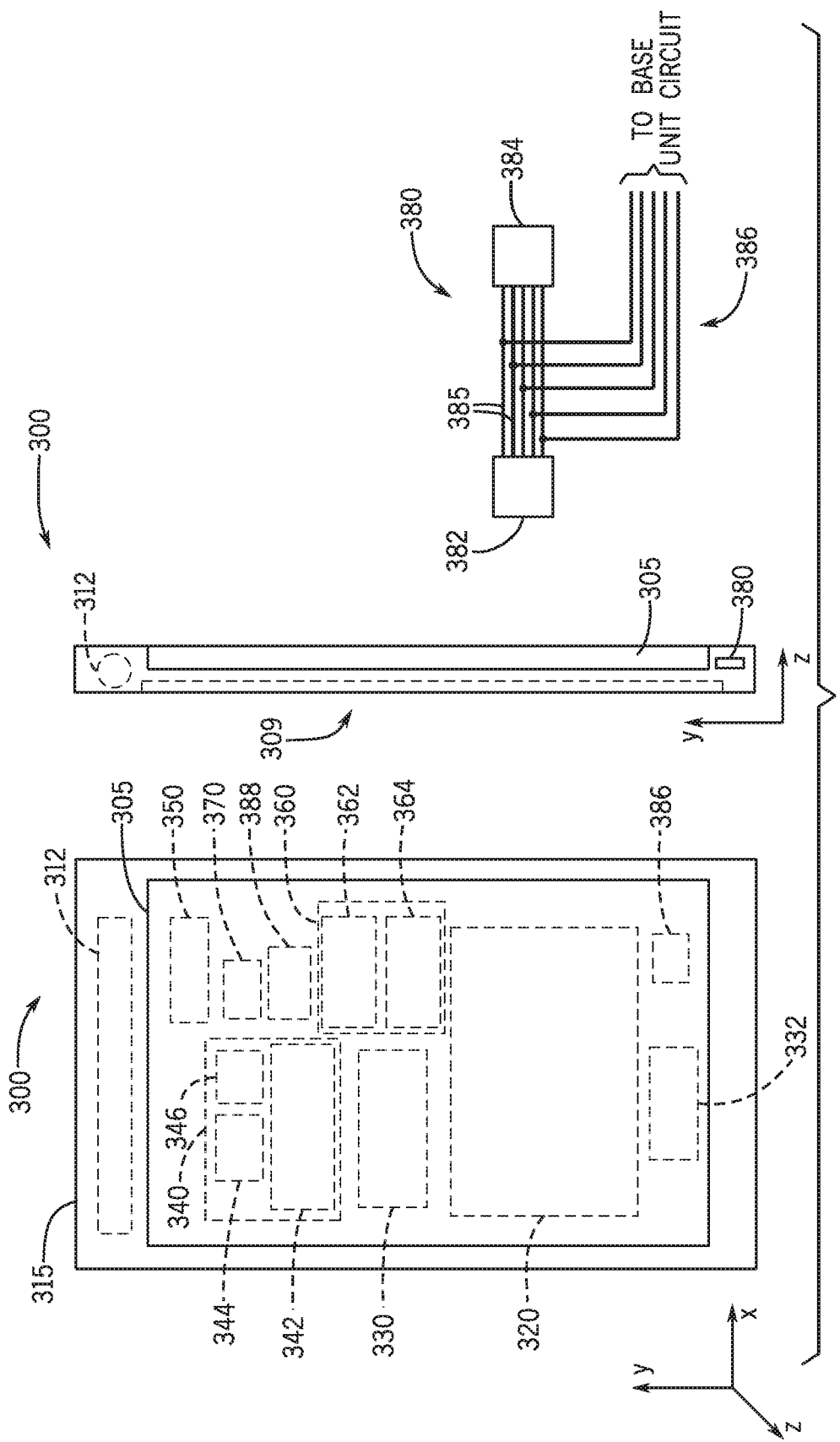
FIG. 4 illustrates a block diagram of a mobile base unit implemented in a mobile phone case form factor according to examples of the present disclosure.
Figure 5:
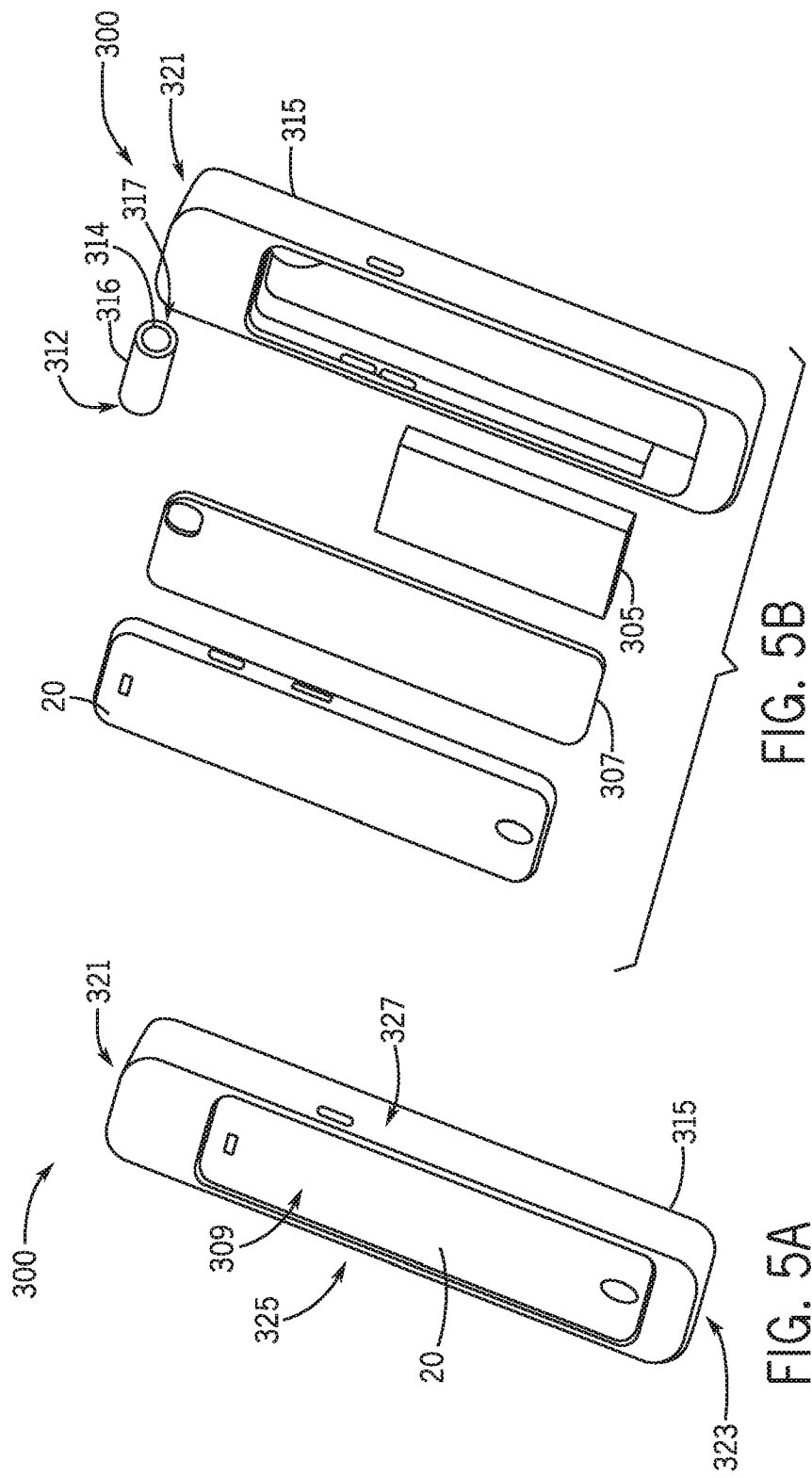
FIGS. 5A and 5B illustrate isometric and exploded isometric views of a base unit implemented as a mobile phone case according to examples of the present disclosure.

Referring now also to FIGS. 4, 5A and 53, a base unit 300 incorporated in a mobile phone case form factor will be described. The base unit 300 may include some or all of the components of base unit 100 described above with reference to FIG. 1. For example, the base unit 300 may include a transmitting coil 312 (also referred to as Tx coil). The transmitting coil 312 is coupled to an electronics package 305, which includes circuitry configured to perform the functions of a base unit in accordance with the present disclosure, including selectively and/or adjustably providing wireless power to one or more electronic devices. In some examples, the electronic device may be an electronic device which is separated from the base unit (not shown in FIGS. 5A-5B). In some examples, the electronic device may be the mobile phone 20, to which the base unit 300 in the form of a case is attached.

The base unit 300 may provide a mobile wireless hotspot (e.g., charging sphere 106) for wirelessly charging electronic devices that are placed or come into proximity of the base unit (e.g., within the charging sphere). As will be appreciated, the base unit 300 when implemented in the form of a mobile phone case may be attached to a mobile phone and carried by the user, thus making the hotspot of wireless power mobile and available to electronic devices wherever the user goes. In examples, the base unit may be integrated with the mobile phone. The hotspot of wireless power by virtue of being connected to the user's mobile phone, which the user often or always carries with him or her, thus advantageously travels with the user. As will be further appreciated, opportunities for recharging the power cell on an electronic device worn by the user are frequent during the normal use of the mobile phone, which by virtue of being use may frequently be brought into the vicinity of wearable devices (e.g., eyewear devices when the user is making phone calls, wrist worn devices when the user is browsing or using other function of the mobile phone).

Figure 17:
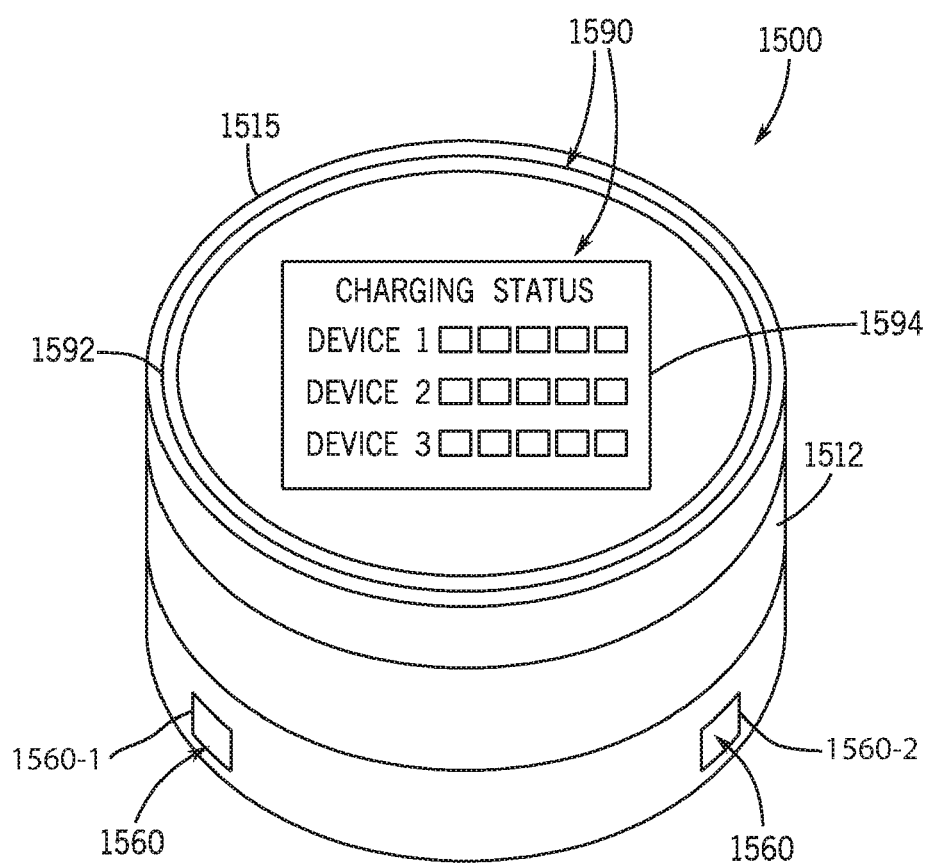
FIG. 17 illustrates a base unit in the form of a puck in accordance with further examples herein.

The Tx coil 312 and electronics (e.g., electronics package 305) may be enclosed in a housing 315. The housing 315 may have a portable form factor. In this example, the housing is implemented in the form of an attachment member configured to be attached to a communication device in this case a mobile phone (e.g., a mobile phone, a cellular phone, a smart phone, a two-way radio, and the like). In some examples, the communication device may be a tablet. In the context of this disclosure, a mobile phone is meant to include communication devices such as two way radios and walkie-talkies. For example, the housing 315 may be implemented in the form of a tablet case or cover (e.g., as illustrated in FIGS. 10A-C) or a mobile phone case or cover, e.g., as in the present example. In such examples, the base unit incorporated in the housing may power an electronic device other than the communication device. The housing 315 may include features for mechanically engaging the communication device (e.g., mobile phone 20). In further examples, the housing of the base unit may be implemented as an attachment member adapted to be attached to an accessory, such as a handbag, a belt, or others. Other form factors may be used, for example as described below with reference to FIG. 17.

In the examples in FIGS. 4 and 5A-5B, the base unit 300 includes a transmitting coil 312. The transmitting coil 312 includes a magnetic core 317 with conductive windings 316. The core 317 may be made of a ferromagnetic material (e.g., ferrite), a magnetic metal, or alloys or combinations thereof, collectively referred to herein as magnetic material. For example, a magnetic material such as ferrite and various alloys of iron and nickel may be used. The coil 312 includes conductive windings 316 provided around the core 317. It will be understood in the context of this disclosure that the windings 316 may be, but need not be, provided directly on the core 317. In other words, the windings 316 may be spaced from the core material which may be placed within a space defined by the windings 316, as will be described with reference to FIGS. 15-16. In some examples, improved performance may be achieved by the windings being wound directly onto the core as in the present example.

The core 317 may be shaped as an elongate member and may have virtually any cross section, e.g., rectangular or circular cross section. An elongate core may interchangeably be referred to as a rod 314, e.g., a cylindrical or rectangular rod. The term rod may be used to refer to an elongate core in accordance with the present application, regardless of the particular cross sectional shape of the core. The core may include a single rod or any number of discrete rods (e.g., 2, 3, 4, 5, 6, 7, 8, 9, 10 or any other number greater than 10) arranged in patterns as will be described. In the examples in FIGS. 4, 5A and 5B, without limitation, the transmitting coil comprises a single cylindrical rod positioned at least partially along a first side (e.g., top side 321) of the housing 315. In other examples, one or more coils may alternatively or additionally be positioned along other sides, e.g., a bottom side 323, the left side 325 and/or right sides 327 of the housing 315.

The electronics package 305 (interchangeably referred to as electronics or circuitry) may be embedded in the housing 315 or provided behind a cover 307. In some examples, the cover 307 may be removable. In some examples, it may be advantageous to replace the battery 320. In such examples, the battery 320 may be a separable component from the remaining circuitry. The battery 320 may be accessed by removing the cover 307. In some examples, the electronics package 305 may include a battery for storing energy from an external power source. In some examples, the base unit 300 may alternatively or additionally receive power from the mobile phone when powering the distance separated electronic device. In some examples, the base unit may not require a battery, and even smaller form factors may thus be achieved.

The base unit may be provided with one or more I/O devices 380. I/O devices may be used to receive and/or transmit power and/or data via a wired connection between the base unit and another device. For example, the base unit may include an I/O device 380 in the form of a USB connector. The I/O device 380 (e.g., USB connector) may include a first connection side 382 (e.g., a female port) for coupling the base unit to external devices (e.g., a power source such as the power grid and/or another electronic device). The I/O device 380 may include a second connection side 384 (e.g., a male connector) for coupling the base unit to the mobile phone, e.g., via a USB port of the mobile phone. One or more of the signal lines 385 of the I/O device may be coupled to power, ground, and/or data lines in the base unit circuitry. For example, if a USB connector with 5 lines is used, 2 lines may be used for data, 2 lines may be used for power, and 1 line may be coupled to ground or used for redundancy. The signal lines 385 of the first and second connection sides may be coupled to the base unit circuitry via a connector circuit 386 (e.g., USB chip). It will be understood that any other type of connectors may be used, for example, and without limitation, an APPLE LIGHTNING connector.

The base unit 300 may include a controller 330. The controller may include functionality for controlling operations of the base unit, for example controlling detection of electronic devices within proximity, selective transmission of wireless power upon detection of an electronic device, determination of status of the base unit, and selection of transmission mode depending on the status of the base unit. These functions may be implemented in computer readable media or hardwired into an ASICs or other processing hardware. The controller may interchangeably be referred to as base unit processor.

The base unit may include one or more memory devices 360. The base unit may include volatile memory 362 (e.g., RAM) and non-volatile memory 364 (e.g., EEPROM, flash or other persistent electronic storage). The base unit may be configured to receive data (e.g. user data, configuration data) through wired or wireless connection with external electronic devices and may store the data on board the base unit (e.g., in one or more of the memory devices 360). The base unit may be configured to transmit data stored onboard the base unit to external electronic devices as may be desired. In addition to user data, the memory devices may store executable instructions which, when executed by a processor (e.g., processor 360), cause the base unit to perform functions described herein.

The base unit 300 may include a charger circuit 332, which may be configured to protect the battery 320 from overcharging. The charger circuit may be a separate chip or may be integrated within the controller 330. The base unit may include a separate transmitter/receiver circuitry 340 in addition to the Tx coil 312 used for wireless power transmission. The transmitter/receiver circuitry 340 may include a receiving/transmitting coil 342, e.g., an RF coil. The transmitter/receiver circuitry 340 may further include driver circuitry 344 for transmission (e.g., RF driver circuit) and sense circuitry 346 for reception of signals (e.g., RF sensing circuit). The base unit 300 may include additional circuitry for wireless communication (e.g., communication circuit 388). The communication circuit 388 may include circuitry configured for Bluetooth, WiFi, GSM, or other communication. In some examples, the base unit 300 may include one or more sensor 370 and/or one or more energy generators 350 as described herein. Additional circuitry providing additional functionality may be included. For example, the base unit 300 may include an image processor for processing and/or enhancement of images received from a wearable camera (e.g., eyewear camera). The image processing functionality may be provided in a separate IC (e.g., a DaVinci chip set) or it may be incorporated in a processor which implements the functions of controller 330.

In some examples, the housing may be configured to be mechanically coupled to a communication device, such as a mobile phone. In the examples in FIGS. 4 and 5A-5B, the housing 315 is configured to provide the functionality of a mobile phone case. The housing may have a shape corresponding to a shape of a communication device (e.g., a mobile phone). For example, the housing may be generally rectangular in shape and may be sized to receive, at least partially, or enclose, at least partially, the communication device. In some examples, the housing may be configured to cover only one side of the communication device. In some examples, the housing may cover at least partially two or more sides of the communication device. In the examples in FIGS. 4 and 5A-5B, the housing 315 is configured to provide the functionality of a mobile phone case. The housing includes engagement features for coupling the base unit to the communication device (e.g., mobile phone). For example, a receptacle 309 may be formed in the housing for receiving the mobile phone at least partially therein. The receptacle may be on a front side of the housing. The base unit electronics may be provided proximate an opposite side of the receptacle. The coils may be placed around the perimeter of the housing, e.g. along any of the top, bottom, or left and right sides.

In some examples, systems described herein may maintain a surface temperature of components of the system to be at or below a particular level, e.g. less than 10 C above the ambient temperature for 30 minutes of continuous operation. In some examples, the surface temperature may be maintained at a level less than 5 C over the ambient temperature. Temperature maintenance may minimize or reduce an acceleration of the rate of discharge of batteries of the base unit, communication system (e.g. mobile phone), and/or wearable electronic device.

Accordingly, example base units (which may be, for example, attached to a mobile phone) may include thermal management systems to remove heat from a surface of the base unit, such as a surface of the base unit adjoining a mobile phone or other device placed on or into the base unit. Example thermal management systems may be passive, active, or a combination thereof. Active systems include (by way of example only) Peltier coolers and active flow devices such as miniature fans and electrostatic tubules. Passive systems include (by way of example only) thermally-reflective material on the appropriate surfaces, passive convection channels, heat spreaders, and similar devices, vents. Vents can be placed on any surface, but in some examples on a back surface to help reduce any temperature rise.

In some examples it may be advantageous to reduce or eliminate interference with the operation of electronic devices caused by the transmission of wireless energy. For example, such minimization may be advantageous in systems utilizing mobile phones or other devices that operate over wireless communication frequencies.

Transmit frequencies may be selected, for example, which are spaced apart from common communication bandwidths. In some examples, shielding techniques may be used that may block or reduce the transmission of certain undesired frequencies while allowing desired frequencies to pass through.

For example, power transfer may occur at one or more frequencies that may be several orders of magnitude below normal near field wireless communication frequency bands and at power levels such that several octaves of the power transmit frequency or frequencies would be too weak to interfere with communication band signals.

In some examples shielding may be applied. The shielding can be implemented using metals or other conductive materials to shield transmitted energy away from the direction of the transmitter and receiver antenna of a communication system (e.g. smart phone) mounted on or positioned near the base unit. In some cases frequency selective surfaces may be used to implement the base unit and/or mobile communication device which only pass the power transmit frequency or frequencies while blocking any multiple order of the transmit frequency that might interfere with common communication band frequencies. Shielding may be implemented using active circuitry which may absorb and retransmit energy in a desired direction. This active circuitry may be implemented as a conformal skin which includes embedded active and passive components. The conformal skin may be used to implement the base station and/or encase all or a portion of the base station. The conformal skin may be used to implement an electronic wearable device and/or encase all or a portion of the electronic wearable device. Such an approach may be used in some examples to increase efficiency of energy transfer to an intended wearable device by reducing energy absorbed by other components.

In some examples, the power transmission components of the base unit may be positioned such that they are removed physically from communication elements used for normal smart or cell phone operation the power transmission components may be placed in a base unit that is shaped to receive a smart phone in a such a way that the smart phone's communication components are physically distant from the power transmission components).

In some examples, unidirectional antenna design may be provided to reduce or eliminate interference from transmitted power energy with the traditional communication signals coming to and from a mobile phone.

In some examples, such as where a mobile phone has built in wireless charging for the mobile phone's battery, the base unit, if a separate unit from the mobile phone, may have its transmit coils located is such a manner as to allow clear transmission of the charging energy from the base unit to reach the charge coils of the phone charging system. In some examples the base unit may charge both the smart phone and the base unit batteries with the same wireless charging system. In general, design of base units to accept a particular mobile phone may provide custom designs for mechanical interfacing, an/or may be designed to work with and in conjunction with other electronic components in the mobile phone. This may include, by way of example only, charging systems connected wirelessly, or directly through connections such standard USB connections including USB type C.

In some examples, the base unit may be implemented in a subsystem of a mobile phone. In these embodiments, the base unit can be designed so as to not interfere with other subsystems of the mobile phone.

The base unit can transmit to an electronic wearable device over a distance of 6 inches or more 10 watts or less of transmitted wireless power. The base unit can transmit to an electronic wearable device over a distance of 6 inches or more 5 watts or less of transmitted wireless power. The base unit can transmit to an electronic wearable device over a distance of 6 inches or more 2 watts or less of transmitted wireless power. The base unit can transmit to an electronic wearable device over a distance of 6 inches or more a 1 watt or less of transmitted wireless power. The base unit can transmit to an electronic wearable device over a distance of 6 inches or more 1 milliwatt or less of transmitted wireless power. The base unit can transmit to an electronic wearable device over a distance of 6 inches or more 100 microwatts or less of transmitted wireless power. The electronic wearable device can transmit data to a base unit over a distance of 6 inches or more when using 1 watt or less of transmitted wireless power. The electronic wearable device can transmit data to a base unit over a distance of 6 inches or more when using 1 milliwatts or less of transmitted wireless power. The electronic wearable device can transmit data to a base unit over a distance of 6 inches or more when using 100 microwatts or less of transmitted wireless power. The electronic wearable device can transmit data to a base unit over a distance of 6 inches or more when using 10 nanowatts or more of transmitted wireless power. The electronic wearable device can transmit data to a base unit over a distance of 6 inches or more when using 10 nanowatts or less of transmitted wireless power.

The base unit can transmit to an electronic wearable device over a distance of 1 inch or more 10 watts or less of transmitted wireless power. The base unit can transmit to an electronic wearable device over a distance of 1 inch or more 5 watts or less of transmitted wireless power. The base unit can transmit to an electronic wearable device over a distance of 1 inch or more 2 watts or less of transmitted wireless power. The base unit can communicate to an electronic wearable device over a distance of 1 inch or more a 1 watt or less of transmitted wireless power. The base unit can transmit to an electronic wearable device over a distance of 1 inch or more 1 milliwatt or less of transmitted wireless power. The base unit can transmit to an electronic wearable device over a distance of 1 inch or more 100 microwatts or less of transmitted wireless power. The electronic wearable device can transmit data to a base unit over a distance of 1 inch or more when using 1 watt or less of transmitted wireless power. The electronic wearable device can transmit data to a base unit over a distance of 1 inch or more when using 1 milliwatts or less of transmitted wireless power. The electronic wearable device can transmit data to a base unit over a distance of 1inch or more when using 100 microwatts or less of transmitted wireless power. The electronic wearable device can transmit data to a base unit over a distance of 1 inch or more when using 10 nanowatts or more of transmitted wireless power. The electronic wearable device can transmit data to a base unit over a distance of 1 inch or more when using 10 nanowatts or less of transmitted wireless power.

Figure 6:
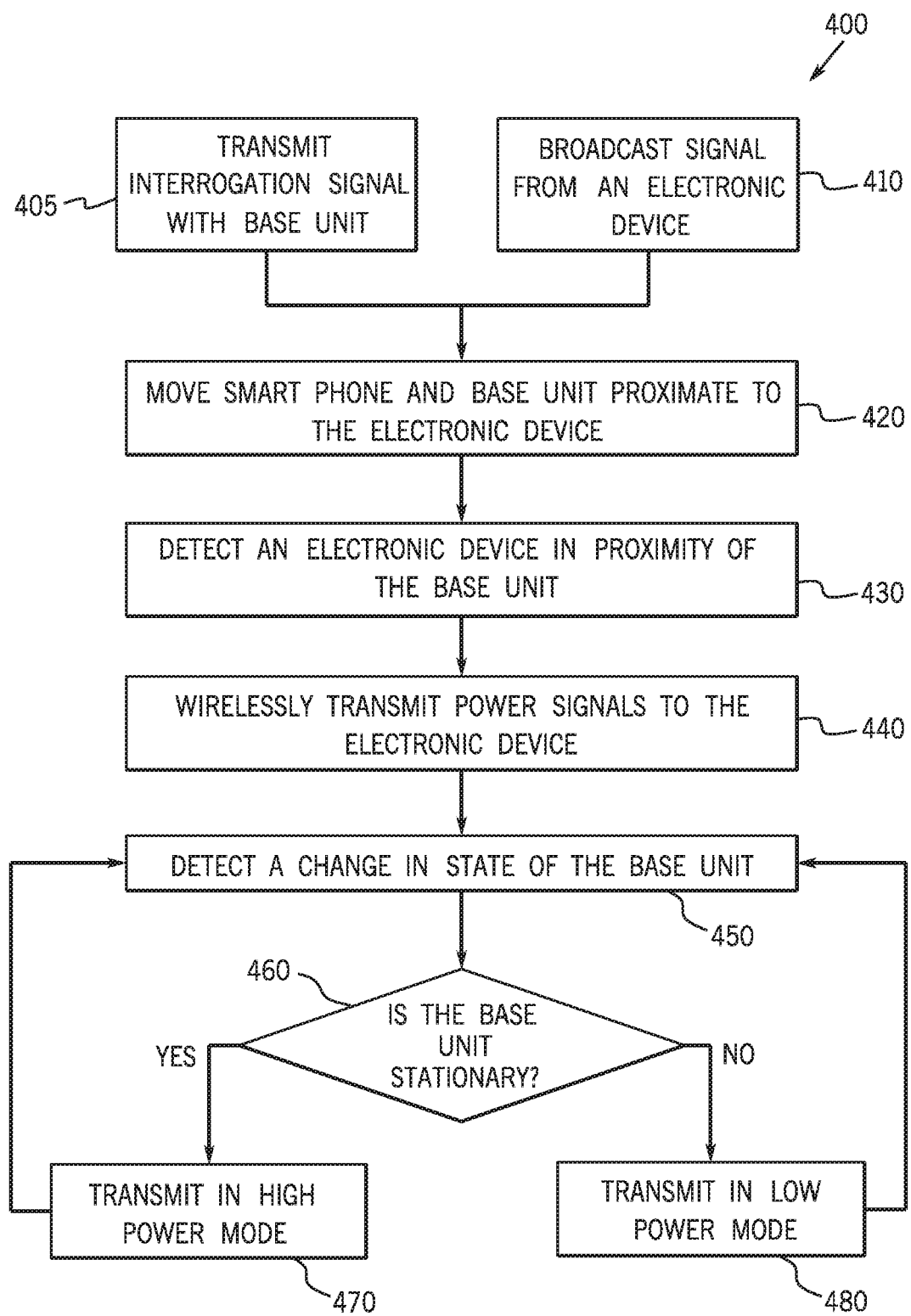
FIG. 6 illustrates a flow chart of a process according to some examples herein.
Figure 7:
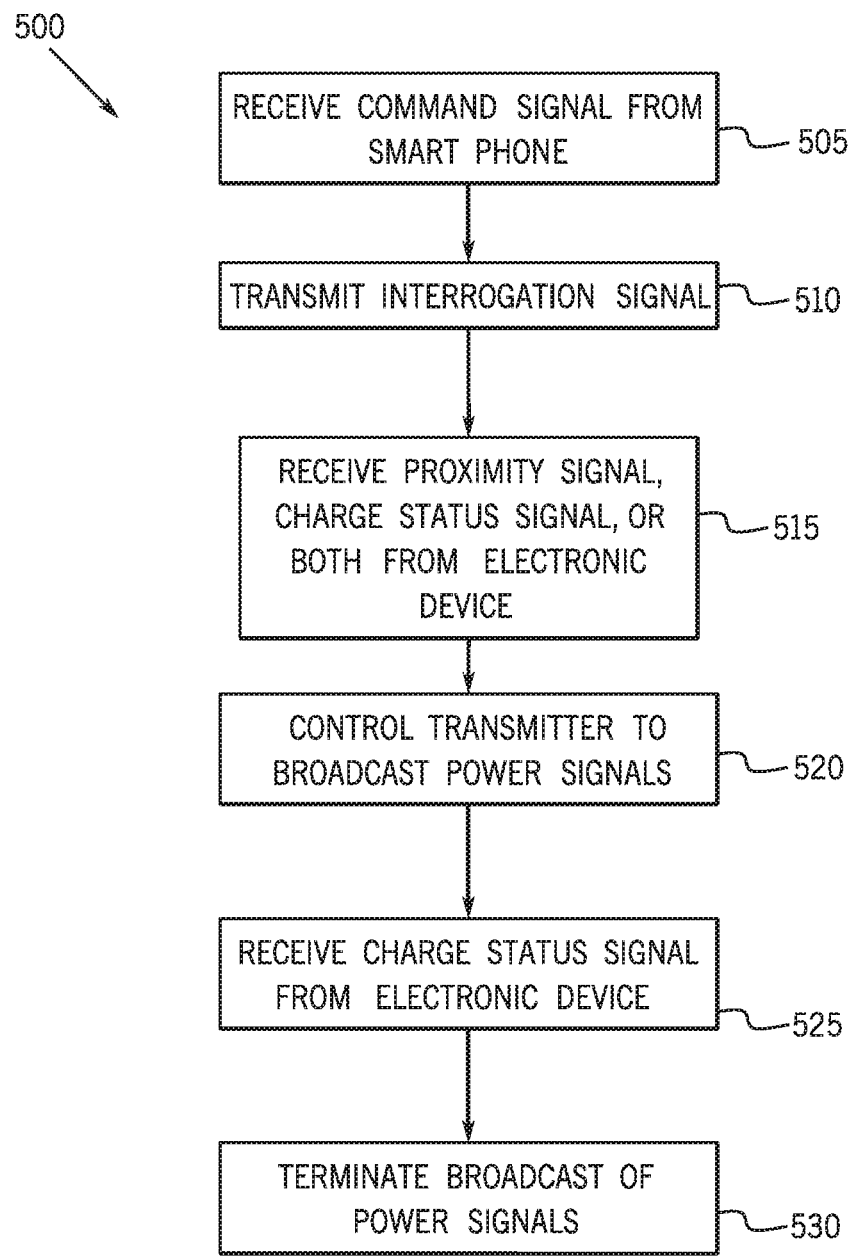
FIG. 7 illustrates a flow chart of a process according to further examples herein.
Figure 8:
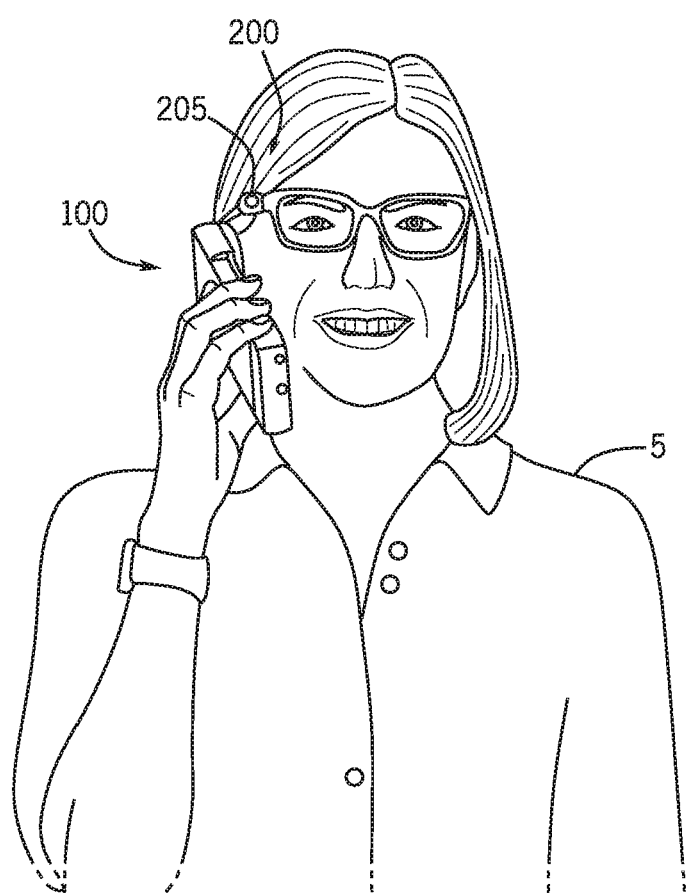
FIG. 8 illustrates a typical use scenario of a base unit incorporated into or attached to a mobile phone.

With reference now also to FIGS. 6-8, operations of a base unit in accordance with some examples herein will be described. FIG. 6 illustrates a process 400 for wirelessly charging an electronic device 200 which is separate from (e.g., not attached to) the base unit (e.g., base unit 100 or 300). As described, the base unit may be implemented as an attachment member configured for coupling to a communication device, such as a mobile phone 20. The base unit may be integrated into the communication device in other examples. The base unit (e.g., base unit 100 or 300) may be used to charge another device other than the mobile phone 20 to which it is attached, although the present disclosure is not thus limited and charging the mobile phone 20 with the base unit is also envisioned. Generally, the base unit may be movable with relation to the electronic device 200, which may remain attached to the user (e.g., attached to a body part of the user directly or via a wearable accessory) while the electronic device is in use (e.g., while a hearing aid is used to enhance a user's hearing).

In the illustrated example, the mobile phone 20 may be moved to a position in which the mobile phone 20 and base unit (e.g., base unit 100 or 300) attached thereto or incorporated therein are proximate to the electronic device 200 (e.g., eyewear camera 205 in FIG. 8), as shown in block 420, In the illustrated the electronic device is a camera however it will be understood that this exemplary process is applicable to other electronic devices, such as a hearing aid. For example, the user 5 may bring the mobile phone 20 near the user's head in order to conduct a call. During this time, the electronic device may in proximity to the base unit (e.g., within the charging range of the base unit) and may wirelessly receive power from the base unit to either power or charge the electronic device.

The base unit (e.g., base unit 100 or 300) may be configured to selectively transmit power. For example, the base unit array be configured to preserve energy during times when electronic devices are not sufficiently close to the base unit to receive the power signals. The base unit may be configured to stop transmission of power when no compatible electronic devices are detected in proximity.

Prior to initiating power transmission, the base unit (e.g., base unit 100 or 300) may detect an electronic device in proximity, e.g., as shown in block 430. The electronic device may be in proximity for charging while remaining separated by a distance from the base unit. That is, the electronic device may be in proximity for charging even though the electronic device does not contact the base unit. In some examples, the electronic device may broadcast a signal (block 410), which may be detected by the base unit. The signal may be a proximity signal indicating the presence of the electronic device. The signal may be charge status signal, which provides also an indication of the charge level of the power cell within the electronic device. When the electronic device is within a communication range of the base unit, the base unit may detect the signal broadcast by the electronic device and may initiate power transfer in response to said signal. The communication range may be substantially the same as the charging range. In some examples, the communication range may be smaller than the charging range of the base unit to ensure that electronic devices are only detected when well within the charging range of the base unit. The electronic device may remain in proximity as long as a distance between the base unit and the electronic device remains equal to or less than the threshold distance (e.g., charging range).

In some examples, broadcasting a signal from the electronic device may be impractical, e.g., if limited power is available onboard the electronic device. The base unit may instead transmit an interrogation signal. The interrogation signal may be transmitted continuously or periodically. The electronic device may be configured to send a signal (e.g., proximity signal, charge status signal, charging parameters such as but not limited to, charging frequency, power requirement, and/or coil orientation) responsive to the interrogation signal. In some examples, redundant detection functionality may be included such that both the base unit and the electronic device broadcast signals and the detection is performed according to either of the processes described with reference to blocks 405 and 410.

The base unit (e.g., base unit 100 or 300) may wirelessly transmit power to the electronic device 200 (block 440) while one or more conditions remain true. For example, the base unit may continue to transmit power to the electronic device while the electronic device remains within the charging zone of the base unit or until the power cell of the electronic device is fully charged. With regards to the latter, the electronic device may transmit a charge status signal when the power cell is fully charged and the base unit may terminate broadcast of power signals when the fully charged status signal is detected. In some examples, alternatively or in addition to sending a fully charged status signal, the electronic device may include a charging circuit which is configured to protect the power cell of the electronic device by turning off charging once the power cell is fully charged. In this manner, an individual electronic device may stop receiving power while the base unit continues to transmit, e.g., in the event that multiple devices are being charged.

In some examples, the base unit may be configured to periodically or continuously send interrogation signals while broadcasting power signals. The interrogation signals may trigger response signals from electronic devices 200 in proximity. The response signals may be indicative of whether any electronic devices remain in proximity and/or whether any devices in proximity require power. The base unit may be configured to broadcast power until no electronic devices are detected in proximity or until all charge status signal of electronic device in proximity are indicative of fully charged status.

In some examples, the base unit (e.g., base unit 100 or 300) may be further configured to adjust a mode of power transmission. The base unit may be configured to transmit power in a low power mode, a high power mode, or combinations thereof. The low power mode may correspond to a power transfer mode in which power is broadcast at a first power level. The high power mode may correspond to a power transfer mode in which power is broadcast at a second power level higher than the first power level. The low power mode may correspond with a mode in which power is broadcast at a body-safe level. The base unit may be configured to detect a state of the base unit, as in block 450. For example, a sensor (e.g., an accelerometer, a gyro, or the like) onboard the base unit may detect a change in the position or orientation of the base unit, or a change in acceleration, which may indicate that the base unit is being held or moved towards the user's body. The controller may be configured to determine if the base unit is stationary (block 460) and change the power mode responsive to this determination. For example, if the base unit is determined to be stationary, the base unit may transmit power in high power mode as in block 470. If the base unit is determined not to be stationary, the base unit may reduce the power level of power signals transmitted by the base unit. The base unit may change the mode of power transmission to low power mode, as shown in block 480. The base unit may continue to monitor changes in the state of the base unit and may adjust the power levels accordingly, e.g., increasing power level again to high once the base unit is again determined to be stationary. The sensor may monitor the state of the base unit such that power transmission is optimized when possible while ensuring that power is transmitted at safe levels when appropriate (e.g., when the base unit is moving for example as a result of being carried or brought into proximity to the user's body).

In some examples, the base unit may be communicatively coupled to the communication device (e.g. mobile phone 20). The mobile phone 20 may be configured to execute a software application which may provide a user interface for controlling one or more functions of the base unit. For example, the software application may enable a user 5 to configure power broadcast or interrogation signal broadcast schedules and/or monitor the charge status of the base unit and/or electronic device coupled thereto. The software application may also enable processing of data received by the base unit from the electronic device(s). FIG. 7 illustrates a flow chart of a process 500 for wireless power transfer in accordance with further examples herein. In the example in FIG. 7, the base unit is communicatively coupled to the mobile phone such that the mobile phone may transmit a command signal to the base unit. The command signal may be a command to initiate broadcast of interrogation signals, as shown in block 505. The base unit may transmit an interrogation signal (block 510) responsive to the command signal. Proximity and/or charge status signals may be received from one or more electronic devices in proximity (block 515). Upon detection of an electronic device in proximity, the controller of the base unit may automatically control the transmitter to broadcast power signals (block 520). In some examples, an indication of a detected electronic device may be displayed on the mobile phone display. The mobile phone may transmit a command signal under the direction of a user, which may be a command to initiate power transfer. The base unit may continue to monitor the charge status of the electronic device (e.g., via broadcast of interrogation signals and receipt of responsive charge status signals from the electronic device), as shown in block 525. Broadcast of power from the base unit may be terminated upon the occurrence of an event, as shown in block 530. The event may correspond to receiving an indication of fully charged status from the one or more electronic devices being charged, receiving an indication of depleted stored power in the battery of the base unit, or a determination that no electronic device remain in proximity to the base unit. In some example, the broadcast of power may continue but at a reduced power level upon a determination that the base unit is in motion (e.g., being carried or moved by a user 5).

Examples described herein may provide a low cost, small form factor, light weight portable base unit (e.g. wireless power charging unit) that can receive its power from other electronic devices. Upon or after receiving power from an external source the base unit can be used for powering electronic devices with wireless power to either Charge a battery or capacitor of an electronic device or to power the electronic device directly. The electronic device can be, by way of example only, a watch, band, necklace, earring, ring, head wear, hearing aid, hearing aid case, hearing aid control unit, eyewear, augment reality unit, virtual reality unit, implant, clothing article, wearable article, implanted device, cell phone. Base units described herein may include a transmitter, external power port and associated electronics. The transmitter can be comprised of a metal winding, by way of example only copper wire, around a magnetic material core. The transmitter core can comprise one of, by way of example only, iron, ferrites, iron alloys, a mu metal, Vitroperm 500F, a high permeability metal. The transmitter can comprise a ferrite core. The winding can be of a copper wire. The winding can be of Litz wire. The external power port can be a USB port. The USB port can be electrically connected to one of a; lap top, desk top, cell phone, smart pad, communication system, Mophie Case, rechargeable cell phone case, or other source of power. In this manner, the base unit may be formed as a "dongle" or other accessory device having a USB or other electronic interface to a power source and a wireless transmitter. The transmitter can be wireless coupled to a distance separated receiver of an electronic device. The electronic device can be an electronic wearable device. The portable charging unit can be devoid of a battery. The portable charging unit can be devoid of a power source. Example base units may include at least one USB connector, an RF source for generation a time varying signal, said signal being provided to an RF antenna or a magnetic coil. Example base units may include a ferrite core and copper wire windings.

Example base units may accordingly be powered by a $3^{rd}$ party power source. Such a $3^{rd}$ party power source can be, by way of example only, that of a computer, laptop, cell phone, smart pad, an electrical power socket, or combinations thereof.

Some example base units may include a battery, which in some examples may be a very small form factor battery, or capacitor should one be desirable for minimal power source to keep electronics functional if power from the source were to fluctuate or otherwise be momentarily unavailable.

Example base units may be incorporated in and/or used with a smart phone case and used to power a smart phone battery or provide battery back up to a smart phone. The said smart phone case may include a recess for accepting a smart phone, and a standard USB connector that may be used to charge the battery in the smartphone case and/or the battery in the smart phone place in said case. The smart phone case may include a USB power output port that may be used to power any external device from the battery in the smart phone case, including but not limited to the base unit. A smart phone may have a normal USB port that provides the normal charging and data function of a typical smart phone. The said smart phone may also include a USB port that provides power to other external devices including but not limited to, a portable wireless charging unit (e.g. base unit) which may be coupled to the USB port.

As previously described, example base units may include a plurality of coils and/or a plurality of rods arranged in a pattern. FIGS. 9A-9E illustrate a base unit which includes two coils. The base unit may include some or all of the features of the base units in FIGS. 1-8, thus their description will not be repeated. For example, the base unit 700 may include at least one Tx coil 712 and circuitry 705 configured to provide the functionality of a base unit in accordance with the present disclosure. The coils and circuitry 705 may be enclosed or embedded in a housing 715. The base unit 700 includes a first coil 712-1 and a second coil 712-2. In some examples, both the first and the second coils may be configured for wireless power transmission. In some examples, the first coil 712-1 may be configured as a transmitting coil and the second coil 712-2 may be configured as a receiving coil. The first and second coils may extend, at least partially, along opposite sides of the housing 715. For example, the first coil 712-1 may be provided along the top side and the second coil 712-2 may be provided along the bottom side of the housing 715. Terms of orientation, such as top, bottom, left and right, are provided for illustration only and without limitation. For example, the terms top and bottom may indicate orientation of the base unit when coupled to a mobile phone and during typical use, e.g., a top side of the base unit may be closest to the top side of the mobile phone, the bottom side of the base unit closest to the bottom side of the mobile phone, and so on. In some examples, the base unit may alternatively or additionally include coils that are arranged along any side or face of the housing, including the left and right sides, or near the front or back faces of the housing. In some examples, the Tx coils or components thereof may be located in a central portion of the base unit, as will be described further below. The housing includes a receptacle 709 for coupling a communication device (e.g., mobile phone) thereto. The receptacle 709 may include engagement features for mechanically connecting a communication device to the mobile phone. For example, the housing may be made from a rigid plastic material and the receptacle may be configured such that the communication device snaps into engagement with the mobile phone. In some examples, the housing may be made, at least partially, for a resilient plastic material (e.g., rubber) and at least a portion of the housing may be deformed (e.g., elongated or flexed) when placing the mobile phone in the receptacle 709. Additional examples of base unit housings and engagement features are described with reference to FIGS. 10-12 below.

FIGS. 10A-10C illustrate a base unit 800 having a housing 815 in the form of a case for a communication device 30. The communication device 30 may be a tablet or smart phone. The housing 815 may enclose the circuitry 801 of the base unit. The housing 815 may include a receptacle 809 which is configured to receive the communication device 30 (e.g., tablet or smart phone). In this example, the receptacle 809 is configured for sliding engagement with the communication device 30, e.g., tablet, by sliding the communication device into the receptacle 809 from a side (e.g., a top side) of the housing. In other examples, the receptacle 809 may be configured for snap engagement with the communication device 30 (e.g., tablet or smart phone). In further examples, the housing 815 may be configured to be resiliently deformed, at least partially, when being attached to the communication device 30. The communication device 30 may be seated in the receptacle 809 with at least a portion of the housing 815 projecting from the base unit 800. In some examples, the communication device 30 may be, at least partially, enclosed by the housing 815 such that the display face 31 of the communication device 30 (e.g., tablet or smart phone) is substantially flush with the front surface 817 of the housing.

FIGS. 11A-11D illustrate a base unit 900 having a housing 915 in the form of a partial case for a communication device 15. The communication device 15 may be a mobile phone, a tablet, or the like. The partial case may attach to and/or enclose a portion (e.g., a bottom portion, a top portion) of the communication device 15. The housing 915 may enclose the circuitry 901 of the base unit 900. The base unit 900 may include a receptacle 909 formed in the housing 915. The receptacle 909 may be configured for snap engagement with the communication device 15. By snap engagement, it may be generally implied that one or more engagement features of the receptacle are shaped/sized for an interference fit with at least a portion of the communication device and the one or more engagement features are temporarily deformed to receive the communication device in the receptacle. In other examples, the receptacle 909 may be configured for slidable engagement with the communication device 15 in a manner similar to the example in FIG. 10.

Figure 12A:
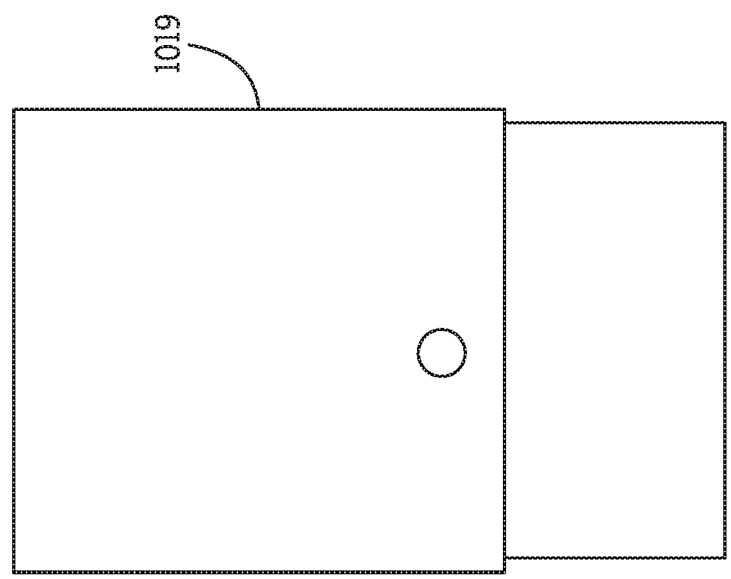
FIGS. 12A and 12B illustrate views of a base unit implemented as a partial case with movable cover configured for coupling to a communication device.
Figure 12B:
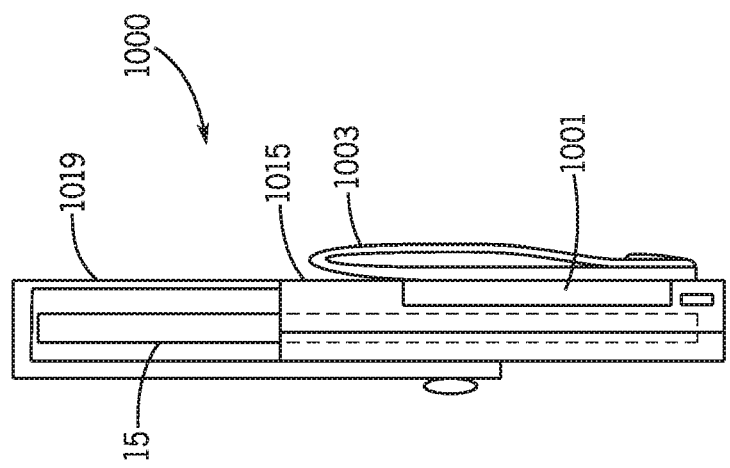
Figure 13:
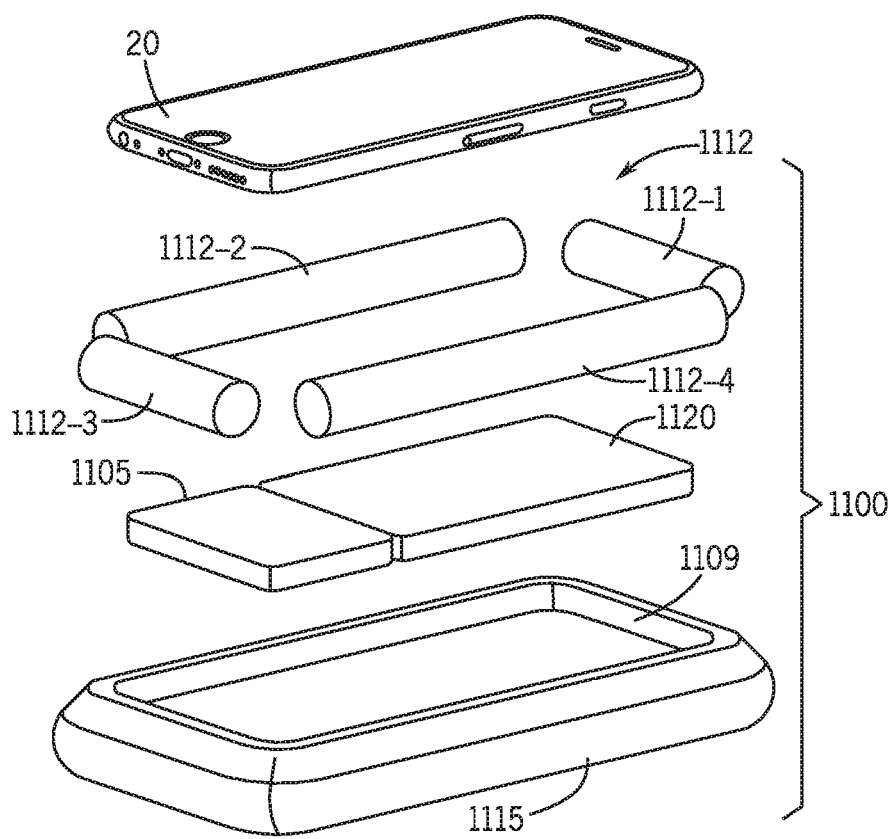
FIG. 13 illustrates an exploded isometric view of a base unit according to further examples of the present disclosure.

FIGS. 12A and 12B illustrate a base unit 1000 having a housing 1015 according to further examples herein. The housing 1015 may be similar to housing 915 in that it may be a partial case configured to attach to only a portion of the communication device 15. The housing 1015 may enclose the circuitry 1001 of the base unit 1000. A movable cover 1019 may be attached to the housing 1015. The movable cover 1019 may be hinged at one or more locations to allow the cover 1019 to be moved out of the way to access the communication device 15. In some examples, an attachment member may be coupled to the housing 1015, cover 1019 or both. The attachment member 1003 may be configured to allow the user to conveniently carry the base unit 1000 and communication device 15 attached thereto. For example, the attachment member 1003 may be a clip, a loop or the like, for attaching the base unit to clothing/accessories. The movable cover may be secured in a closed position via a conventional fastener (e.g., a snap, a magnetic closure, or others).

FIGS. 13 and 14A-14C illustrate a base unit according to further examples of the present disclosure. The base unit 1100 may include some or all of the features of base units described herein and similar aspects will thus not be repeated. For example, the base unit 1100 may include a wireless power transmitter (e.g., Tx coil 1112), a battery (1120) and base unit circuitry (1105). The battery 1120 and circuitry 1105 may be provided in a central portion of the base unit 1100, while the Tx coils 1112 may be provided along peripheral portions of the base unit 1100. The battery 1120 may be rechargeable and/or removable, A housing 1115 of the base unit may be configured as an attachment member, e.g., for attaching the base unit to a communication device, for example a mobile phone 20. The housing may have perimeter sides (e.g., a top side, bottom side, left and right sides, which are arbitrarily described as top, bottom, left and right to illustrate the relative orientation of the base unit to a mobile phone when coupled thereto). In the examples in FIGS. 13 and 14A-14C, the Tx coils are arranged parallel to the perimeter sides (e.g. along peripheral portions) of the base unit.

The transmitter may include a single continuous Tx coil or a segmented Tx coil. In the example in FIG. 13, the transmitter includes a segmented coil including a plurality of discrete Tx coils (in this example four coils 1112-1, 1112-2, 1112-3, and 1112-4), each having a magnetic core with conductive windings wound thereon. A diameter of the Tx coils may range from about 5 mm to about 20 mm. In some examples, the diameter of the Tx coils may be between 8 mm to 15 mm. In some examples, the diameter of the Tx coils may be 9 mm, 10 mm, 11 mm, 12 mm, 13 mm, or 14 mm. Different diameters for the coils may be used. The magnetic cores in this example are implemented as elongate cylindrical rods made from a magnetic material. The rods in this example are arranged around the perimeter of the base unit 1100. In some examples, the rods may extend substantially along the full length of the top side, bottom side, left and right sides of the housing 1115. Lengths (l), widths (w), and thicknesses (t) of the housing 1115 may range from about 150 mm-180 mm, 80-95 mm, and 15-25 mm, respectively. Other lengths, widths, and thicknesses may be used, e.g., to accommodate a given communication device (e.g. smartphone) and/or accommodate a particular coil size. For example, a housing configured to couple to an iPhone 6 mobile phone may be about 160 mm long, about 84 mm wide, and about 19 mm thick and accommodate Tx coils having a diameter of about 9 mm. In another example, the housing may have a length of about 165 mm, a width of about 94 mm, and a thickness of about 21 mm accommodating a coil having a diameter of about 14 mm.

In certain embodiments, the transmit coils maybe driven in a phased or time sequenced manner so as to maximize the transmitted power that can be applied to each coil individually at any given time, creating a rotating magnetic field with the largest possible charging range from the base unit. Such approaches provide enhanced orientation and range independence of the charging system.

The base unit includes a receptacle 1109, 1209 for receiving the mobile phone 20. In this example, the receptacle is configured to receive the mobile phone such that the mobile phone is substantially flush with a front face of the housing. The receptacle 1109, 1209 may have a size and shape substantially matching the size and shape of the mobile phone such that the mobile phone is substantially enclosed on five sides by the housing. In some examples, the receptacle may have a size and/or shape selected to partially enclose the mobile phone. The mobile phone may project from the housing when engaged thereto (e.g., as illustrated in the examples in FIGS. 10 and 11), which may further reduce the form factor of the base unit.

In some examples, the windings may be spaced from the surface of the rod(s), e.g., as in the examples in FIGS. 15A-15C and 16A-16C described further below.

In some examples, it may be desirable to maximize the number of windings or length of wire used in the windings. A base unit having a generally flattened parallelepiped shape may have four perimeter sides (top, bottom, left and right sides) and two major sides (front and back sides). The number of windings or length of wire used in the windings may maximized by placing the windings at the peripheral portion of the device. For example, the conductive wire may be wound with the loops substantially traversing the perimeter of the base unit (e.g., as defined by the top, bottom, left and right sides). FIGS. 15A-15C illustrate examples of base units 1300a-c in which conductive windings 1316 are provided at the perimeter of the base unit and the core material (e.g., core rods 1314) is provided in an interior portion of the base unit spaced from the windings. Base unit 1300a includes individual rods 1314 which are arranged with their centerlines perpendicular to a major side (e.g., front or back side) of the base unit. Base units 1300b and 1300c include individual rods 1314 which are arranged with their centerlines arranged parallel to a perimeter side of the base unit.

In further examples, the conductive wire may be wound such that the wire is in a plane substantially parallel to a major side of the base unit. For example, base unit 1400a includes a core material in the form of a core plate 1417 and windings wrapped around the core plate with the coil axis substantially parallel to the left and right sides of the base unit. Base units 1400b and 1400c includes windings 1416 similar to the windings of base unit 1400a but using discrete rods 1414 as core material, the rods spaced inwardly from the windings and arranged parallel to a perimeter side of the base unit. Non-magnetic material may be provided in the spaces between the rods in the examples in FIGS. 15A-15C and 16A-16G Different combination of orientations of the windings and rods than the specific examples illustrated may be used in other examples.

The base unit may be incorporated in a variety of shapes which may have a relatively small form factor. The base unit may be incorporated into a form factor which is portable, e.g., fits in a user's hand and/or easy to carry in the user's pocket, handbag, or may be attachable to a wearable accessory of the user). For example, referring now also to FIG. 17 base unit 1500 may have a housing 1515 which has a generally cylindrical shape (e.g., puck shape). A puck base unit 1500 may include some or all of the components of base units described herein and the description of such components will not be repeated. For example, the base unit may include a transmitter (e.g. Tx coil 1512), a battery and a controller (not shown). The housing 1515 may have a first major side (e.g., a base) and a second major side (e.g., a top). The Tx coil may be placed along the perimeter (e.g., proximate and extending, at least partially, along the cylindrical perimeter side) of the base unit. In some examples, the core may be in the shape of a cylindrical core plate. The coil windings, cylindrical core plate, and cylindrical puck may be coaxially aligned. The base unit 1500 may include one or more input ports 1560 for connecting the base unit to external power and/or another computing device. For example, the base unit 1500 may include a first input port 1560-1 for coupling AC power thereto and a second input port 1560-2 (e.g., USB port) for coupling the base unit to a computing device, e.g., a laptop or tablet. The base unit 1500 may include one or more Charge status indicators 1590. The charge status indicators 1590 may provide visual feedback regarding the status and/or charging cycle of the base unit, the electronic devices in proximity, or combinations thereof.

A charge status indicator in the form of an illumination device 1592 may be provided around the perimeter of the base unit or the perimeter of a major side of the base unit. The illumination device may include a plurality of discrete light sources. Individual ones or groups of individual light sources may provide status indication for individual electronic devices which may be inductively coupled to the base unit for charging. In some examples, an indicator display 1594 may be provided on a major side e.g., a top side) of the base unit. The indicator display may be configured to provide individual charge status indications for one or more electronic devices inductively coupled to the base unit for charging.

Figure 18:
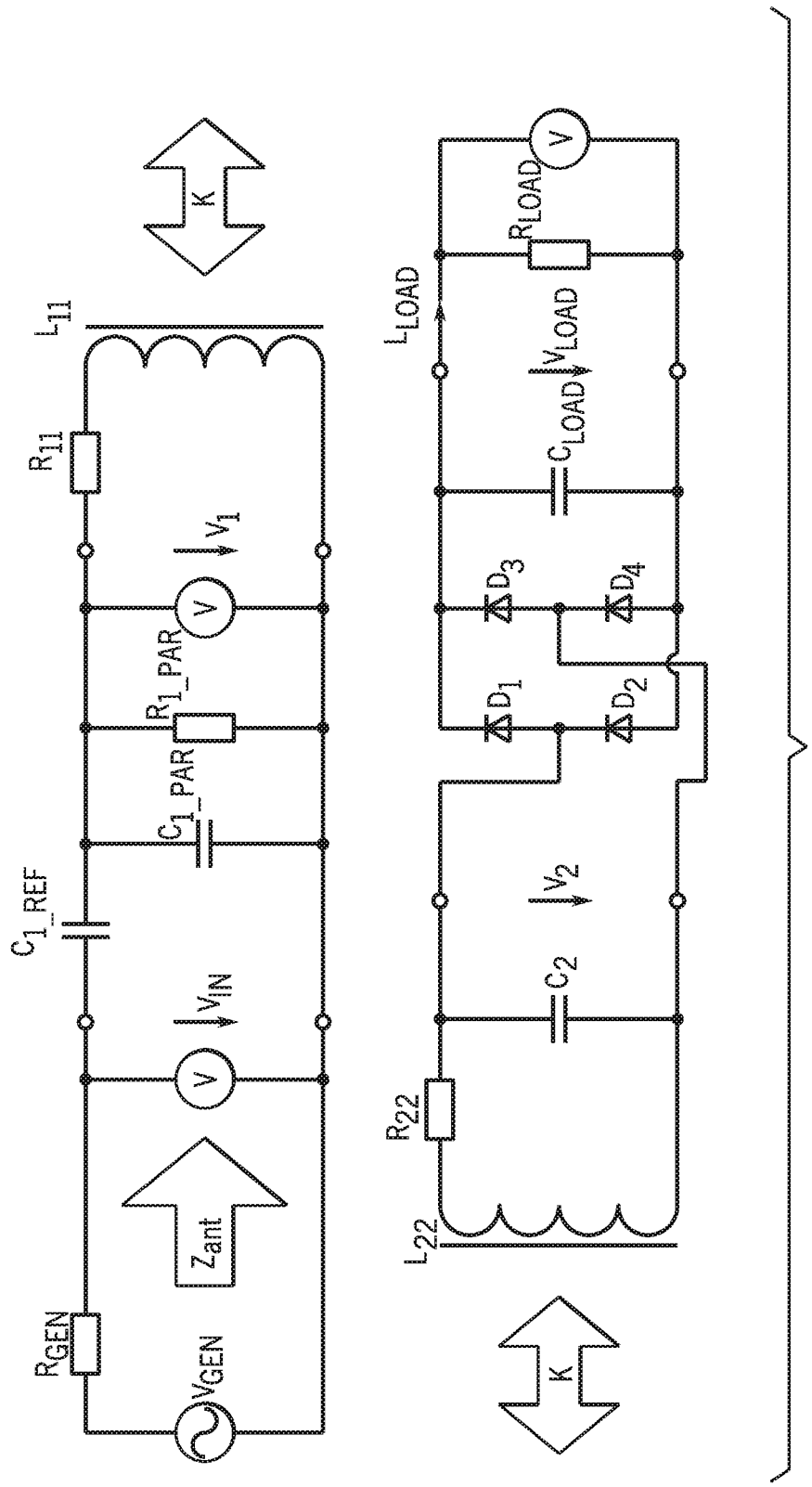
FIG. 18 illustrates an example transmitter and receiver configuration in accordance with the present disclosure.

FIG. 18 illustrates components of a transmitter and receiver circuits for a wireless power transfer system in accordance with the present disclosure. On the transmitter side of the system, the transmitting coil is represented by an inductance L11. The transmitter circuit is tuned to broadcast at desired frequency. To that end, the transmitter circuit includes capacitor C1PAR and resistor R1PAR, which may be selected to tune the transmitter to the desired transmit resonance frequency. On the receiver side of the system, the receiving coil is represented by an inductance L22, and capacitor C2 and resistor R22 are chosen to tune the RLC circuit produced by the inductance of the receiving coil and C2 and R22 to the transmit resonance frequency produced by the transmitting coil. A rectifier (e.g. a full wave rectifier) is made from four diodes D1, D2, D3, and D4. The rectifier in combination with the load circuit made up for RLoad, Cload, and Lload and convert the alternating signal induced in L22 to DC voltage output for charging the battery of the device. The load resistor RLoad and the load capacitor CLoad are selected to impedance match the diode bridge to the charging circuit for the battery used in the wearable device.

Figure 19:
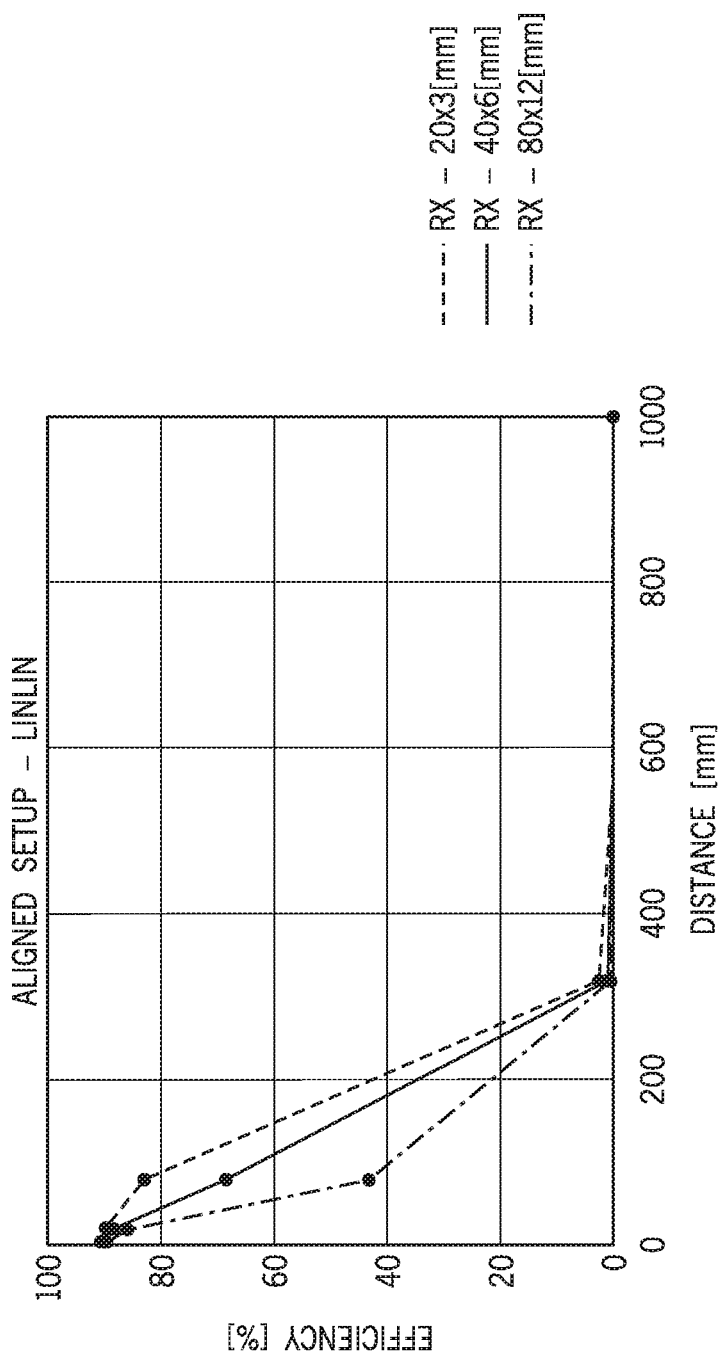
FIG. 19 illustrates simulation results of wireless power transfer systems according to some examples of the present disclosure.
Figure 20:
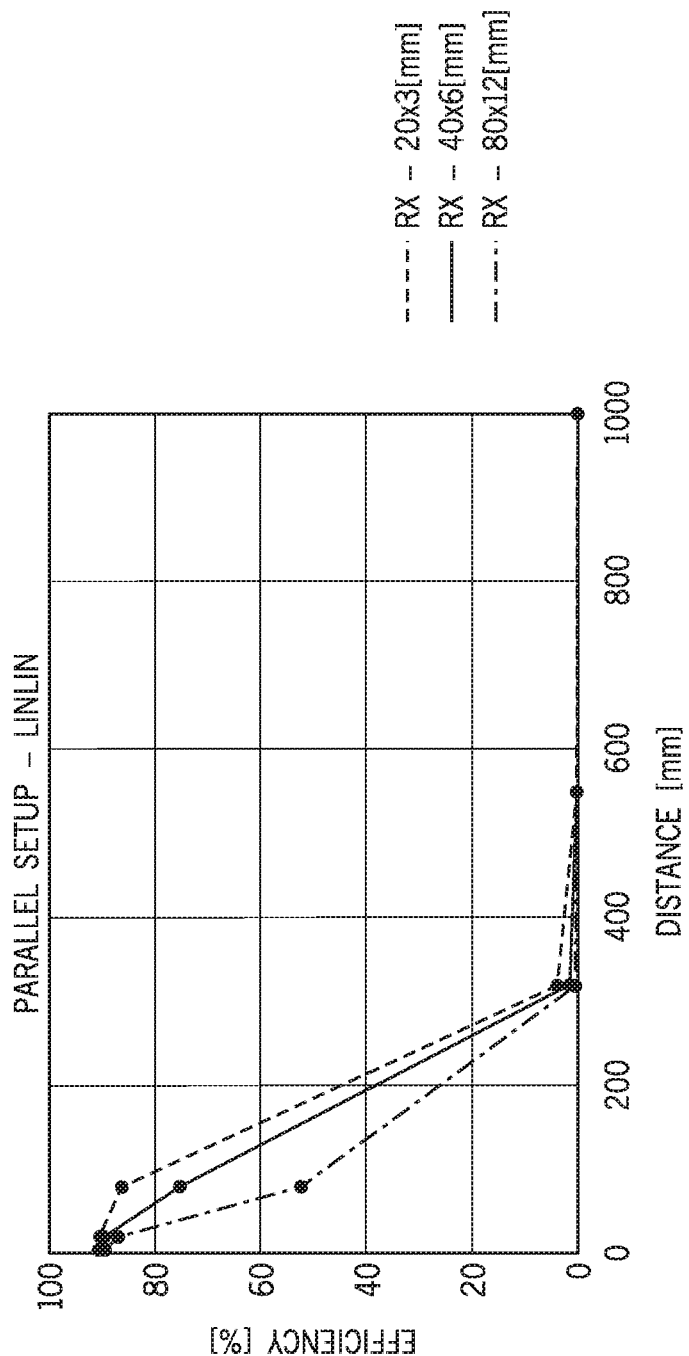
FIG. 20 illustrates simulation results of wireless power transfer systems according to further examples of the present disclosure.

In some embodiments the transmitting coil and thus the inductance L11 is relatively large compared to the inductance of the receiving coil and its inductance L22. When the transmitting and receiving coils are in close proximity the transfer efficiency is relatively high. At larger distances the efficiency is reduced but remains relatively high compared to other systems, such as a Qi standard compliant systems. This is illustrated in FIGS. 19-21.

In some examples, the shape of the pattern of a magnetic field between inductively coupled transmitting and receiving coils in accordance with the present disclosure may be largely omnidirectional with well-established nulls at the top and bottom of the coils. The radiation pattern can be directed by placing the coil against or near a reflecting ground plane to produce more of a unidirectional pattern.

FIG. 22 illustrates an example of magnetic field lines emanating from a transmitting coil and the field at the receiving coil when the position of the receiving coil is well known or predictable (e.g., in typical use scenarios). In such example, directed flux approach may be used to improve the efficiency of energy transfer.

By careful specification of the use cases for the charging system of the wearable device, a wireless power transfer system can be optimized to produce an improved arrangement of charging conditions while preserving form factor through a reduction of battery size needed to normally charge a device for its typical use period between charging cycles. In some applications, the electronic device may not need to be intentionally placed in a manner to facilitate charging, since the power transmitted at the use case distance may be adequate for maintaining the energy draw from the system on the battery.

Examples described herein may make use of body-worn repeaters. The use of body-worn repeaters may, for example, improve system performance and/or relax requirements on base units and/or wearable electronic devices described herein.

Generally, body-worn repeaters described herein are configured to receive wireless power from a base unit described herein and provide wireless power to one or more wearable electronic devices. By positioning a body-worn repeater between a base unit and a wearable electronic device (e.g. such that a distance between the body-worn repeater and the wearable electronic device is less than a distance between the base unit and the wearable electronic device), range of the overall system may be improved. For example, it may be disadvantageous, impractical, or impossible to provide power from the base unit over the entire distance between the base unit and the wearable electronic device. However, placement of a body-worn repeater may allow the wireless power to be relayed from the base unit to the wearable electronic device.

Moreover, body-worn repeaters may improve efficiency of wireless power transfer by reducing orientation dependencies between a base unit and a wearable electronic device. For example, base units described herein may include a magnetic core and may have increased efficiency with a receiving device when in a particular orientation, or range of orientations. By placing a body-worn repeater to mediate wireless power transfer, one orientation is provided between the base unit and the body-worn repeater, and another between the body-worn repeater and a wearable electronic device. Accordingly, the orientation between the base unit and the body-worn repeater may be Closer aligned than the orientation between the base unit and the electronic wearable device. The orientation between the body-worn repeater and the electronic wearable device may be closer aligned than the orientation between the base unit and the electronic wearable device.

In some examples, body-worn repeaters described herein may reduce complexity that may otherwise be required in base units. For example, one body-worn repeater may provide wireless power to a plurality of wearable electronic devices, and certain of the wearable electronic devices may have different carrier frequency and/or modulation (e.g. for data transfer) parameters. Examples of body-worn repeaters described herein may be tuned (e.g. using a controller or other processing unit forming part of the body-worn repeater) to have a different carrier frequency and/or different frequency modulation based on the identities of wearable electronic devices with which the body-worn repeater is communicating. In this manner, a base unit may provide power to a body-worn repeater using one frequency and/or modulation scheme, and the body-worn repeater may utilize multiple frequencies and/or modulation schemes to communicate with different wearable electronic devices. In some examples, this may relieve the base unit of the need to itself provide different frequencies and/or modulation schemes.

FIG. 23 is a schematic illustration of a system in accordance with examples described herein. The system 2300 includes base unit 2302, body-worn repeater 2304, and wearable electronic device 2306. The body-worn repeater 2304 is configured to receive wireless power front the base unit 2302 and provide wireless power to the wearable electronic device 2306. The base unit 2302 may be implemented using any example base units described and/or depicted here. Generally, the base unit 2302 may include a transmitter for wireless power delivery, the transmitter may include a coil comprising a magnetic core. The base unit 2302 may further include a battery coupled to the transmitter. The base unit 2302 may further include a controller coupled to the battery and the transmitter and configured to cause the transmitter to selectively transmit power from the battery. The base unit 2302 may further include a housing enclosing the transmitter, the battery, and the controller.

In some examples, the base unit 2302 may be implemented as a case that may be attached to a mobile communication system, e.g, a mobile phone, in some examples, the base unit 2302 may be implemented as something that may be worn on a body, e.g. attached or integral to a belt. In some examples, the base unit 2302 may be worn by the user in or on, for example, a pocket, necklace, tether, shoe, belt, ankle band, wrist band, armband, or attached to, on, or part of one of a cell phone or mobile phone.

The body-worn repeater 2304 generally includes a coil configured to receive wireless power from the base unit 2302. The coil may be implemented using any coils described and/or depicted herein, including a coil having a magnetic core. In some examples, the coil of the body-worn repeater 2304 may be a flat (e.g. planar) coil without a magnetic core. Generally, the body-worn repeater 2304 may be implemented using any base unit described and/or depicted herein. Some examples of body-worn repeaters may not, however, include a battery and/or memory. The body-worn repeater 2304 may further include one or more electronic circuits having an inductance, capacitance, and resistance. The electronic circuit(s) may present an inductance, capacitance, and/or resistance selected to match and/or improve matching with the wearable electronic device 2306 and/or the base unit 2302.

In some examples, the body-worn repeater 2304 may be implemented using primarily passive components. For example, the body-worn repeater 2304 may be implemented using a resonator that may capture energy from the transmitter (e.g in the base unit 2302) and relay that energy to the electronic wearable device (e.g. the wearable electronic device 2306) without any further modification or conditioning other than that produced by the resonant behavior of the body-worn repeater. For example, such a repeater may be implemented using a resonator made of passive components, including a wire-wound ferrite core, one or more capacitive elements (e.g. capacitors), and/or one or more resistive elements (e.g. resistors).

In some examples, the body-worn repeater 2304 may include at least two coils—one or more coils selected to receive wireless power from the base unit 2302 and one or more coils selected to transmit wireless power from the body-worn repeater 2304 to the wearable electronic device 2306. In some examples, the coil size and type (e.g. with or without magnetic core, flat or wound around core) may be selected to facilitate receipt and/or transmission of power accordingly. One or more circuits may be provided to present a resistance, capacitance, and/or inductance associated with each coil to match or improve a matching with a paired transmitter or receiver Base unit 2302 or wearable electronic device 2306). One or more switches may be included to switch from receipt of power by one coil to transmission of the power by another coil. Example repeaters including multiple coils may be designed to have optimum transfer of wireless power between the coils. In some examples, multiple coils may be implemented having a common core. The body-wont repeater may be designed to function as a resonator. The repeater functioning as a resonator may have a single coil that supports the same modulation frequency as the base unit and the wearable electronic device.

The body-worn repeater 2304 may include (by way of example only) one or more antennas, transmitters, coils, ASICs, circuitry including one or more capacitors, A to D converters, one or more inductors, one or more memory units, which may be volatile or non-volatile, an energy storage unit such as (by example only) a rechargeable battery or a super capacitor, charge pumps to amplify voltage, and/or one or more switches.

The body-worn repeater 2304 may include circuitry for tuning the body-worn repeater 2304 to transmission at a particular frequency and/or use of a particular modulation scheme based on an identity of the wearable electronic device 2306, or other wearable electronic devices with which the body-worn repeater 2304 will communicate.

The body-worn repeater 2304 may be attached to or integral with items that are intended to be worn by a user. For example, the body-worn repeater 2304 may be located in a ring, watch, bracelet, necklace, earring, hair band, hair clip, shoe, belt, broach, clip, or combinations thereof. In some examples, the body-worn repeater 2304 may be located in or attached to a mobile communication system (e.g. cell phone).

In some examples, the body-worn repeater 2304 may house or attach to the wearable electronic device 2306. In some examples, the body-worn repeater 2304 may include an attachment mechanism for physical attachment to the wearable electronic device 2306. The body-worn repeater 2304 may be mobile. For example, the body-worn repeater 2304 may be worn by a user that may be mobile—for example by crawling, walking, driving, or flying.

The wearable electronic device 2306 generally includes a coil configured to receive wireless power from the body-worn repeater 2304. The wearable electronic device 2306 may be implemented using any wearable electronic devices described and/or depicted herein. Any coil described and/or depicted herein may be used to implement the wearable electronic device 2306. A coil in the body-worn repeater 2304 may, during operation, excite and energize a coil in the wearable electronic device 2306.

In some examples, the wearable electronic device 2306 may be implemented to provide the functionality of an audio system, heads up display, hearing aid, directional microphone, camera, camera system, infrared vision system, night vision aid, light, one or more sensors, pedometer, wireless cell phone, mobile phone, wireless communication system, projector, laser, augmented reality system, virtual reality system, holographic device, radio, sensor, GPS, data storage, power source, speaker, fall detector, alertness monitor, geo-location, pulse detection, gamming, eye tracking, pupil monitoring, alarm, CO2 detector, UV meter, poor air monitor, bad breath monitor, thermometer, smoke detector, pill reminder, alcohol monitor, switch, or combinations thereof.

In some examples, the base unit 2302 and/or body-worn repeater 2304 can be located within the room, vehicle or space near the wearer (e.g. the body-worn repeater may not always be worn by the user).

Body-worn repeater 2304 may be positioned such that it is between the base unit 2302 and the wearable electronic device 2306, for example such that a distance between the body-worn repeater 2304 and the wearable electronic device 2306 is less than a distance between the base unit 2302 and the wearable electronic device 2306. For example, in FIG. 23, the base unit 2302 is worn on a user's belt, while the body-worn repeater 2304 is worn in or on a necklace, and the wearable electronic device 2306 is located on eyewear worn by the user.

In some examples, the body-worn repeater 2304 may be located within the range of 0.1 millimeters to 60 centimeters of the wearable electronic device 2306. In some examples, the body-worn repeater 2304 may be located within the range of 0.1 millimeters to 30 centimeters of the wearable electronic device 2306.

Generally, a coil included in the body-worn repeater 2304 for receiving power from the base unit 2302 may be larger than a coil included in the wearable electronic device 2306 used to receive power from the body-worn repeater 2304. For example, a diameter of the coil used in the body-worn repeater 2304 for receiving power from the base unit 2302 may be larger than a diameter of a coil in the electronic device 2306 used to receive power from the body-worn repeater 2304. For example, a length, width, or both, of the coil used in the body-worn repeater 2304 for receiving power from the base unit 2302 may be larger than a length, width, or both of a coil in the electronic device 2306 used to receive power from the body-worn repeater 2304. A repeater having multiple coils may be designed to have optimum transfer of wireless power between the coils. In some examples, multiple coils may be implemented having a common core. The larger size of the coil used to receive power from the base unit may relax requirements on the base unit for power transmission. For example, it may not be necessary for the base unit to provide wireless power to a coil as small as the coil provided in the wearable electronic device (e.g. on the order of millimeters in some examples, on the order of a few centimeters in other examples). Instead, the base unit in some examples need only provide power to the larger coil provided in the body-worn repeater. The body-worn repeater may be larger (e.g. on the order of centimeters or more in some examples).

Generally, wireless power may be transmitted from the base unit 2302 to the body-worn repeater 2304 and from the body-worn repeater 2304 to the wearable electronic device 2306 using a body safe frequency. In some examples, a frequency of between 100 kHz and 130 kHz may be used. In some examples, a frequency of 125 kHz+/−2 kHz may be used. In some examples, a frequency of 125 kHz+/−3 kHz may be used. In some examples, a frequency of 125 kHz+/−5 kHz may be used.

A single wearable electronic device 2306 is shown in FIG. 23, However, more than one wearable electronic device 2306 may be present in example systems and may receive wireless power from the body-worn repeater 2304. Example systems may include a plurality of wearable electronic devices, each of the plurality of wearable electronic devices including a respective coil to receive wireless power from the body-worn repeater 2304.

A single body-worn repeater 2304 is shown in FIG. 23, However, it is to be understood in some example systems, more than one body-worn repeater 2304 may be used—including, but not limited to 2, 3, 4, or 5 body-worn repeaters. Each body-worn repeater may in turn provide wireless power to another body-worn repeater, and ultimately at least one of the body-worn repeaters may provide wireless power to a particular wearable electronic device.

Example devices described herein may include coils integral in a supporting member (e.g. a band, cord, housing). The supporting member may at least partially define one or more apertures or be shaped to receive or house an electronic device. In some examples, an electrical connection may be provided between the coil and the electronic device (e.g. the aperture may present one or more electronic connections to an electronic device). In some examples, an electrical connection may be provided between the coil and the electronic device simply by the proximate presence of the electronic device to the coil—for example, the coil may be inductively coupled to the electronic device when the electronic device is present in the aperture.

Figure 24:
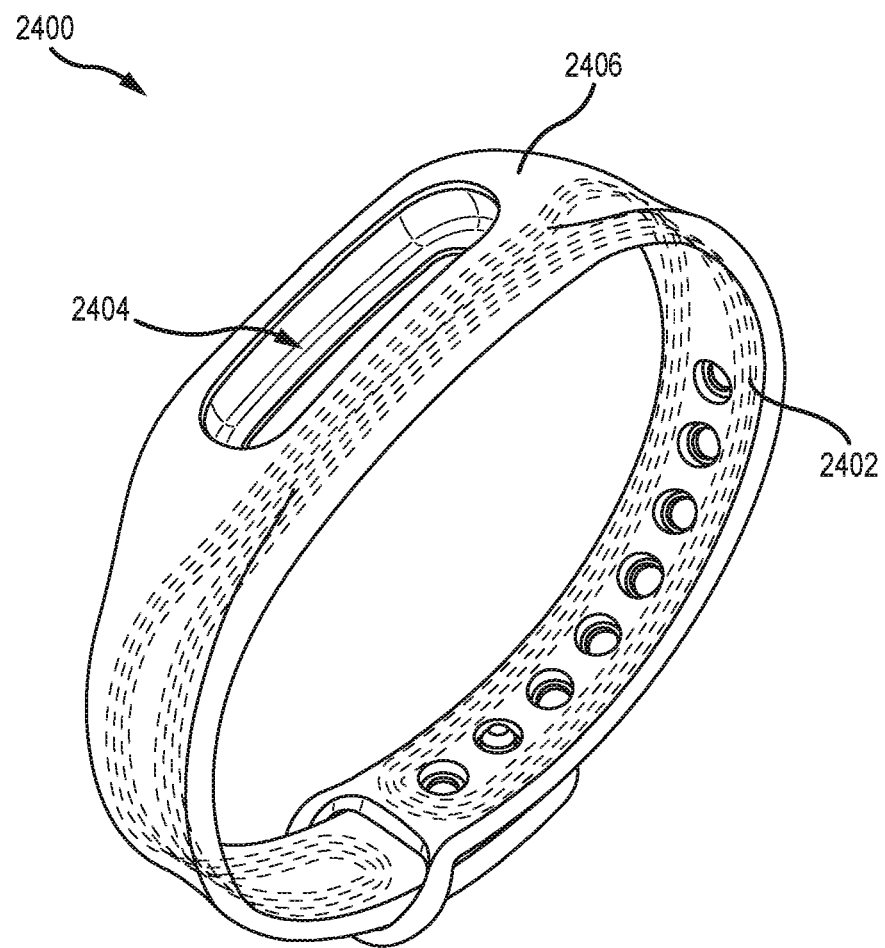
FIG. 24 is a schematic illustration of a band that may include a repeater and/or wearable electronic device in accordance with examples described herein.

FIG. 24 is a schematic illustration of a band that may include a repeater and/or wearable electronic device in accordance with examples described herein.

The device 2400 includes a band 2406, coil 2402, and aperture 2404. The band 2406 defines the aperture 2404.

The band 2406 may be implemented, for example, by a wrist band, watch band, fitness monitor band, lag band, arm band, head band, bracelet, necklace, ring or other wearable item.

The coil 2402 may be integrated in the band 2406, for example, by being buried in the band, supported by the band, attached to the band, or other integration mechanism. In some examples, the coil 2402 may be implemented as an antenna. Antennas described herein may be implemented using omnidirectional and/or phased array antennas.

The band 2406 may define an aperture 2404. The aperture 2404 may be sized to house, contain, or support an electronic device. For example, an electronic device may be snapped into the aperture 2404. When positioned in the aperture 2404 (e.g. "snapped in"), the electronic device may be in communication with the coil 2402, through direct or indirect electrical connection. In this manner, the coil 2402 may in some examples serve as an antenna for the wearable electronic device 2306. In some examples, the band 2406 with the coil 2402 may be used to implement a repeater described herein, such as the body-worn repeater 2304 of FIG. 23. In some examples, one or more circuits used to operate the repeater may be contained in the aperture 2404.

While the band 2406 is shown as defining aperture 2404 in FIG. 24, in some examples, supporting members may define a cavity for housing an electronic device, may include a recess for housing an electronic device, may include an attachment mechanism for attaching to an electronic device, and/or may define a recess or indentation for housing an electronic device.

The band 2406 may be made out of any material. The band 2406 may be made in some examples out of a hypoallergenic material.

While a single aperture 2404 is shown in FIG. 24 for containing a single electronic device, in other examples bands or other supporting members may house, support, or attach to multiple electronic devices. Accordingly, in some examples, multiple apertures may be provided by the band 2406 in some examples.

An electronic device placed in the aperture 2404 may be charged via the coil 2402 in the band 2406 via conventional conductive charging where the physical interface between the band 2406 and electronic device may include a split metal wring with each component of the wring being a positive or negative electrode. In some examples the electronic device placed in the aperture 2404 may be charged via the use of inductive coupling between the charging interface of the electronic device and the band 2406. This coupling may in some examples be optimized given that the loads and exact positions of the coils in each device may be fixed. The position and load within an electronic device may be specified in an integrated circuit design (ICD) for the band 2406.

The coil 2402 of the band 2406 may be charged from a base unit (e.g. the base unit 2302 of FIG. 23) via wireless power transfer, examples of which are described herein. In some examples, the base unit (e.g. Base unit 2302) may include a proximity sensor which may provide the position and approximate orientation of the band 2406 with respect to the base unit. The load on a resonator in the base unit may then be dynamically adjusted to as to maximize and/or increase resonant coupling between the two units. A predictive algorithm may operate on a micro controller in the base unit to estimate the relative motion of the band with respect to the base unit and apply corrections to the dynamic load in the base unit resonator.

The device 2400 may be implemented as a repeater separate from the electronic wearable device or an antenna that is connected to the electronic wearable device.

Figure 25:
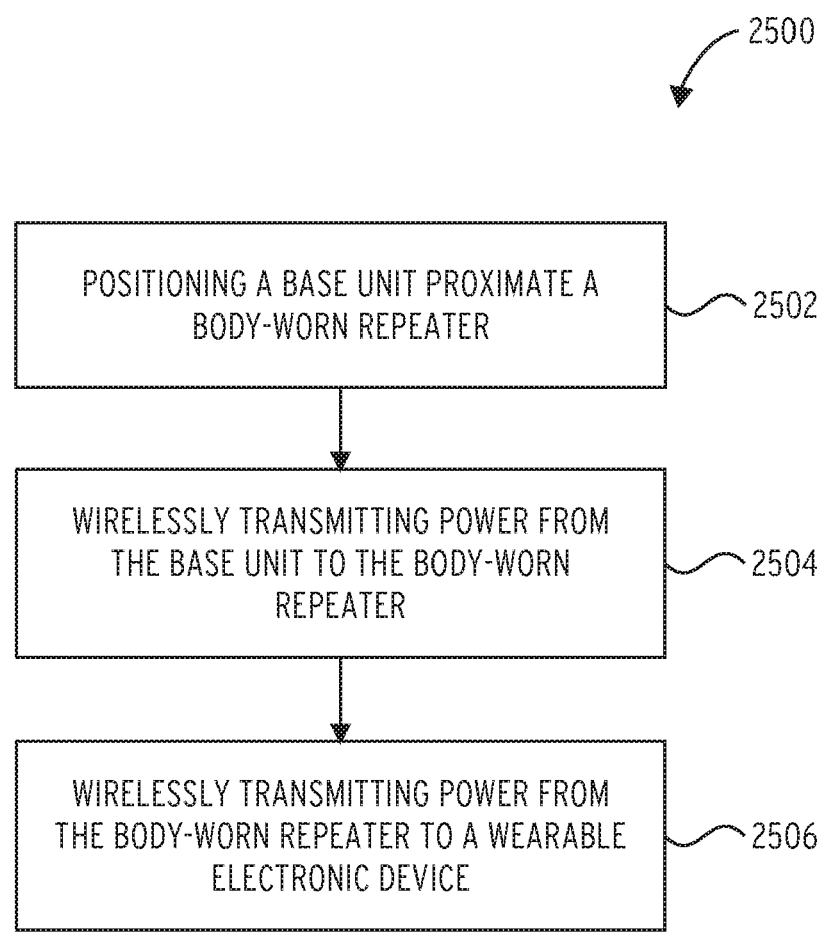
FIG. 25 is a flowchart illustrating a method arranged in accordance with examples described herein.

FIG. 25 is a flowchart illustrating a method arranged in accordance with examples described herein.

A method 2500 may include positioning a base unit proximate a body-worn repeater 2502, wirelessly transmitting power from the base unit to the body-worn repeater 2504, and wirelessly transmitting power from the body-worn repeater to a wearable electronic device 2506.

The method 2500 may be implemented using the system 2300 of FIG. 23, and/or the device 2400 of FIG. 24.

In some examples, positioning a base unit proximate a body-worn repeater 2502 may be implemented using a base unit, such as the base unit 2302 of FIG. 23, The base unit may include a transmitting coil for wirelessly transmitting power to a receiving coil of the body-worn repeater. In some examples, positioning a base unit proximate a body-worn repeater 2502 includes positioning the base unit such that a distance between the base unit and the body-worn repeater is less than a charging range of the base unit.

Generally, charging range refers to a distance at which power is meaningfully being transferred from one device to another.

In some examples, positioning a base unit proximate a body-worn repeater 2502 includes wearing the base unit. For example, the base unit may be worn on a belt, necklace, armband, leg band, mobile phone or other communication system, hat, clothing, or combinations thereof. The base unit in some examples may be carried in a briefcase, hand, purse, pocket, backpack, or combinations thereof. The base unit in some examples may be implemented using a case attached to a mobile phone or other communication system. In some examples positioning a base unit proximate a body-worn repeater 2502 may include positioning a base unit in a room, automobile, aircraft, or other location near a user.

In some examples, the body-worn repeater may be implemented in or as a ring, watch, bracelet, necklace, earring, hair band, hair clip, shoe, belt, broach, clip, hat, helmet, band, strap, or combinations thereof.

In some examples, the method 2500 may include housing or attaching the wearable electronic device in or to the body-worn repeater. For example, the body-worn repeater may define an aperture, such as the device 2400, for receiving the wearable electronic device. The wearable electronic device may be snapped into or attached to or placed into the body-worn repeater.

In some examples, wirelessly transmitting power from the base unit to the body-worn repeater 2504 includes wirelessly transmitting power from the base unit to the body-worn repeater while the base unit remains within the charging range of the body-worn repeater.

In some examples, wearable electronic device 2306 of FIG. 23 may be used to implement the method 2500. The wearable electronic device may include a receiving coil.

In some examples, a distance between the body-worn repeater and the wearable electronic device is smaller than a distance between the base unit and the wearable electronic device.

In some examples, wirelessly transmitting power from the body-worn repeater to a wearable electronic device 2506 may include wearing the wearable electronic device within a distance less than a charging range of the body-worn repeater from the body-worn repeater. For example, the body-worn repeater may be worn as a necklace, and the wearable electronic device may be worn on or around the head, neck, or shoulders while the base unit may be positioned or worn about the waist or lower body. Wirelessly transmitting power from the body-worn repeater to a wearable electronic device 2506 may include energizing the coil in the wearable electronic device with the coil of the body-worn repeater.

In some examples, wirelessly transmitting power from the base unit to the body-worn repeater 2504 may include bringing the body-worn repeater and wearable electronic device within a distance less than a charging range of the body-worn repeater from the body-worn repeater. For example, a necklace, armband, wristband, or watch including the body-worn repeater may be lifted closer to a wearable electronic device by, for example, moving the necklace with a user's hand, or bringing a user's arm in closer proximity to the wearable electronic device e.g. nearer the head, neck, or shoulders).

In some examples, methods include wirelessly transmitting power from the body-worn repeater to a plurality of wearable electronic devices. The plurality of wearable electronic devices may include respective further receiving coils, and the further receiving coils of the wearable electronic devices may each be smaller than the receiving coil of the body-worn repeater. The distance between certain or all of the wearable electronic devices and the body-worn repeater may be smaller than a distance between certain or all of the wearable electronic devices and the base unit.

The method 2500 may include wearing the body-worn repeater and wearing or carrying the base unit and wearable electronic device.

Figure 26:
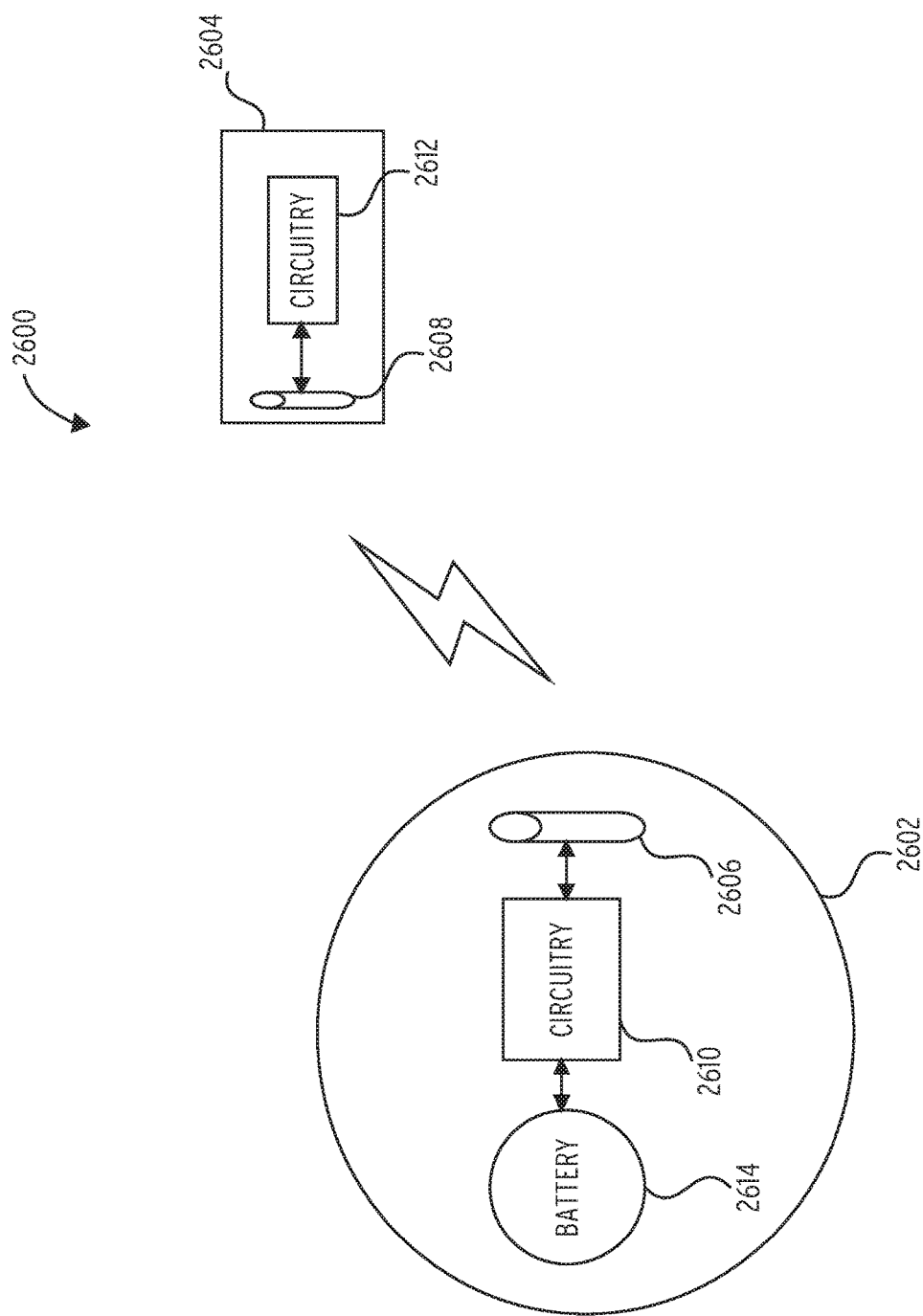
FIG. 26 is a schematic illustration of a system arranged in accordance with examples described herein.

FIG. 26 is a schematic illustration of a system arranged in accordance with examples described herein. The system 2600 may include a transmitter 2602 and a receiver 2604. The transmitter 2602 may include a transmitter coil 2606, circuitry 2610, and a battery 2614. The receiver 2604 may include a receiver coil 2608 and circuitry 2610. The transmitter 2602, receiver 2604, and/or system 2600 may include additional components in some examples. For example, the transmitter 2602 may include an antenna. Multiple antennas and/or coils may be included in the transmitter 2602 in some examples.

The transmitter 2602 may serve to provide wireless power to the receiver 2604. Generally, the transmitter 2602 may be implemented using any base unit described herein. The receiver 2604 may be implemented using any electronic device described herein, including a wearable electronic device such as but not limited to a camera, sensor, or hearing aid. While a single receiver 2604 is shown in FIG. 26, any number of receivers may be used in the system 2600. The transmitter 2602 may provide wireless power to one or more receivers in the system 2600. In some examples, one or more receivers may provide data or other signals back to the transmitter 2602.

The transmitter 2602 includes a transmitter coil 2606, circuitry 2610, and battery 2614. The transmitter may have any form factor. For example, example base units described herein may be implemented in a case for a mobile communication device, such as a cell phone. In other examples, the transmitter 2602 may be included in housing and used to power devices. The transmitter 2602 may for example be implemented in a housing having a thin, circular form factor e.g. similar to a make-up compact). In some examples, a housing used to implement the transmitter 2602 may have an indent, cavity, or other receiving surface for supporting a receiver, such as the receiver 2604 in examples Where the receiver 2604 may be placed into or on the transmitter 2602. Generally, however, there may be distance separation between the transmitter coil 2606 and receiver coil 2608.

The transmitter 2602 may transmit power between 1 microwatt to 100 watts in some examples. In some examples, when transmitting to an electronic wearable device receiver that may be worn on a human body, the transmitted energy may be 10 watts or less. Generally, an amount of power transmitted may be less than limits set by regulatory authorities, such as the FCC, for RF energy exposure. For example, the amount of power transmitted may be less than 0.08 Watts per kilogram of the user in some examples, less than 0.4 Watts per kilogram of the user in some examples, less than 1.6 Watts per kilogram of the user in some examples, and less than 8 Watts per kilogram of the user in some examples. In some examples, a strength of the magnetic field used at a particular frequency may be less than or equal to limits allowed by regulation—e.g. ETSI-30 regulation compliant. For example, ETSI-30 regulations may allow for 6 dBµA/m at 10 m at frequencies between 119 to 135 kHz.

The transmitter coil 2606 may be implemented using a magnetic metal core (e.g. a rod of magnetic material) in a wire winding. The magnetic metal core may be implemented using a ferrite material. The magnetic metal core may be shaped with its length longer than its width. The magnetic metal core may be shaped with its length longer than its diameter. The wire winding may be implemented using, for example, stranded wire. Litz wire and/or copper wire. Litz wire generally refers to wire that includes many thin wire strands, individually isolated and woven together. Litz wire can be used to reduce resistive losses in some examples due to skin effect or proximity effect in a coil. This may allow in some examples for higher Q values. Examples of transmitting coils described herein (e.g. with reference to FIGS. 15A-15C and FIGS. 16A-16C) may be used to implement the transmitter coil 2606.

In some examples, the transmitter coil 2606 may be implemented using one or more planar (e.g. flat) coils adjacent to one or more planar (e.g. flat) magnetic material structures. The distance separated receiver (e.g. receiver coil 2608)_can use a coil wire wound around a magnetic material core. The magnetic material core can be, by way of example only, in the shape of a rod.

The battery 2614 may store power for transmission by the transmitter coil 2606. In some examples, the battery 2614 may receive a charge from a wired connection during a charging mode of the transmitter 2602. In some examples, the transmitter 2602 may include energy harvesting circuitry and/or sensors which may charge the battery 2614 using energy harvested from the environment (e.g. solar, wind, vibrational, and/or thermal energy).

The circuitry 2610 may control power transmission from the transmitter coil 2606. The circuitry 2610 may have an impedance which may, in some examples, be adjustable. Generally, the transmitter 2602 may have an impedance (e.g. an impedance of the transmitter coil 2606 and circuitry 2610). The impedance of the transmitter 2602 may in some examples be adjusted by selecting and/or adjusting the impedance of the circuitry 2610. The circuitry 2610 may have an impedance set by one or more inductive element(s), such as inductor(s), capacitive element(s), such as capacitor(s), and/or resistive element(s), such as resistor(s). Any or all of those elements may be adjustable. In some examples, the circuitry 2610 may include a tuning capacitor comprising a dielectric material.

The load (e.g. impedance) and/or the frequency provided by the transmitter (e.g. in base station) may then be dynamically adjusted in some examples so as to improve or maximize resonant coupling between the two transmitter and receiver. This process may be referred to as adaptive tuning. The transmitter 2602 may include a microcontroller or other processing unit(s) (e.g. processors) which may execute a predictive algorithm to estimate relative motion of the receiver with respect to the transmitter and apply corrections to the dynamic load or frequency in the transmitter. In some examples, a proximity sensor may be provided in the transmitter 2602 or other example base stations. The proximity sensor may detect a position and approximate orientation of the receiver with respect to the transmitter for use in tuning and/or applying corrections in the transmitter for power coupling. Generally any components that can tune the electromagnetic frequency, its amplitude or its phase by altering its reactance, resistance, capacitance or inductance may be used. For example, one or more ASICs. The tuning process may be controlled by a signal analyzer that may monitor and analyze signals from a sensor or sensors that detect distance between the transmitter and the receiver, the relative alignment between the transmitter and the receiver (e.g. alignment between magnetic cores of the transmitter and the receiver), and/or changes in electrical characteristics of the electrical circuits of the transmitter and the receiver that may be caused for example by introduction or withdrawal of electrical power sources or sinks (e.g. loads) in the transmitter or the receiver (e.g. repeater and/or electronic wearable device).

In some examples both the transmitter and the receiver (e.g. repeater and/or wearable device) may be moving (e.g. moving relative to one another). In some examples, processing unit(s), such as ASICs and/or one or more embedded processors, may be provided in one or both of the transmitting and receiving devices to estimate relative motion. The devices may include additional sensors for estimating motion including, but not limited to) accelerometers, gyroscopes, inertial measurement units, or ranging devices (ultrasonic, optical, or otherwise). Algorithms which estimate motion and relative motion may include (but are be limited to) Kalman filters, extended Kalman filters, Savitzky-Golay filters, phase-lock loops, time of flight estimators, phase estimators, and coherent interferometric processing.

Alignment of transmitters and receivers (e.g. of the magnetic core of transmitting and receiving coils described herein) may, by way of example only, be effected through the use of a coil array on the transmitter (e.g. base unit), use of phased antenna arrays on the transmitter (e.g. base unit) and receiver (e.g. repeater and/or wearable electronic device), alignment of coils or antennas via the use of piezoelectric devices or other similar devices, or via direction to the user by way of an indicator. Accordingly, base units, transmitters, and/or receivers described herein may be provided with an indicator (e.g. a light, speaker) that provides an indication (e.g. a light or sound) based on the proximity and/or relative angle between the transmitter and receiver (e.g. between magnetic cores of transmit and receive coils described herein). For example, the transmitter may be optimized to provide power transfer at a particular angle and/or distance to the receiver, and circuitry and/or processing unit(s) may be provided to control the indicator to provide an indication when the transmitter and receiver are within the particular angle and/or distance for power transfer, which may be a range.

The receiver coil 2608 may be implemented using a magnetic metal core (e.g. a rod of magnetic material) in a wire winding. The magnetic metal core may be implemented using a ferrite material. The magnetic metal core may be shaped with its length longer than its width. The magnetic metal core may be shaped with its length longer than its diameter. The wire winding may be implemented using, for example, stranded wire, Litz wire and/or copper wire. Examples of coils described herein may be used to implement the receiver coil 2608. Example sizes for the receiver coil 2608 include 20 mm length×3 mm diameter in some examples, 40 mm length by 6 mm diameter in some examples, 80 mm length×12 mm diameter in some examples.

The receiver coil 2608 may be implemented using one or more planar (e.g, flat) coils adjacent to one or more planar (e.g. flat) magnetic material structures and the distance separated transmitter (e.g. transmitter coil 2606) may be implemented using a coil wire wound around a magnetic material core. The magnetic material core can be, by way of example only, in the shape of a rod.

The circuitry 2612 may control receipt of power transmitted by the transmitter coil 2606 by the receiver coil 2608. Generally, the receiver 2604 may have an impedance (e.g. an impedance of the receiver coil 2608 and circuitry 2612). The impedance of the transmitter 2602 may in some examples be adjusted by selecting and/or adjusting the impedance of the circuitry 2612. The circuitry 2612 may have an impedance set by one or more inductive element(s), such as inductor(s), capacitive element(s), such as capacitor(s), and/or resistive element(s), such as resistor(s). Any or all of those elements may be adjustable. In some examples, the circuitry 2612 may include a tuning capacitor comprising a dielectric material.

The receiver 2604 and transmitter 2602 (e.g. the receiver coil 2608 and transmitter coil 2606) may be separated by a distance in accordance with examples described herein. The distance may be on the order of millimeters in some examples, centimeters in some examples, meters in some examples.

Generally, the transmitter coil 2606 may be larger than the receiver coil 2608 in some examples, such that a base unit may be used to charge a relatively small device (e.g. a wearable electronic device). In some examples, the transmitter magnetic metal core of transmitter coil 2606 has a volume that is 10 times or larger than a volume of the magnetic metal core of the receiver coil 2608, 100 times or larger than the volume of the magnetic metal core of the receiver coil 2608 in some examples, 1000 times or larger than the volume of the magnetic metal core of the receiver coil 2608 in some examples. In some examples, the wire winding of the transmitter coil 2606 has a winding length that is 10 times or larger than a winding length of the wire winding of the receiver coil 2608, 100 times or larger than a winding length of the wire winding of the receiver coil 2608 in some examples, or 1000 times or larger than a winding length of the wire winding of the receiver coil 2608 in some examples.

The system 2600 may in some examples advantageously transmit and receive power at body-safe frequencies. In some examples, the transmitter 2602 is configured to transmit wireless power at a frequency in a range of 100 kHz to 200 kHz. In some examples, the transmitter 2602 is configured to transmit wireless power at a frequency within a range of 125 kHz+/−3 kHz. In some examples, the transmitter 2602 is configured to transmit wireless power at a frequency within a range of 125 kHz+/−5 kHz may be used. In some examples, the transmitter 2602 is configured to transmit wireless power at a frequency within a range of 6.75 MHz+/−5 MHz. By operation at a particular frequency (e.g. transmission of power at a particular frequency), in some examples refers to the use of a carrier frequency at the specified frequency or frequency range by the circuitry 2610 and/or circuitry 2612. Inverter circuits may be included in the circuitry 2610 and/or circuitry 2612 to achieve operation at the specified frequency and/or frequency ranges.

In some examples, the transmitter impedance and the receiver impedance are optimally matched for a particular distance separation between the transmitter and the receiver, and non-optimized for all other separation distances. By optimally matched, in some examples, the efficiency of power transfer may peak (e.g. be above 95%, above, 90%, above 85%, above 80%, or other thresholds in other examples) at the particular separation distance. The transmitter impedance and receiver impedance may be selected to optimally match during power transfer at the particular distance. The particular distance may be selected, for example, in accordance with a typical use case for the transmitter 2602 and/or receiver 2604. For example, the particular distance may be selected based on a distance between the transmitter coil 2606 and receiver coil 2608 that may be expected during normal use (e.g. if the transmitter 2602 is designed for placement on a table, and the receiver 2604 is designed for placement within a particular distance, that may be the particular distance used for optimally matching the impedance). In another example, if the transmitter 2602 is designed to be worn at one location, e.g. a user's belt, and the receiver 2604 is designed to be worn at a second location, e.g. a user's eyewear, the particular distance may be equal to a typical distance between the first and second locations (e.g. the distance between the user's belt and eyewear, or a typical user's belt and eyewear).

Generally, power transfer efficiency may be a function of the Q values of the transmitter 2602 and receiver 2604. The power transfer efficiency may be given as:

$$\eta \approx \frac{k^2 \cdot Q_1 \cdot Q_2}{\left(1 + \sqrt{1 + k^2 \cdot Q_1 \cdot Q_2}\right)^2}$$

where $Q_1$ is the Q value of the transmitter 2602, $Q_2$ is the Q value of the receiver 2604, and k is the coupling coefficient. Generally, the stronger the coupling in this example, the higher the transfer efficiency of the system 2600. Efficiency may be dependent in examples of the system 2600 on a ratio of distance between the transmitter coil 2606 and receiver coil 2608 and the coil sizes. Generally, the system Q value may be a geometric mean of the Q values of the transmitter 2602 and receiver 2604.

In some examples, the transmitter impedance and the receiver impedance may be optimally matched for at least two particular distance separations between the transmitter and the receiver, and non-optimized for all other separation distances. The impedance may be optimally matched for two particular distances in some examples, three particular distances in some examples, or another number of distances in other examples. By optimally matched, in some examples, the efficiency of power transfer may peak (e.g. be above 95%, above, 90%, above 85%, above 80%, or other thresholds in other examples) at the particular separation distance. The circuitry 2610, circuitry 2612, or both, may have at least two settings to achieve optimal impedance matching at the at least two distances (e.g. one set of settings may be used at one distance and another at a second distance). Other sets of settings may be used where additional distances may be optimally matched. To select an appropriate impedance value, the circuitry 2610, circuitry 2612, or both may select V attics for adjustable elements of the circuitry (e.g. adjustable capacitor(s)) to attain the desired impedance value.

The particular distances may be selected, for example, in accordance with a typical use case for the transmitter 2602 and/or receiver 2604. For example, where the transmitter 2602 is positioned at a first position (e.g. a user's belt), the receiver 2604 may typically be found in a number of different distances from the first position (e.g. when the receiver 2604 is implemented using a camera, the receiver 2604 may be positioned at some times on eyewear of the user worn on the face at a first distance from the first position, and may be positioned at other times, for example, in a pocket of the user at a second distance from the first position). The circuitry 2610, circuitry 2612, or combinations thereof may adjust their impedance based, for example, on a sensor reading indicative of distance between the transmitter 2602 and receiver 2604. For example, the circuitry 2610, circuitry 2612, or both may have one impedance value for use at one distance and another impedance value for use at another distance.

In some examples, the transmitter impedance and the receiver impedance may be optimally matched for a plurality of separation distances using automatic iterative impedance optimization. For example, the circuitry 2610, circuitry 2612, or both may implement automatic iterative impedance optimization.

In some examples, the transmitter impedance and the receiver impedance may be optimally matched for a particular relative orientation between the transmitter 2602 and the receiver 2604 (e.g. between the transmitter coil 2606 and the receiver coil 2608), and non-optimized for all other relative orientations. By optimally matched, in some examples, the efficiency of power transfer may peak (e.g. be above 95%, above. 90%, above 85%, above 80%, or other thresholds in other examples) at the particular relative orientation. The transmitter impedance and receiver impedance may be selected to optimally match during power transfer at the relative orientation. The particular relative orientation may be selected, for example, in accordance with a typical use case for the transmitter 2602 and/or receiver 2604. For example, the particular relative orientation may be selected based on a distance between the transmitter coil 2606 and receiver coil 2608 that may be expected during normal use (e.g. if the transmitter 2602 is designed for placement on a table, and the receiver 2604 is designed for placement relative to the transmitter in a certain location, the resulting orientation may be the particular relative orientation used for optimally matching the impedance). In another example, if the transmitter 2602 is designed to be worn at one location, e.g. a user's belt, and the receiver 2604 is designed to be worn at a second location, e.g. a user's eyewear, the particular relative orientation may be the orientation typically expected from devices positioned at the first and second locations (e.g. the relative orientation between devices positioned at the user's belt and eyewear, or a typical user's belt and eyewear).

In some examples, the transmitter impedance and the receiver impedance may be optimally matched for at least two particular relative orientations between the transmitter and the receiver, and non-optimized for all other relative orientations. The impedance may be optimally matched for two relative orientations in some examples, three relative orientations in some examples, or another number of relative orientations in other examples. By optimally matched, in some examples, the efficiency of power transfer may peak (e.g. be above 95%, above, 90%, above 85%, above 80%, or other thresholds in other examples) at the particular relative orientations. The circuitry 2610, circuitry 2612, or both, may have at least two settings to achieve optimal impedance matching at the at least two relative orientations (e.g. one set of settings may be used at one relative orientation and another at a second relative orientation). Other sets of settings may be used where additional relative orientations may be optimally matched. To select an appropriate impedance value, the circuitry 2610, circuitry 2612, or both may select values for adjustable elements of the circuitry (e.g. adjustable capacitor(s)) to attain the desired impedance value.

The particular relative orientations may be selected, for example, in accordance with a typical use case for the transmitter 2602 and/or receiver 2604. For example, where the transmitter 2602 is positioned at a first position (e.g. a user's belt), the receiver 2604 may typically be found in a number of different positions relative to the first position (e.g. when the receiver 2604 is implemented using a camera, the receiver 2604 may be positioned at some times on eyewear of the user worn on the face in a first relative orientation from the first position, and may be positioned at other times, for example, in a pocket of the user at a second relative orientation from the first position). The circuitry 2610, circuitry 2612, or combinations thereof may adjust their impedance based, for example, on a sensor reading indicative of the relative orientation between the transmitter 2602 and receiver 2604. For example, the circuitry 2610, circuitry 2612, or both may have one impedance value for use at one relative orientation and another impedance value for use at another relative orientation.

In some examples, the transmitter impedance and the receiver impedance may be optimally matched for a plurality of relative orientations using automatic iterative impedance optimization. For example, the circuitry 2610, circuitry 2612, or both may implement automatic iterative impedance optimization. A variety of circuit techniques may be employed to achieve iterative impedance optimization, including but not limited to tapping and/or active circuit approaches.

In some examples, the transmitter impedance and the receiver impedance may be adjusted automatically, for example, using an actuator controlled by an algorithm (e.g. using a controller, custom circuitry, and/or programmed computing system) to a preset or target value(s) required for optimum transfer efficiency at a particular distance or particular orientation. The algorithm may be implemented using firmware or on board software in the transmitter and receiver electronics, including for example, an ASIC, a microcontroller or a programmable field array. The preset or target value(s) may be stored in a look up table used by the algorithm.

In some examples, the transmitter and the receiver may be provided with telemetry capability so that the transmitter and the receiver may wirelessly exchange information on their location and/or orientation. This data may then be used by the optimization program to compute the impedances of the transmitter and the receiver circuits for optimum wireless transfer efficiency between the transmitter and the receiver. In some examples, this optimization program may include an automatic iterative impedance optimization.

The receiver 2604 and transmitter 2602 may be loosely coupled.

Generally speaking, wireless energy transfer between transmitters and receivers involves far field transfer in which the distance between the transmitter and the receiver is a large numerical multiple of the wavelength of the electromagnetic energy being used to effect the wireless energy transfer process. In some examples, the distance between the transmitter and the receiver is also a large multiple of the diameter or length of the coil inside the receiver.

The system 2600 may be a weak resonant system having a Q value below 100. In some examples, however, the Q value may be above 100. The system Q value may be the geometric mean of the Q values of the transmitter 2602 and receiver 2604 (e.g. the Q value of the transmitter coil 2606 and/or circuitry 2610 for the transmitter 2602 and the Q value of the receiver coil 2608 and/or circuitry 2612 for the receiver 2604). System Q value may be influenced by resistive losses in the circuitry 2610 and/or circuitry 2612. The system Q value may be selected by selecting an appropriate wire and winding scheme for the transmitter coil 2606 and/or receiver coil 2608. Generally, weakly resonant systems have lower system Q-factors than highly resonant systems. A Q-value may be selected to achieve a weak resonant system (e.g. Q less than 100).

Weakly resonant may refer to examples where the transmitter and the separated receiver of a wireless power transfer system are not impedance matched, but are designed to resonate at the same frequency, whereby the wireless power system utilizes a Q value that is less than 100 and in certain cases less than 50, and is some less than 10.

Figure 27:
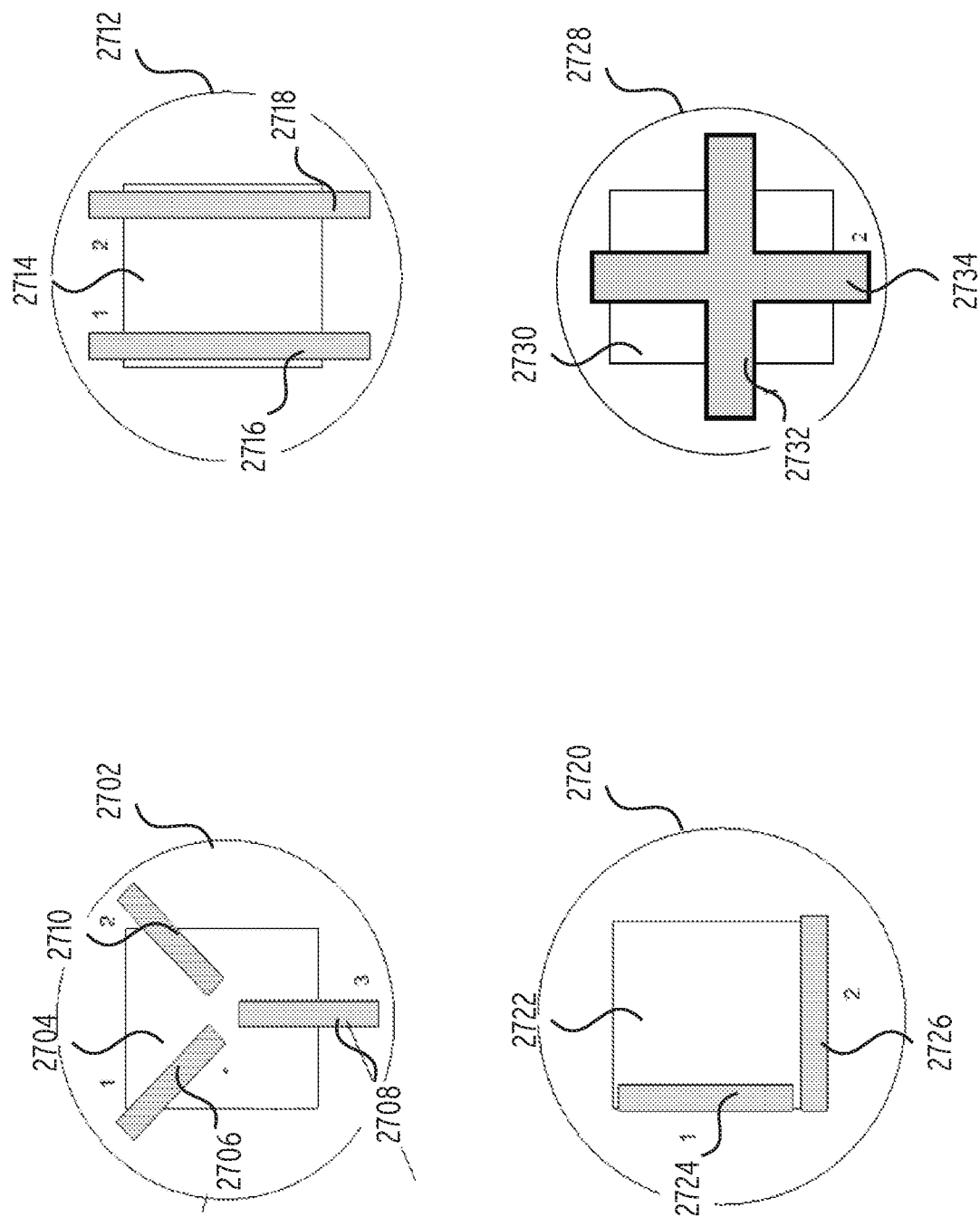
FIG. 27 is a schematic illustration of four transmitter designs arranged in accordance with examples described herein.

FIG. 27 is a schematic illustration of four transmitter designs arranged in accordance with examples described herein. Generally, multiple of transmitter coils (e.g. magnetic cores) may be used in example transmitters described herein. Providing multiple transmitter coils each with a different orientation may, in some examples, improve orientation independence of example systems described herein.

Wireless charging with single sources may in some examples create a degree of orientation dependence. While the use of wire wound ferrite cores in examples described herein may produce a reasonable magnetic field distribution for charging, even good single source transmitter may have some remaining degree of directional dependence. Accordingly, the use of multiple transmitters may aid in reducing orientation dependence of the wireless power delivery capability in some examples.

Examples described herein may provide weakly resonant wireless power systems having multiple transmitting coils—each transmitting coil may be implemented using a wound ferrite core as described herein. Weakly resonant may generally be used herein to refer to the transmitter and the separated receiver of a wireless power transfer system being not impedance matched, but designed to resonate at a same frequency, such that the wireless power system utilizes a Q value that is less than 100 in some examples, less than 50 in some examples, and less than 10 in some examples. The multiple transmitting coils may be driven to produce an improved omnidirectional radiation pattern over time. Such a system may allow a receiving system to be largely orientation insensitive, or have improved orientation insensitivity, since the receiver coils may be significantly smaller than the transmitter coils used in example transmitters described herein. The small receiving coil (e.g. wire wound ferrite core receiver) may be considered to be essentially immersed in a rotating magnetic field provided by the larger transmitter coils. This may allow the receiver to have a wide range, or improved range, of orientations relative to the transmitter and still receive a significant amount of energy from the transmitter.

Example transmitters may include at least two wire wound ferromagnetic cores magnetic coils placed in a position in space in a predefined orientation and driven in a phased manner to eliminate and/or reduce the unidirectionality of the magnetic field while creating a rotating magnetic field over time.

The transmitter 2702 includes a battery 2704 and coil 2706, coil 2708, and coil 2710. The coils 2706, 2708, and 2710 have rod-shaped cores arranged to extend radially away from a center of the transmitter 2702, with each rod-shaped core spaced 120 degrees from the other. The coils 2706, 2708, and 2710 may be implemented using wire wound ferrite core sources described herein. The coils 2706, 2708, and 2710 may be placed over a single power source, such as, by way of example only, a rechargeable battery 2704. The coils 2706, 2708, and 2710 may be driven in a sequenced fashion so as to prevent an approximately static uni-directional magnetic field pattern that may result if the sources were driven in phase.

Figure 31:
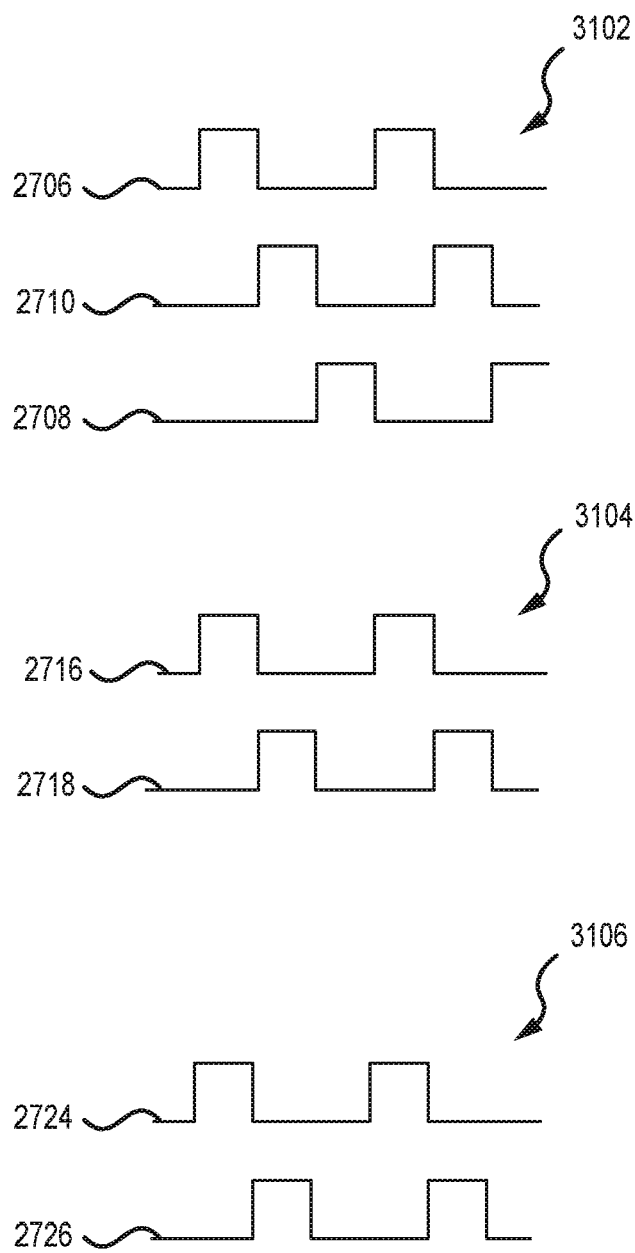
FIG. 31 is a schematic illustration of driving sequences that may be used to drive the transmitter designs shown in the example of FIG. 27 arranged in accordance with examples described herein.

FIG. 31 is a schematic illustration of driving sequences that may be used to drive the transmitter designs shown in the example of FIG. 27 arranged in accordance with examples described herein. For example, the driving sequence 3102 may be used to drive the coils of the transmitter 2702. The driving sequence 3102 illustrates driving signals provided to the coils 2706, 2708, and 2710. Sequences pulses, square waves in the example of FIG. 31, although other pulse shapes may be used, are provided to the coils 2706, 2708, and 2710. In some examples, the pulses are sequenced such that the pulse delivered to each coil 2706, 2708, and 2710 does not overlap in time, however in some examples an overlap may be present. Generally, however, the driving sequence 3102 may be selected to provide a generally omnidirectional and/or rotating field, or field having improved omnidirectionality and/or rotation. In some examples, the peak of the driving signal provided to each of the three coils in the example of transmitter 2702 may be provided at different times.

The transmitter 2712 includes a battery 2714 and coil 2716 and coil 2718. The coils 2716 and 2718 may be implemented using wire wound ferrite core sources described herein. The two coils 2716 and 2718 may be placed on either side of the power source, here battery 2714. The coils 2716 and 2718 are oriented parallel to one another and spaced apart in the transmitter 2712. The coils 2716 and 2718 may be driven in a sequenced manner. A driving sequence 3104 is shown in FIG. 31 for driving the coils 2716 and 2718. Sequences pulses, square waves in the example of FIG. 31, although other pulse shapes may be used, are provided to the coils 2716 and 2718. In some examples, the pulses are sequenced such that the pulse delivered to each coil 2716 and 2718 does not overlap in time, however in some examples an overlap may be present. Generally, however, the driving sequence 3104 may be selected to provide a generally omnidirectional and/or rotating field, or field having improved omnidirectionality and/or rotation. In some examples, the peak of the driving signal provided to each of the two coils in the example of transmitter 2712 may be provided at different times.

The transmitter 2720 includes a battery 2722 and coil 2724 and coil 2726, The coils 2724 and 2726 may be implemented using wire wound ferrite core sources described herein. The two coils 2724 and 2726 may be placed on a power source, here battery 2714, The coils 2724 and 2726 are oriented 90 perpendicularly to one another. The coils 2724 and 2726 are shown as aligning along one edge of the coils 2724 and 2726, however in another example, the coil 2724 may be positioned to extend from a middle portion of the coil 2726, or vice versa. The coils 2724 and 2726 may be driven in a sequenced manner. A driving sequence 3106 is shown in FIG. 31 for driving the coils 2724 and 2726. Sequences pulses, square waves in the example of FIG. 31, although other pulse shapes may be used, are provided the coils 2724 and 2726. In some examples, the pulses are sequenced such that the pulse delivered to each coil 2724 and 2726 does not overlap in time, however in some examples an overlap may be present. Generally, however, the driving sequence 3106 may be selected to provide a generally omnidirectional and/or rotating field, or field having improved omnidirectionality and/or rotation, in some examples, the peak of the driving signal provided to each of the two coils in the example of transmitter 2720 may be provided at different times.

The transmitter 2728 includes a battery 2730 and coil 2732 and coil 2734. The coils 2732 and 2734 are oriented perpendicular to one another and overlapping at a central section. The coils 2732 and 2734 may be implemented using wire wound ferrite core sources described herein. In some example, the coils 2732 and 2734 may be formed using a single, cross-shaped core. The coils 2732 and 2734 may be placed on a power source, here battery 2714.

Other coils configurations may be used in other examples including 4 coils placed around the four sides of a power source and driven out of phase or sequenced in an analogous manner as described with reference to the configurations of FIG. 27 and FIG. 31, Another example includes two coils placed in a 90-degree cross pattern and driven 90 degrees out of phase with one another (e.g. as shown in transmitter 2728).

All coils shown in FIG. 27 may be implemented using a core of a magnetic material (e.g. ferrite) included in a wire winding (e.g. stranded wire, Litz wire, copper wire, or combinations thereof).

Generally, the receiving coils used to receive power from the transmitters shown in FIG. 27 may be significantly smaller than the coils used in the transmitters. The coupling between the transmitter and receiver coils may be only loosely coupled as described herein and the overall size of each coil (e.g. transmitter and receiver) may be reduced by using a magnetic (e.g. ferrite) core. The wireless power system may have a Q value that is less than 100, in some cases less than 50, and in some cases less than 10. Accordingly, example wireless power systems described herein may be weakly resonant.

Transmitter and/or receiver designs may be optimized by selecting a material (e.g. ferrite) core material permeability, a core size, a number of windings, and a wire type to produce a desired inductance along with a selected capacitance to produce a resonant receiver or transmitter coil. This can be described in the expression $2\pi F=1/sqrt(L*C)$ Where L is the inductance, C is the capacitance of the system and F is the resonant frequency.

In this manner, resonant LC circuits on the transmitter and receiver side may be provided. In some examples, the capacitance may be chosen based on the coil inductance, by way of example only, at a resonance frequency at or near 125 kHz. In some examples, a resonance frequency of 125 kHz+/−3 kHz may be used. In some examples, a resonance frequency of 125 kHz+/−5 kHz may be used. Other frequencies may be used as described herein. The inductance and the capacitance may be different for transmitter and receiver, but they are chosen so that both transmitter and receiver may have resonance at the design frequency, by way of example only, at or near 125 kHz. In certain different embodiments the range of the design frequency can be within the range of 100 kHz to 130 kHz.

The described component selected may be performed even if the transmit and receiver coils are significantly different in size, which may occur in examples described herein where the receiver coil may be significantly smaller such that it may be placed, e.g. in an electronic wearable device. Since the system is operating in the near-field, the size of the coil may not have to match with the wavelength of the transmitted energy and as such both the transmitter and receiver coils may be quite small relative to the wavelength of the transmitted frequency. However, in some examples the transmit coils may be significantly larger than the receiver coils. This may allow for opportunities for charging and for charging multiple devices with the same transmitter coil or coils.

Accordingly, one or more transmit and receive coils in systems described herein may be designed to be in resonance at a predetermined frequency (e.g through selection of the inductance, capacitance, and/or resistance provided by the coil and/or to the coil). The predetermined frequency may be the same in the transmit coils and the receiving coils of the system in some examples. The frequency of the driving waveform (e.g. the frequency of the pulses delivered in the driving waveforms 3102, 3104, and 3106 of FIG. 31) may be at a fundamental design frequency of the coils placed in the transmitter.

Figure 28:
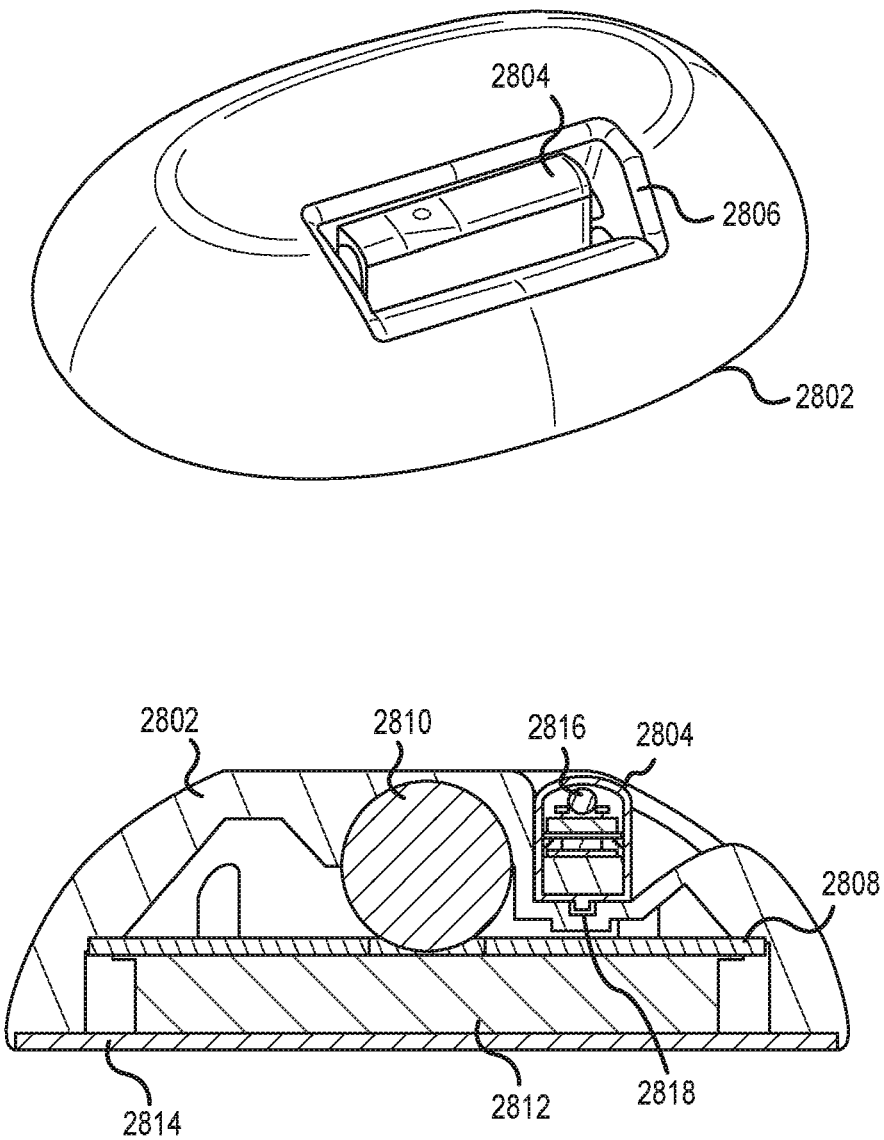
FIG. 28 is a schematic illustration of a base unit system and a cross-sectional view of the base unit system in accordance with examples described herein.

FIG. 28 is a schematic illustration of a base unit system and a cross-sectional view of the base unit system in accordance with examples described herein. The base unit 2802 may have a housing which defines a recess 2806. A receiver e.g. an electronic device such as camera 2804) may be placed in the recess 2806 for charging in some examples. Although camera 2804 is shown in FIG. 28, generally any electronic device having a receiver coil may be used in other examples.

A cross-sectional view of the base unit 2802 and camera 2804 is also shown in FIG. 28. The base unit 2802 may have a housing which, together with optional cover 2814, encloses a transmitter coil 2810, circuit board 2808, and battery 2812.

The transmitter coil 2810 and receiver coil 2816 may be implemented using examples of transmitter and receiver coils described herein. For example, the transmitter coil 2810 and receiver coil 2816 may be implemented using a magnetic material core (e.g. rod) which may be implemented using a ferrite material, within a wire winding (e.g. stranded. Litz, and/or copper wire winding).

The circuit board 2808 may include circuitry for wireless power delivery from the battery 2812, using the transmitter coil 2810, to the receiver coil 2816. Examples of circuitry described herein may be used to implement circuitry on the circuit board 2808.

In some examples, the circuitry on the circuit board 2808 may be optimized for wireless power delivery at a particular distance and/or relative orientation.

The recess 2806 may be designed such that it facilitates placement of an electronic device (e.g. Camera 2804) such that a receiver coil 2816 of the camera 2804 is positioned at a particular distance and with a particular relative orientation to the transmitter coil 2810. For example, the camera 2804 and recess 2806 may be designed to place the receiver coil 2816 at a distance and/or relative orientation from the transmitter coil 2810 for which circuitry on the circuit board 2808 is optimized for wireless power transmission.

In some examples, the recess 2806 and/or camera 2804 may include mating features, such as mating features 2818, to aid in proper positioning of the camera 2804. For example, as shown in FIG. 28, the camera 2804 may include a protrusion while the recess 2806 includes a groove sized to receive the protrusion on the camera 2804.

Figure 29:
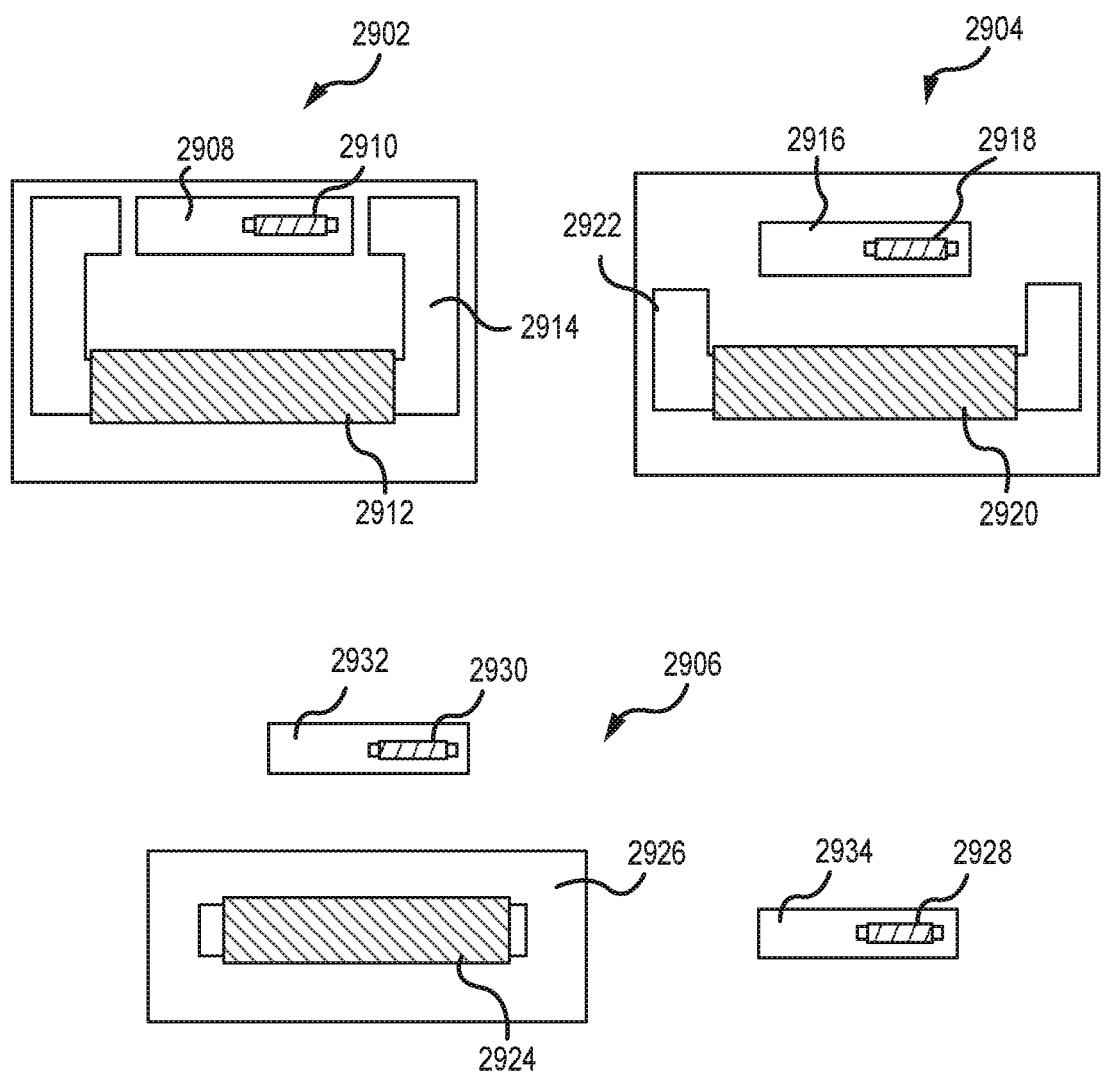
FIG. 29 is a schematic illustration of a variety of transmitter and receiver arrangements in accordance with examples described herein.

FIG. 29 is a schematic illustration of a variety of transmitter and receiver arrangements in accordance with examples described herein. Three arrangements are shown in FIG. 29—arrangement 2902, arrangement 2904, and arrangement 2906.

In the arrangement 2902, receiver 2908 includes receiver coil 2910. The transmitter coil 2912 includes a wire winding around a portion of a magnetic material 2914. The magnetic material 2914 is shaped in a U-shape with additional portions at the top of each U arm turned back toward the center. The receiver 2908 may be positioned for charging such that it is aligned between those additional portions. The U-shaped magnetic material 2914 with additional portions at the top of each U arm may provide for strongly guided flux for charging the receiver 2908, which has a receiver coil 2910 aligned with the transmitter coil 2912.

In the arrangement 2904, receiver 2916 includes receiver coil 2918. The transmitter coil 2920 includes a wire winding around a portion of a magnetic material 2922. The magnetic material 2922 is shaped in a U-shape. The receiver 2916 may be positioned for charging such that it is aligned so the receiver coil 2918 is parallel to the wire-wound portion of the magnetic material 2922. The receiver 2916 may, however, not be between the U arms. The shape of the magnetic material 2922 may aid in partially guiding flux for charging the receiver 2916.

In the arrangement 2906, receiver 2932 and receiver 2934 include receiver coil 2930 and receiver coil 2928, respectively. The transmitter coil 2924 includes a wire winding around a portion of a magnetic material 2926. The magnetic material 2926 may be shaped like a rod. Receiver 2932 and receiver 2934 (and any number of other receivers) may be positioned for charging such that they are aligned so their respective receiver coils are parallel with the wire-wound portion of the magnetic material 2926. The shape of the magnetic material 2926 may aid in partially guiding flux for charging the receiver 2932 and the receiver 2934.

Examples of base units and systems described herein may advantageously be used to provide power in some examples to certain forms of electronic wearable devices that may utilize significant amounts of power such that it is difficult or undesirable to build the battery requirements desired (e.g. for an 8 hour day) completely into the electronic wearable devices—for example devices worn on or about the head of a wearer. Smaller battery capacity may undesirably result in having to recharge the electronic wearable device during the day thus causing the wearer to not be able to utilize the electronic wearable device. By way of example only, such electronic wearable devices may include, but are not limited to body-worn hearing aids or medical devices or implantable hearing aids or other medical implants. Example systems described herein may be used to charge, power and/or augment additional power to the electronic wearable device by way of mobile wireless power transfer so that the form factor of the electronic wearable device need not be increased.

Accordingly, systems and base units described herein (such as the transmitter 2602 of FIG. 26) may be used to wirelessly power electronic wearable devices that may be worn on or about a head of a user (e.g. such electronic wearable devices may be or include the receiver 2604 of FIG. 26). The transmitter 2602 may be attached to and/or incorporated in an article worn around the neck and/or shoulders. In some examples, a plurality of transmitters may be provided. The transmitter may be removable, re-attachable and rechargeable in some examples. The transmitter can be housed within a pouch in some examples. The transmitter can be housed within an attachable and detachable pouch in some examples. The transmitter can be surrounded with a cushioning material in some examples. The transmitter can be surrounded by a breathable material in some examples. The transmitter can be attached to and/or incorporated in a scarf in some examples. The transmitter can be attached to and/or incorporated in a cloth tube worn on the neck in some examples. The transmitter can be attached to and/or incorporated in a collar in some examples. The transmitter can be attached to and/or incorporated in a vest in some examples. The transmitter can be attached to and/or incorporated in a coat in some examples. The transmitter can be attached to and/or incorporated in a garment worn on the shoulders in some examples. The transmitter can be attached to and/or incorporated in a shirt in some examples. The transmitter can be attached to and/or incorporated in a jacket in some examples. For example, a transmitter may be incorporate in a patch, or multiple patches, such as three patches, and incorporated on a jacket, such as in the shoulders of the jacket or on a surface of the jacket. The transmitter may transmit at a body safe frequency.

Figure 36:
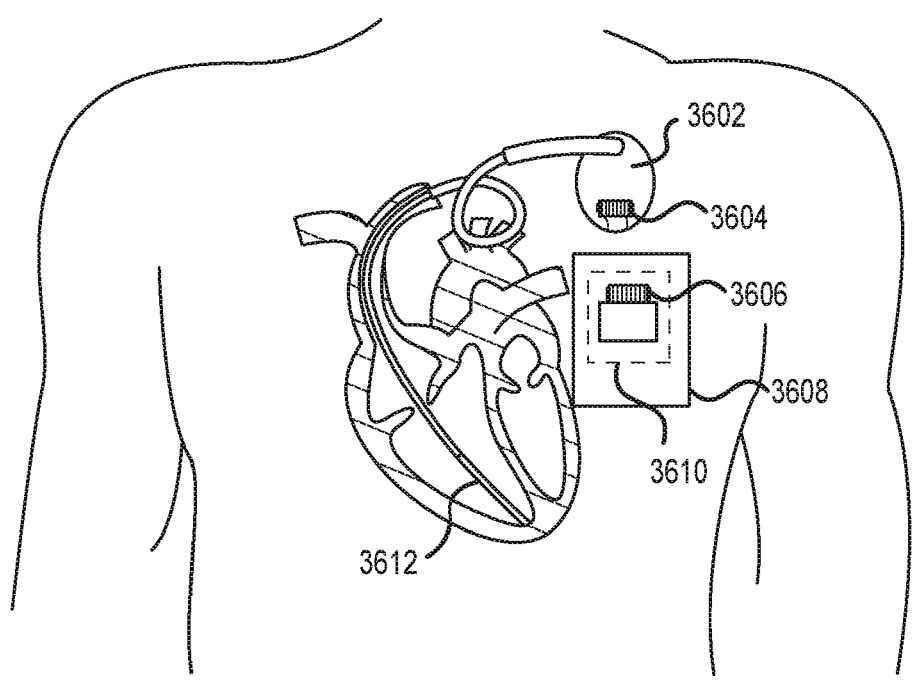
FIG. 36 is a schematic illustration of a wirelessly powered implantable device arranged in accordance with examples described herein.

The electronic wearable device may be a hearing aid (e.g. the receiver such as the receiver 2604 of FIG. 26, may be mounted to and/or incorporated in a body-worn or implanted hearing aid). In other examples, the electronic wearable device can be another type of electronic device, such as a different type of medical device e.g., body worn, or partially or fully implanted such as an insulin pump, a cardiac monitor, or a pacemaker as shown in FIG. 36).

The transmitter surface closest to the body of the wearer may be located near a metallized fabric to reflect heat and magnetic flux of the transmitter. The transmitter surface furthest away from the body of the wearer may include vents for releasing heat from the transmitter.

Figure 30:
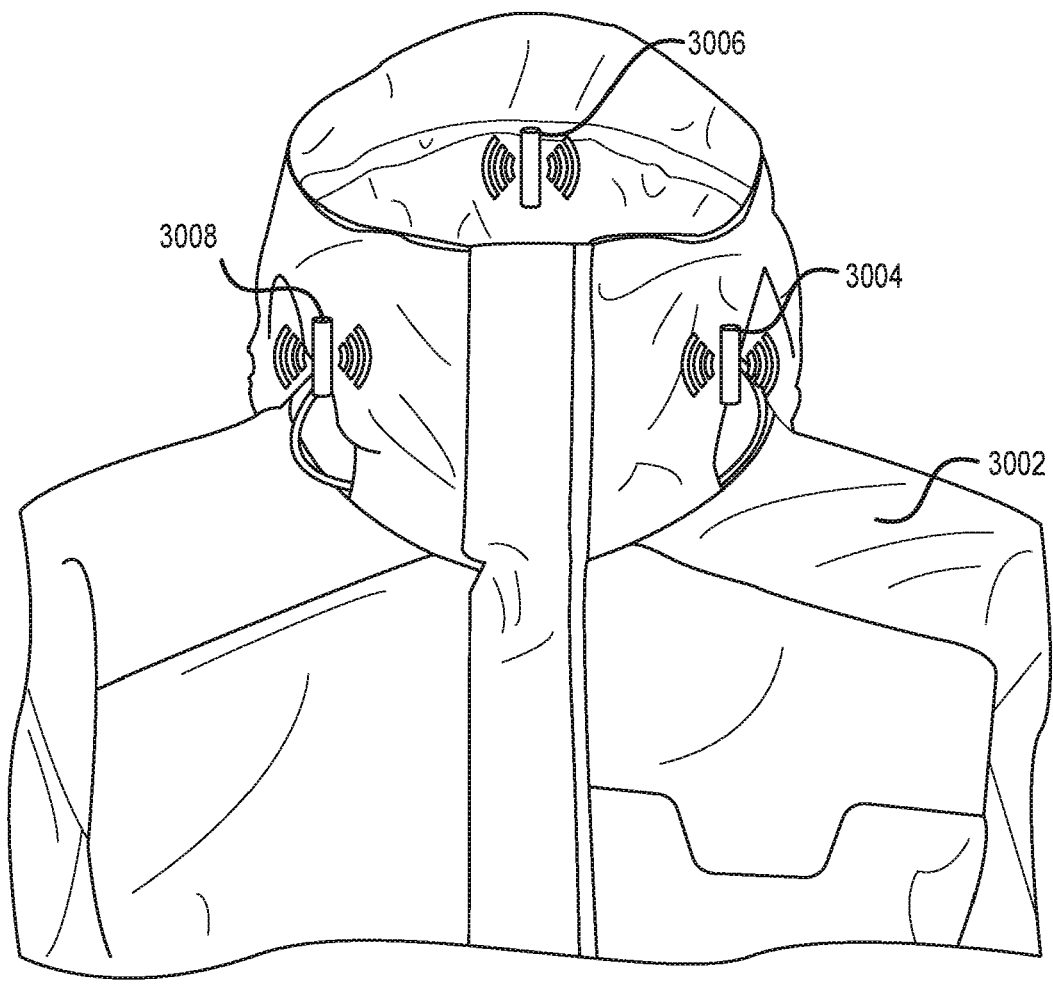
FIG. 30 is a schematic illustration of transmitter placement in a jacket in accordance with examples described herein.

FIG. 30 is a schematic illustration of transmitter placement in a jacket in accordance with examples described herein. While illustrated and described with reference to a jacket, it will be understood that transmitters according to the present disclosure may be placed in other articles worn by a user, such as other clothing articles (e.g., a shirt, a vest, a pant, a dress, etc.) or accessories (e.g., an eyewear, a watch, an arm band, a necklace or other jewelry, a belt, a head covering, etc.) The jacket 3002 is shown having three transmitters—transmitter 3004, transmitter 3006, and transmitter 3008, positioned in the collar of the jacket. Other locations, such as the shoulders, front, or back, of the jacket may be used in other examples. The transmitters in FIG. 30 are shown schematically by their transmitter coils, although the coil and electronics may be packaged in a patch. Each transmitter may be implemented using any of the transmitter technology described herein, such as the transmitter 2602 of FIG. 26, are disposed on a jacket. Each patch may be sized for example, 100 mm×50 mm×38 mm and may include fabric insulation, such as 5 mm fabric insulation, around the patch. Each patch may be suitable for providing about 5 Watts of power, although other amounts may be provided in other examples. Each transmitter may have a transmitter coil measuring 67 mm×12 mm each, including a magnetic core and wire winding around the magnetic core. The transmitters may be positioned on the jacket within 200 mm of a wearable electronic device (e.g. hearing aid) for an expected 15% power transfer efficiency in this example although other distances and efficiencies may be achieved in other examples. The total power transmitted from the three patches to the hearing aid may be approximately expected to be the root mean squared (RMS) sum of the power transmitted from each transmitter times the efficiency, e.g., $0.15 \sqrt{(5^2+5^2+5^2)}=1.3$ watts. A total of 350 mA at 3.7V may be provided in the goggle, giving a 35% duty cycle if a power need of 250 mA is assumed. Other currents, voltages, and duty cycles may be achieved in other examples. Each transmitter may be provided with a 1600 mA lithium ion rechargeable battery, and the patches may have an interface for recharging the battery, which may be wired or wireless. Expected dimensions of the transmitter in this example are 28 mm×50 mm×100 mm. Each transmitter may further include PMIC firmware that may alternate turning each transmitter ON/OFF in accordance with the power requirements.

From the position on the wearable article, such as the jacket 3002 in FIG. 30, the transmitters may power any of a variety of wearable electronic devices, such as a hearing aid worn or implanted in the wearer of the jacket 3002, and/or devices such as cell phones, watches, walkie-talkies, guns, or other devices carried or worn on the arms or waist of the wearer of the jacket. In other examples, transmitters may be positioned in other clothing near to wear an electronic wearable device may be expected to be located (e.g. in a shoe for a leg- or ankle-worn electronic wearable device).

Examples described herein may accordingly allow for generally any body worn item, (e.g. body worn unit) to serve as a wireless charging system. The body worn charging unit may detect devices that require charging, and only transmit charging power when a device is within a predetermined distance from the body worn unit, but not necessarily physically attached to said body worn unit with the attachment mechanisms.

Examples described herein may find use in powering implanted devices, such as medical devices. Increasingly, electronic devices are being implanted within the human body. These devices can offer many benefits for those in which they are implanted. These devices may require electrical power. In most cases an implanted electrical device may include a battery that has a limited life time. Once this life time is approached, the battery must be removed and a new one installed/implanted. Medical devices that may be powered by example wireless charging systems described herein include, by way of example only, deep brain neurostimulators, hearing aid implants, cochlear implants, cardiac pace makers, cardioverter defibrillators, insulin pumps, subdermal biosensors, drug implant pumps, implantable stimulators (e.g. nerve, bladder, deep brain, spinal cord), or combinations thereof. The ongoing need for power may hamper the usefulness of these devices in some examples. There is a need to safely be able to recharge the battery of an implanted electronic device in situ without having to reopen the subcutaneous skin tissue layer.

Figure 32:
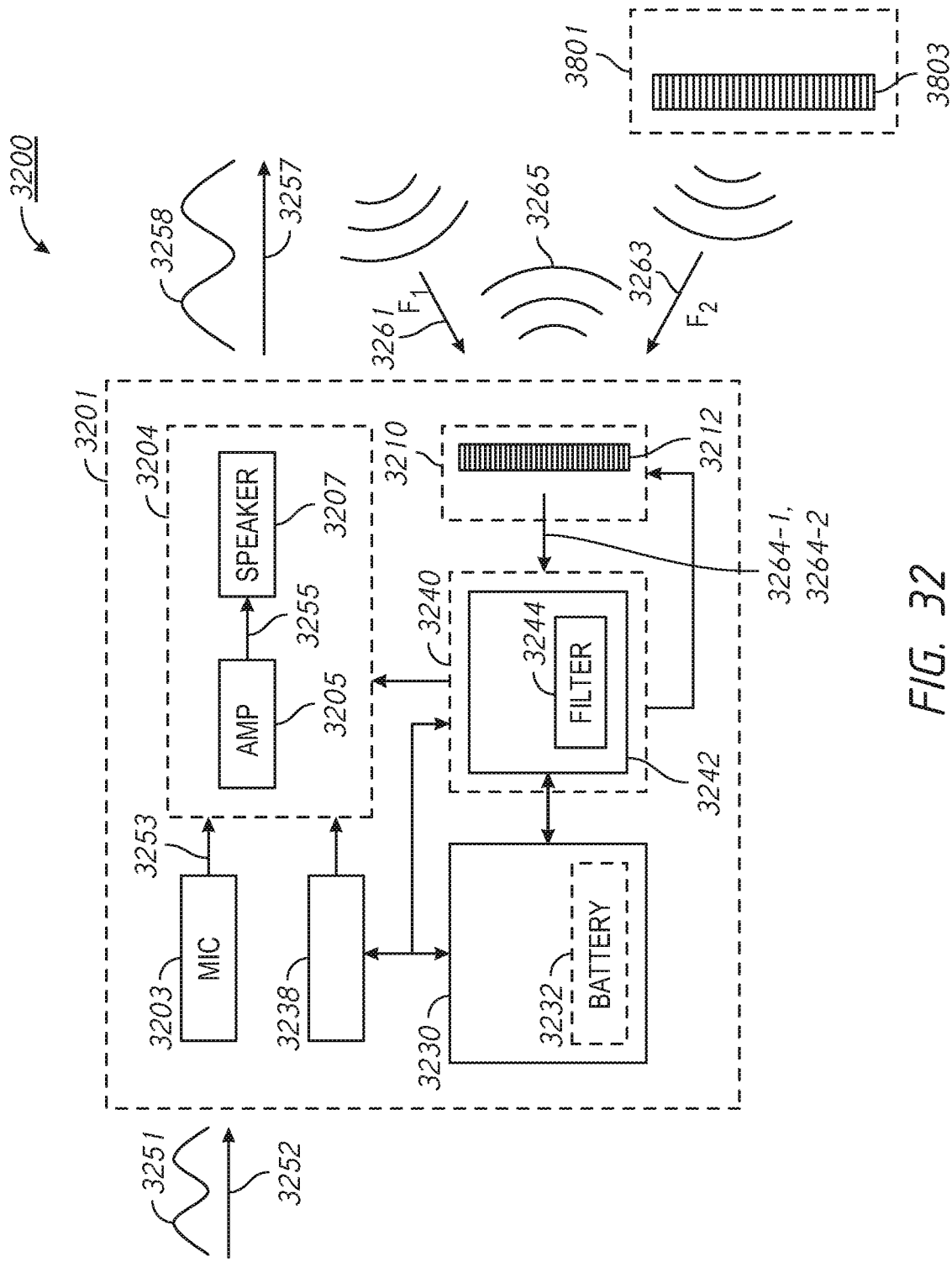
FIG. 32 is a schematic illustration of a hearing aid arranged in accordance with examples described herein.

FIG. 32 is a schematic illustration of a hearing aid system 3200 arranged in accordance with some examples herein. The hearing aid system 3200 includes a hearing aid device 3201 (or simply hearing aid 3201), which may be configured to be wirelessly powered or wirelessly charged by a wireless power transfer unit (e.g., base unit 3801) as described herein. The base unit 3801 may be implemented in accordance with any of the examples herein. For example, the base unit may be implemented in accordance with base unit 100, 300, 1600, or another device comprising a transmitter such as transmitter 2602. The hearing aid device 3201 may be an in-the-ear hearing aid, a behind-the-ear hearing aid, an implanted hearing aid or other type of hearing aid. In the illustrated example, the hearing aid device 3201 includes a microphone 3203, an amplifier 3205, and a speaker 3207. The microphone 3201 is configured to detect ambient sounds (e.g., acoustic waves 3251). The microphone is configured to convert the acoustic input 3252 (e.g., detected acoustic waves) into electrical signals 3253, which are transmitted to the amplifier 3205. The amplifier is operatively coupled to the microphone to receive the signals 3253. The amplifier 3205 amplifies the signals representative of the detected acoustic input (i.e., signals 3253) and transmits the amplified signals 3255 to the speaker 3207, which then generates acoustic output 3257 (e.g., audible sounds represented by acoustic waves 3258) that that can be provided to the user. The hearing aid 3201 may include one or more analog-to-digital and digital-to-analog signal converters (not shown), which may be part of the overall audio processing circuitry 3204 of the hearing aid device 3201.

In accordance with the examples herein, the heating aid 3201 may be configured to receive power wirelessly. The hearing aid 3201 may include a receiver 3210 configured to receive wireless power from a transmitter, for example the transmitter of a base unit, a transmitter of a body-worn repeater, or one or more transmitters embedded in or attached to a wearable article. The receiver 3210 may be implemented in accordance with any of the examples herein. For example, the receiver may include at least one receiving or receiver coil which is configured to receive radio wave signals in given frequency ranges. In some examples, the receiver may include a telecoil, a communication coil, or both, any one of which may be configured as multi-function receiving coils (e.g., to wirelessly receive audio signals, power signals, as well as perform communication functions such as reception and/or transmission of data).

In some examples, the receiver may be integrated with a telecoil (or T-coil) of the hearing aid device 3201. In some examples, the telecoil of the hearing aid may provide the audio function of a typical telecoil as well as functionality for wireless power reception. In other examples, as discussed further below with reference to FIG. 38, the hearing aid may additionally or alternatively include a communication coil which may also be configured to provide the audio function (e.g., receive audio signals) as well as a wireless power reception function (e.g., receive power signals)

In the illustrated example in FIG. 32, the hearing aid device 3201 includes a telecoil 3212, which is configured to pick up radio wave signals (also referred to as RF signals) when the telecoil is provided in a magnetic field, such as the magnetic field generated by a hearing loop, an infrared system, or an FM transmitter. As shown in FIG. 32, the telecoil 3212 is configured to pick up radio frequency (RF) signals 3261 in a first frequency range F1. The telecoil 3212 may be further configured to pick up radio frequency (RF) signals 3263 in a second frequency range F2. The telecoil may generate and transmit first signals 3264-1 responsive to the signals 3261 in the first frequency range. The signals 3264-1 may be coupled to a switching circuit 3242. The telecoil may also generate and transmit second signals 3264-2 responsive to the signals 3263 in a second frequency range. The signals 3264-2 may be coupled to the switching circuit.

The switching circuit 3242, may be integrated with a hearing aid controller 3240, may be configured to isolate the 3264-1 from the signals 3264-2. The switching circuit may be configured to couple the signals 3264-1 to the audio processing circuitry 3204 for generating acoustic output representative of the first signals 3261-1. Thus, the signals 3261-1 may also be referred to as audio signals and the first frequency range may be referred to as audio frequency range. Typically, the acoustic signals include RF signals having a frequency below 10 kHz. The audio frequency range may thus include signals with frequencies between 1 Hz and 10 KHz.

The switching circuit 3242 may be configured to couple the signals 3264-2 to the power supply circuitry 3230 for use in powering components of the hearing aid 3201. That is, the power supply circuitry 3230 may generate power responsive to the second signals 3264-1. In some examples, the power supply circuitry 3230 may include a rechargeable battery 3232 and may be configured to recharge the battery 3232 responsive to the second signals 3264. Thus, in this manner, the signals 3263 received up by the telecoil 3212 may be used to wirelessly recharge the hearing aid 3201. In some examples, the power supply circuitry 3230 may directly power the hearing aid device without storing power. In some examples, the power supply circuitry 3230 may include one or more capacitors which may provide for temporary storage of power.

The second frequency range F2 may include signals having a frequency of 10 KHz and above. The use of signals in different frequency ranges may reduce the risk of interference between the audio and power functions of the telecoil. In some examples, the second frequency range F2 may include signals in frequencies that are significantly higher than the audio frequencies, such that isolation of the signals in the F2 range can be easily made and thus interference with normal operation of the audio functions of the telecoil may be substantially avoided. In some examples, the second frequency range F2 may include frequencies above 100 KHz.

Figure 33:
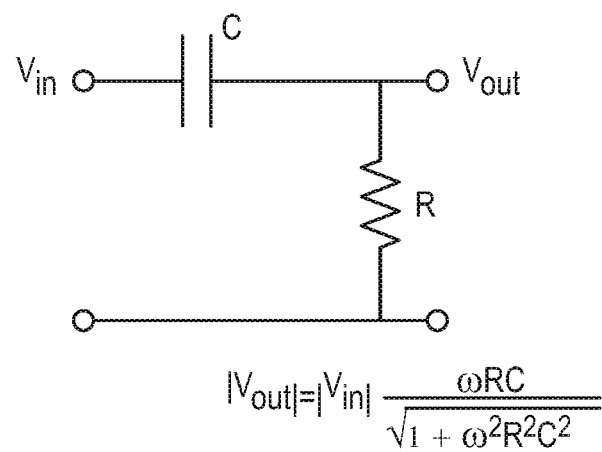
FIG. 33 is a circuit diagram of a high pass filter in accordance with examples described herein.

To separate the signals in the F1 range from those in the F2 range, the signals 3264-1, 3264-2 from the telecoil may be passed to the switching circuit 3242, which may be configured to isolate signals in predetermined ranges of frequencies. The switching circuit 3242 may be configured to direct signals having frequencies in the first range (F1 range) towards the audio processing circuitry 3204 and to direct signals having frequencies in the second range (F2 range) towards the power supply circuitry 3230. The switching circuit 3242 may include one or more filters 3244. For example, the signals from the telecoil (e.g., signals 3264-1, 3264-2) may be passed through a high-pass filter and a low-pass filter connected in parallel. An example of a high-pass filter is shown in FIG. 33. The high-pass filter may be configured pass the higher frequency signals (e.g., signals 3264-2) and attenuate signals below a cutoff frequency (e.g., signals below the minimum value of the power frequency range). The low-pass filter may be configured pass the lower frequency signals (e.g., signals 3264-1) and attenuate signals above a cutoff frequency (e.g., signals above the maximum value of the audio frequency range). The higher frequency signals isolated by the switching circuit 3242 may then be coupled to the power supply circuitry for power generation (e.g., for charging the battery 3232). The lower frequency signals isolated by the switching circuit 3242 may then be coupled to the audio processing circuitry for audio generation (e.g., for providing the acoustic output 3257).

In some examples, the receiver 3210 of the hearing aid device 3201 may include a separate receiving coil in addition to or instead of the telecoil, which is configured to receive wireless power signals (e.g., signals 3263 in the second frequency range). The receiver may include a coil having a rod-shaped magnetic core (e.g. ferrite or other ferromagnetic material) wound with a wire winding (e.g. copper wire, or Litz wire). In some examples, the receiver 3210 may also be configured to receive and/or transmit data 3265 (e.g., configuration data). The hearing aid 3201 may include a storage device 3238 (e.g., non-volatile memory) operatively connected to the receiver for storing data associated with the hearing aid device. The memory may also store programming (e.g., computer executable instructions, which may be used by a controller 3240 to control functions of the hearing aid device 3201.

A base unit 3801 may be provided in proximity to the hearing aid device, for example, positioned in a shirt pocket of the user, or otherwise attached to and/or worn by the user such as on a belt, a necklace, or eyewear worn by the user. Unlike existing wireless charging devices which typically require the device being charged to be placed and remain into, onto or in a specific location with respect to the charging device while charging, the base unit 3801 may be mechanically decoupled and thus movable relative to the hearing aid device during wireless power transfer. In some examples, the base unit 3801 may be distance separated from the hearing aid, for example by 5 mm, 10 mm, 20 mm, 50 mm, 100 mm, 200 mm or a greater distance. The base unit 3801 may be implemented using any examples of base units described herein, and may include a transmitter including transmitter coil 3803. The base unit 3801 may provide power to the hearing aid device 3201 to power or charge the battery of the hearing aid device by coupling power from the transmitter coil 3803 to the receiver 3201 (e.g., to the telecoil 3212 or other receiving coil).

Generally, any base unit and/or transmitter and/or transmitter coil described herein may be utilized to provide wireless power to an implanted electronic device. Generally, any receiver and/or receiver coil described herein may be incorporated in and/or attached to an implanted electronic device for receipt of wireless power which may, for example, recharge a battery of the implanted electronic device.

While the example in FIG. 32 is described with reference to a worn hearing aid, a similar configuration may be used to implement an implanted hearing device such as COCHLEAR brand hearing implant or another type of implantable medical device such as a cardiac pacemaker or implantable defibrillator, an example of which is described further with reference to FIG. 36.

In some embodiment the power transfer functions can be turned off during the normal use of the telecoil (e.g., when receiving audio signals). This can be done with intelligent communication between the base unit and the hearing aid or it can be done by keeping the magnetic field strength of the power transmitter weak enough that charging signals can only be picked up near the base unit when the hearing aid is not in use and is removed for the evening. In still other embodiments a switch can be placed the base unit, to manually disable the broadcasting of wireless power, and/or the hearing aid. In the case of a switch on the hearing aid, the switch can default into a position in which the telecoil is only connected to the power supply circuitry when the hearing aid is placed in close proximity to the base unit (e.g., a fraction, such as 50%, 25%, or less, of the available charging range of the base unit). In this manner, the telecoil may be set to only operate as an audio pick up device when the hearing aid is in use (i.e., worn by the user) with the telecoil switching to charging mode when the hearing aid is not in use (i.e. not worn by the user but placed near the base unit for charging).

As described, the telecoil may include a ferrite core. A telecoil with a ferrite core may be suitable for wireless power transfer due to the core's high magnetic permeability. In other examples, other materials can be used for the core such as, by way of example only, ferrite, mu metal, Vitroperm 500F, or another high permeability metal. In certain embodiments the transmitter coil core can be made of ferrite and the receiver coil core can be made of a different magnetic metal material. In other embodiments the transmitter coil core and the receiver coil core can be made of the same magnetic metal material. In still other embodiments the receiver coil core can be made out of ferrite and the transmitter coil core can be made of a different magnetic metal material. The wire winding material can be that, by way of example only, of a copper wire, wire strands of copper or other conductive metals, Litz, or other suitable conductive wire.

Figure 34:
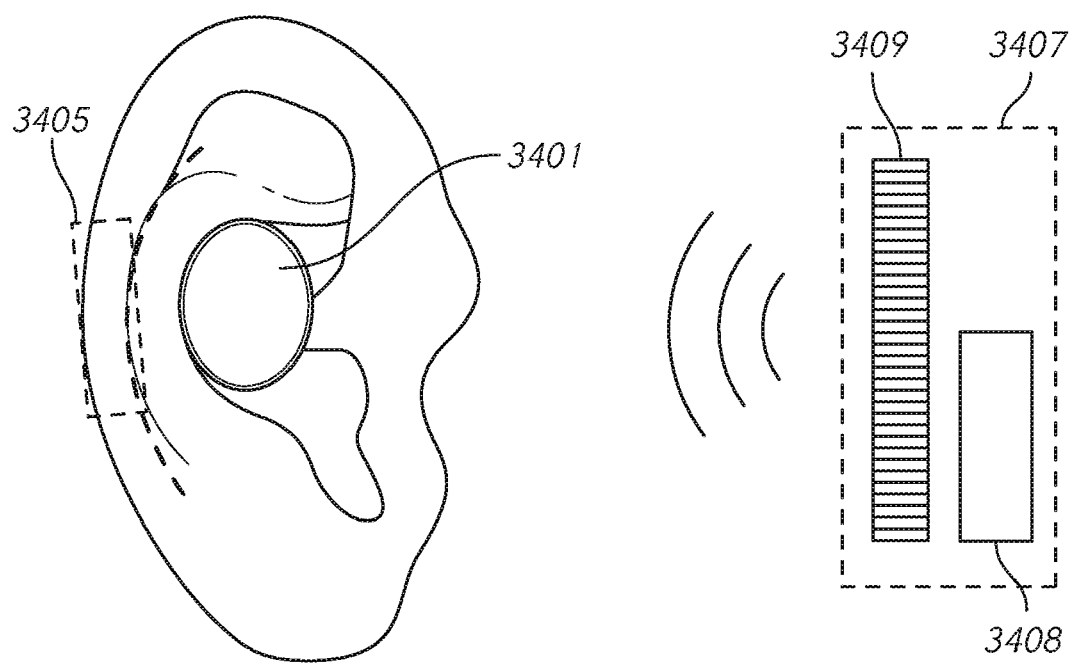
FIG. 34 is a schematic illustration of a wireless charging system including a hearing aid and at least one base unit in accordance with examples described herein.

Systems according to further examples may include intermediate base units, as shown for example in FIGS. 34-35. FIG. 34 shows a system 3400 which includes an in-the-ear hearing aid device 3401 and an intermediate base unit 3405. The hearing aid device 3401 may be implemented in accordance with any of the examples herein. For example, the hearing aid device 3201 may be used to implement hearing aid device 3401. The intermediate base unit 3405 may be implemented in accordance with any of the examples of power transmitting devices described herein. For example, the base unit 100, any of the transmitters 2602, 2702, 2712, 2720, and 2728, or body-worn repeater 2304 may be used to implement intermediate base unit 3405. The intermediate base unit 3405 may or may not include a power storage component (e.g. a battery).

In some examples, the intermediate base unit 3405 may be configured to only retransmit power, without storing it onboard the intermediate base unit 3405, from another base unit 3407 which may store power for example in a battery 3408. The base unit 3407 may include a transmitting coil 3409 which is configured to couple power to a receiving coil in the intermediate base unit 3405, which then retransmits the power to a receiving coil in the hearing aid device 3401 (e.g., a telecoil of the hearing aid device 3401). The base unit 3407 may be implemented in accordance with any of the examples of power transmitting devices described herein, such as the base unit 100, or any of the transmitters 2602, 2702, 2712, 2720, and 2728. In the example in FIG. 34, components of the intermediate base unit 3405 is body-worn (e.g., arranged in a housing at least a portion of which is positionable over and/or behind the user's ear similar to an ear hook type headphone.

Figure 35A:
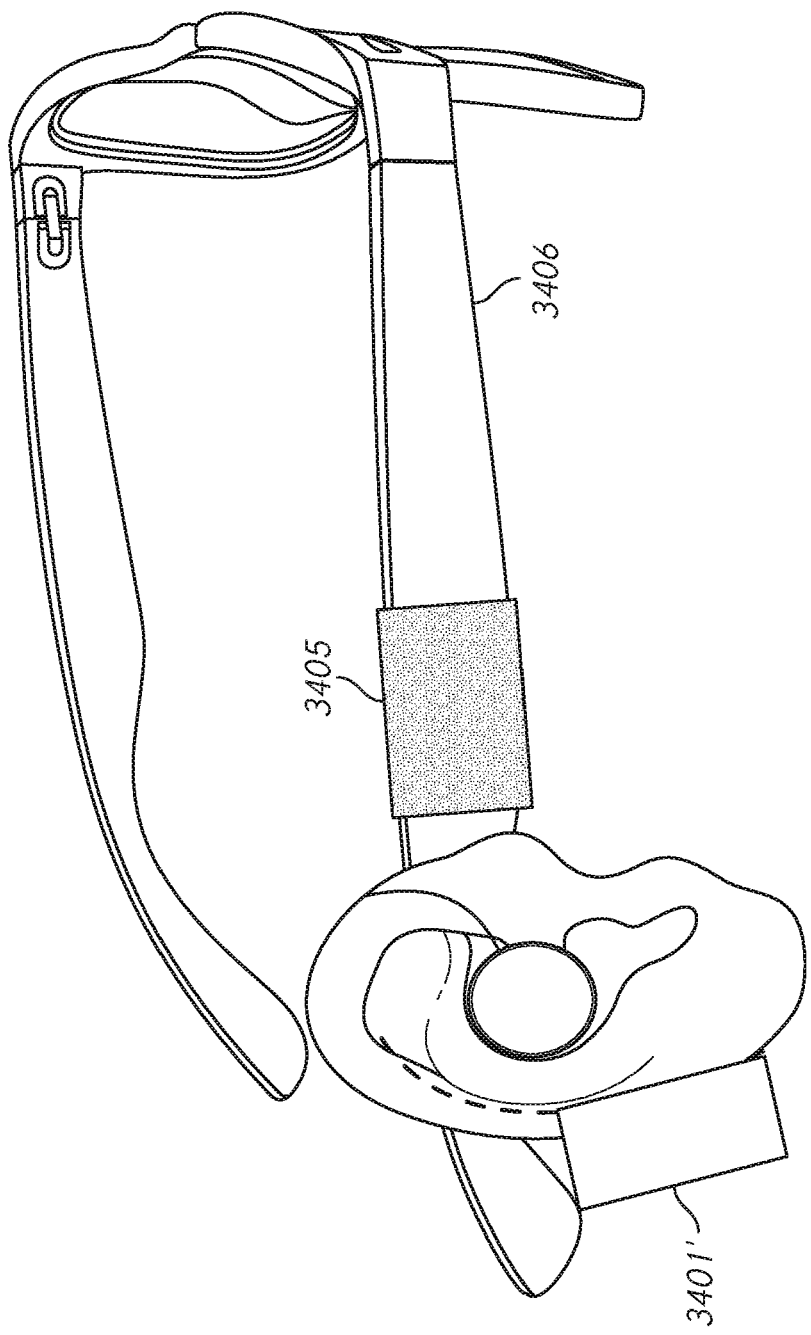
FIG. 35A is a schematic illustration of another wireless charging system including a hearing aid and at least one base unit in accordance with examples described herein.
Figure 35B:
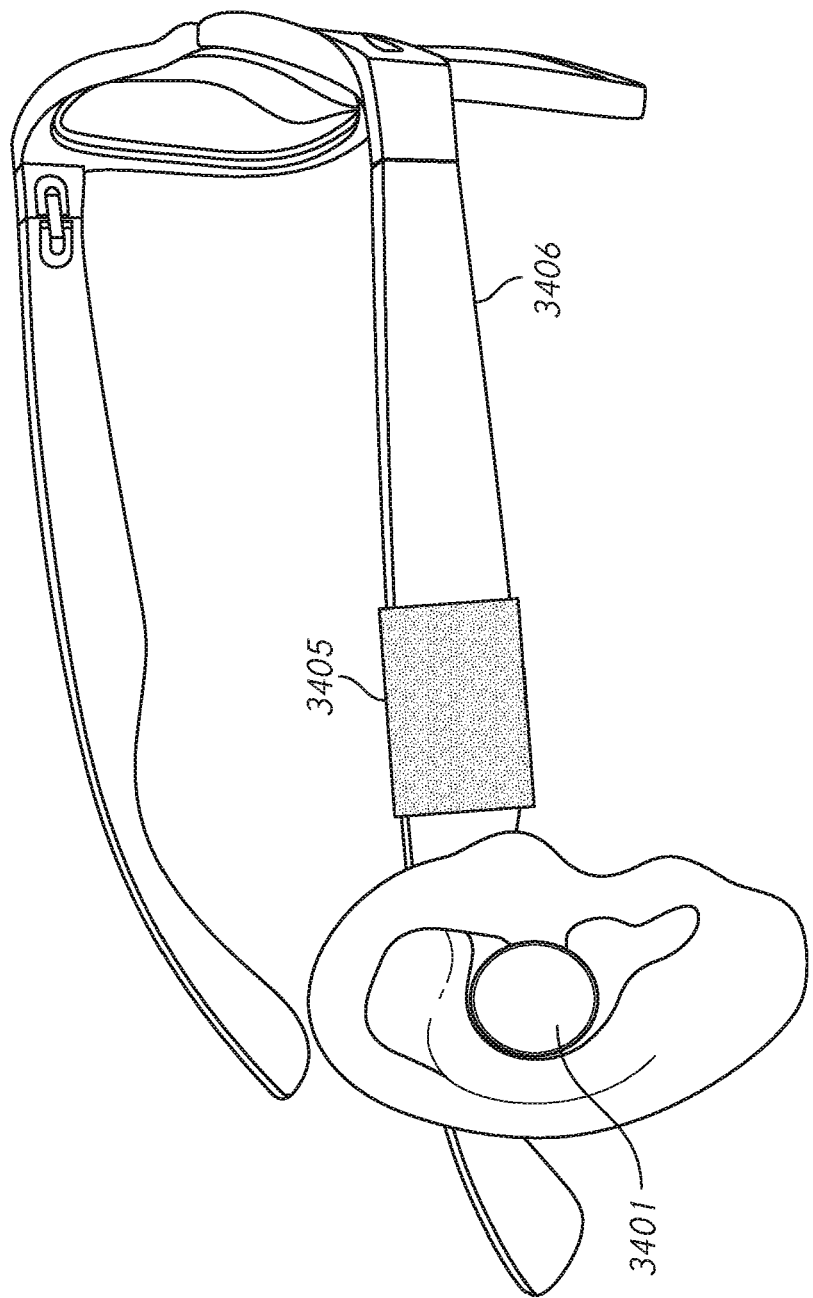
FIG. 35B is a schematic illustration of yet another wireless charging system including a hearing aid and at least one base unit in accordance with examples described herein.

In the further examples, as shown in FIGS. 35A and 35B, the intermediate base unit 3405 is attachable to a body-worn accessory such as eyewear. In the examples in FIGS. 35A and 35B, components of the intermediate base unit 3405 are arranged in a housing which is attachable, in some case removably attachable, to an eyewear frame, for example to the temple of the eyewear. The intermediate base unit 3405 in FIG. 35A is operatively associated with a behind-the-ear hearing aid 3401, while the intermediate base unit 3405 in FIG. 35B is operatively associated with an in-the-ear hearing aid 3401. In each of these examples, the intermediate base unit 3405 may be configured to couple power received from another base unit (such as base unit 3407) to the hearing aid. According to some examples herein, the intermediate base unit 3405 may thus improve system performance and/or relax requirements on base units and/or wearable electronic devices described herein.

By positioning the intermediate base unit between a base unit and a hearing aid or other medical assistance device (e.g., such that a distance between the body-worn repeater and the wearable electronic device is less than a distance between the base unit and the wearable electronic device), range of the overall system may be improved. For example, it may be disadvantageous, impractical, or impossible to provide power from the base unit over the entire distance between the base unit and the hearing aid or other medical assistance device. However, placement of an intermediate base unit may allow the wireless power to be relayed from the main base unit to the hearing aid or other medical assistance device.

Moreover, intermediate base unit may improve efficiency of wireless power transfer by reducing orientation dependencies between a base unit and a hearing aid or other medical assistance device. For example, base units described herein may include a magnetic core and may have increased efficiency with a receiving device when in a particular orientation, or range of orientations. By placing an intermediate base unit to mediate wireless power transfer, one orientation is provided between the base unit and the intermediate base unit, and another between the intermediate base unit and the a hearing aid or other medical assistance device. Accordingly, the orientation between the base unit and the intermediate base unit may be closer aligned than the orientation between the base unit and the hearing aid or other medical assistance device. The orientation between the intermediate base unit and the hearing aid or other medical assistance device may be closer aligned than the orientation between the base unit and the hearing aid or other medical assistance device.

In some examples, use of intermediate base units as described herein may reduce complexity that may otherwise be required when using a single base unit. For example, one intermediate base unit may provide wireless power to a plurality of wearable electronic devices (e.g., a plurality of medical assistance devices), and certain of the wearable electronic devices may have different carrier frequency and/or modulation (e.g. for data transfer) parameters. Examples of intermediate base units described herein may be tuned (e.g. using a controller or other processor(s) forming part of the intermediate base unit) to have a different carrier frequency and/or different frequency modulation based on the identities of wearable electronic devices with which the intermediate base unit is communicating. In this manner, a base unit may provide power to an intermediate base unit using one frequency and/or modulation scheme, and the intermediate base unit may utilize multiple frequencies and/or modulation schemes to communicate with different wearable electronic devices. In some examples, this may relieve the base unit of the need to itself provide different frequencies and/or modulation schemes.

In some examples, the transmitting and/or receiving coils provided in a base unit and a wearable electronic device, respectively, may have construction which includes a single magnetic core that has separate wire windings for different functions. In the case of the transmitting coil, different windings may be used to transmit signals at different frequencies and/or modulation schemes, for example for communicating with different electronic devices. In the case of the receiving coil on the wearable electronic device, the different windings can provide different functions, such as power signals reception and audio signals reception.

Figure 37:
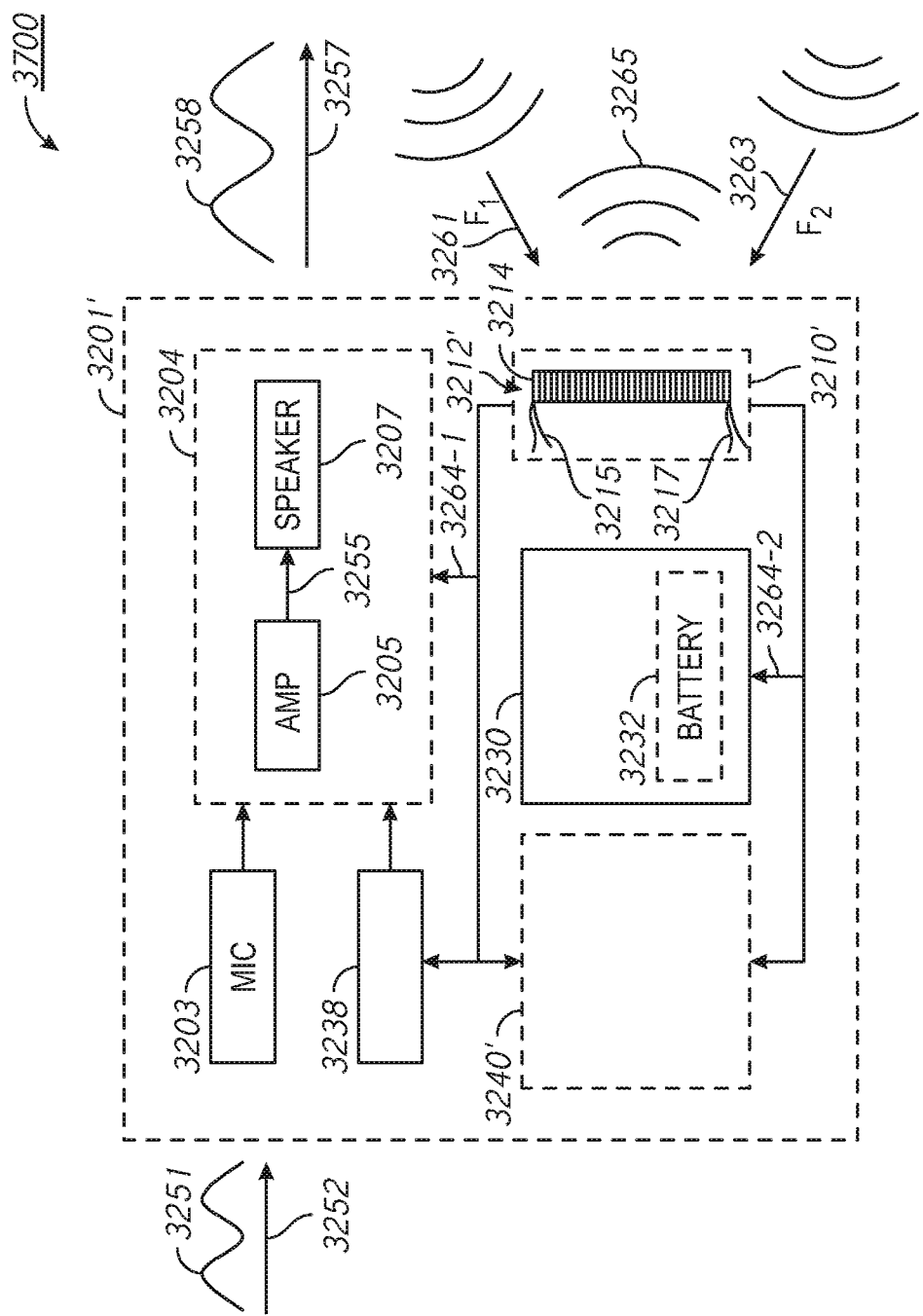
FIG. 37 is a schematic illustration of another hearing aid in accordance with examples described herein.

FIG. 37 is a schematic illustration of a hearing aid system 3700 arranged in accordance with some examples herein. The hearing aid system 3700 includes a hearing aid device 3201' (or simply hearing aid 3201'), which may be configured to be wirelessly powered or wirelessly charged by a wireless power transfer unit as described herein (e.g., base unit or another device comprising a transmitter, such as transmitter 2602, not shown in this Figure). The hearing aid device 3201' may include one or more of the components of hearing aid 3201. For example, the hearing aid device 3201' includes a microphone 3203, an amplifier 3205, and a speaker 3207. The microphone 3201 is configured to detect acoustic waves 3251. The microphone 3201 is configured to convert the acoustic input 3252 (e.g., detected acoustic waves) into electrical signals 3253, which are transmitted to the amplifier 3205. The amplifier 3205 is operatively coupled to the microphone 3201 to receive the signals 3253. The amplifier 3205 amplifies the signals representative of the detected acoustic input (i.e., signals 3253) and transmits the amplified signals 3255 to the speaker 3207, which then generates acoustic output 3257 (e.g., audible sounds represented by acoustic waves 3258) that that can be provided to the user. The hearing aid 3201' may include analog-to-digital signal converter and a digital-to-analog signal converter (not shown), which may be part of the overall audio processing circuitry 3204 of the hearing aid device 3201.

In accordance with the examples herein, the hearing aid 3201' may be configured to receive power wirelessly. The hearing aid 3201' may include a receiver 3210' configured to receive wireless power from a transmitter, for example the transmitter of a base unit (not shown). The receiver 3210' may be implemented in accordance with any of the examples herein. For example, the receiver 3210' may include a receiving coil which is configured to receive radio wave signals in given frequency ranges. The receiving coil may be a specially adapted telecoil which is configured to provide both the functions of audio signals reception and wireless power reception.

As shown in FIG. 37, the hearing aid 3201' may include a telecoil 3212' which is configured to receive both audio and power signals. The telecoil 3212' may include a core 3214 (e.g., a ferrite or other magnetic material core) and wire windings. A first set of wire windings (e.g., wire winding 3215) wound around the core 3214 may be configured to tune the telecoil 3212' for audio pick up (e.g., for detecting signals 3261 in the first frequency range F1 and generating corresponding signals 3264-1), while a second set of wire windings (e.g., wire winding 3217) would around the core 3214 may be may be configured to tune the telecoil 3212' for power reception (e.g., for detecting signals 3263 in the second frequency range F2 and generating corresponding signals 3264-2). In some examples, the respective first and second windings may be directly wired to dedicated circuitry for the respective first and second functions. That is, in the example in FIG. 37, the windings 3215 for the audio function may be wired directly to the audio processing circuitry 3204, while the windings 3217 for the power function may be wired directly to the power supply circuitry 3230, which may or may not include a power storage device (e.g., battery 3242). While two sets of windings are shown in the illustrated embodiment, it will be understood that in other embodiments, the receiving coil may include a greater number of separate windings, one or more of which may be associated with a different function. For example, the receiving coil may include three sets of windings, each of which may be associated with one of three different functions (e.g., audio, power, or data transfer). In other examples, the receiving coil may have a plurality of windings (e.g., three, four, five or more sets of windings) and two or more of the sets of windings may be associated with the same function.

In some examples, the receiver 3210' of the hearing aid device 3201' may include a separate receiving coil in addition to or instead of the telecoil 3212', which is configured to receive wireless power signals (e.g., signals 3263 in the second frequency range). In some examples, the receiver 3210' may also be configured to receive and/or transmit data 3265 (e.g., configuration and/or calibration data for the hearing aid 3201'). The hearing aid 3201' may include a storage device 3238 (e.g., non-volatile memory) operatively connected to the receiver, such as via one or more controller 3240'. The storage device 3238 may store data received or data generated by the hearing aid 3201' as well as programming (e.g., computer executable instructions, which may be used by the controller 3240 to control functions of the hearing aid device 3201'). In some examples, the separate windings may be wound in an interleaved manner along the length of the core. In some examples, the separate windings may be wound in an overlaid manner, e.g., with one set wound closest to the surface of the core, a second set over the first set, and so on. In yet further examples, the separate sets of windings may be wound in an adjacent matter, e.g., with each set wound on the core but spanning only a portion of the length of the core. Other arrangements may be used in other examples, Systems are provided for safely charging an implanted electronic device. The electronic device may be located beneath the subcutaneous tissue, and may include a receiver coil. A transmitter including a transmitter coil may be located external to the subcutaneous tissue. The coil of the transmitter coil and the receiver coil may be weakly wirelessly coupled by way of resonance. The resonance can be that of a weak resonance. The weak resonance can have a Q factor of less than 100, The weak resonance can have a Q factor of less than 75. The weak resonance can have a Q factor of less than 50. The system can utilize a guided flux. The system can utilize a partially guided flux. The receiver can be maintained within a 2 degree C. range of its normal in situ resting temperature. The system can maintain the receiver to be within a 2 degree C. range of its normal in situ resting temperature. The receiver coil, transmitter coil, or both can be implemented using a magnetic core. The receiver coil, transmitter coil, or both can be include a wire winding around the core and the core can be implemented using a ferrite member. The wire winding of the transmitter coil, receiver coil, or both can be implemented using copper wire. The wire winding of the transmitter coil, receiver coil, or both can be implemented using Litz wire. The implanted electrical device can include a titanium outer skin. The transmitter can transmit a frequency within the range of 75 kHz to 150 kHz to the receiver of the electronic device. The transmitter can transmit a frequency within the range of 100 kHz to 130 kHz to the receiver of the electronic device. The transmitter can transmit a frequency within the range of 125 kHz to the receiver of the electronic device. The transmitter can be housed in a cloth patch which can be attached to an article of clothing. The transmitter can be attached to hat. The transmitter can be attached to a shirt. The transmitter can be attached to pants. The transmitter be attached to a coat. The transmitter can be attached to a belt. The transmitter can be attached to a band aid. The transmitter can be attached to an adhesive patch. The transmitter can be recharged. The transmitter can be detached and reattached, FIG. 36 is a schematic illustration of a wirelessly powered implantable: device arranged in accordance with examples described herein. The system shown in FIG. 36 includes a defibrillator having an implanted controller 3602 beneath a user's skin and debribrillator lead 3612 positioned in the user's heart. The implanted controller 3602 may be provided with a receiver in accordance with examples described herein, including receiver coil 3604, which may have a rod-shaped magnetic core (e.g. ferrite) wound with a wire winding (e.g. Litz wire). A base unit 3610 may be provided which may, for example, be positioned in a shirt pocket 3608 of the user, or otherwise attached to and/or worn by the user. The base unit 3610 may be implemented using any examples of base units described herein, and may include a transmitter including transmitter coil 3606. During operation, the base unit 3610 may provide power to the implanted controller 3602 by coupling power from the transmitter coil 3606 to the receiver coil 3604.

Generally, any base unit and/or transmitter and/or transmitter coil described herein may be utilized to provide wireless power to an implanted electronic device. Generally, any receiver and/or receiver coil described herein may be incorporated in and/or attached to an implanted electronic device for receipt of wireless power which may, for example, recharge a battery of the implanted electronic device.

An example implantable device may have a battery implanted subcutaneously which may have a 100 mAH current capacity. It may have a nominal charged capacity of 370 mW-hr. It may take 1-2 hours to recharge and have a 10 year expected lifetime. Other implantable device parameters may be used in other examples. The implantable device may include a receiver coil, examples of which have been described herein. The receiver coil may have a magnetic core and a wire winding wound around the magnetic core. In some examples, the receiver coil may have dimensions of 7 mm×2 mm×2 mm, however, other dimensions may be used in other examples. The receiver coil may generally be smaller than the transmitter coil. The implanted device may include a 100 mAH battery with maximum thickness of 4 mm with 10+ year functional lifespan. Other specifics may be used in other examples. Example implantable electronic device may utilize solid state thin film Lithium batteries, where loss of capacity may remain less than 50% after 1000 cycles.

Wireless power charging systems described herein may be used to charge a subcutaneously implanted battery safely and wirelessly. A recharging unit (e.g. a base unit described herein) may be positioned in a location external to the user but proximate to the implanted device. In some examples, the transmitter coil of a base unit may be provided 50-100 mm from an expected location of a receiver coil in an implanted medical device. For example, a base unit may be mounted on an eyeglass frame for use in charging a hearing aid or other in-head device. The base unit (e.g. transmitter) may include an internal battery that may provide power for wireless power delivery through the transmit coil which may charge the battery in an implantable electronic device. The power delivery may occur through skin or other tissue. The transmitter internal battery may be recharged wirelessly when not attached to eyewear, or when placed in proximity to another base unit or charging device (e.g. body-worn repeater).

In some examples, a base unit may be incorporated in a patch or other accessory to be worn by an implanted device user or attached to or incorporate in clothing of the implanted device user. In some examples, a coil length of a transmitter coil may be 50 mm, however other lengths may also be used. In some examples, the base unit may provide 1 watt of power and may limit temperature rise to less than 2° C.

In some examples, a base unit may be positioned under and/or inside a pillow. The transmitter in the base unit may recharge a battery in an implantable device (e.g. in a user's head) as the user sleeps overnight. The transmitter internal battery may be plugged into USB or AC power supply to be recharged during the day.

In some examples, a transmitter may be built into small wearable patch. The transmitter may recharges an implanted battery with patch worn in clothing—such as attached using Velcro® to a hat. The transmitter internal battery may be plugged into USB or AC power supply to be recharged.

An example base unit may recharge a subcutaneously implanted battery contained in a hermetically sealed titanium housing with less than 20% loss of efficiency in some examples, less than 10% in some examples through a 100 micron titanium sheet. Generally, expected wireless power transfer efficiency between a base unit and an implantable electronic device may be 10-20% in some examples, although other efficiencies may be attained in other examples. A power transfer rate of 100-200 mW may be attained in some examples. An expected recharging time of 1-2 hours may be attained in some examples.

Figure 38:
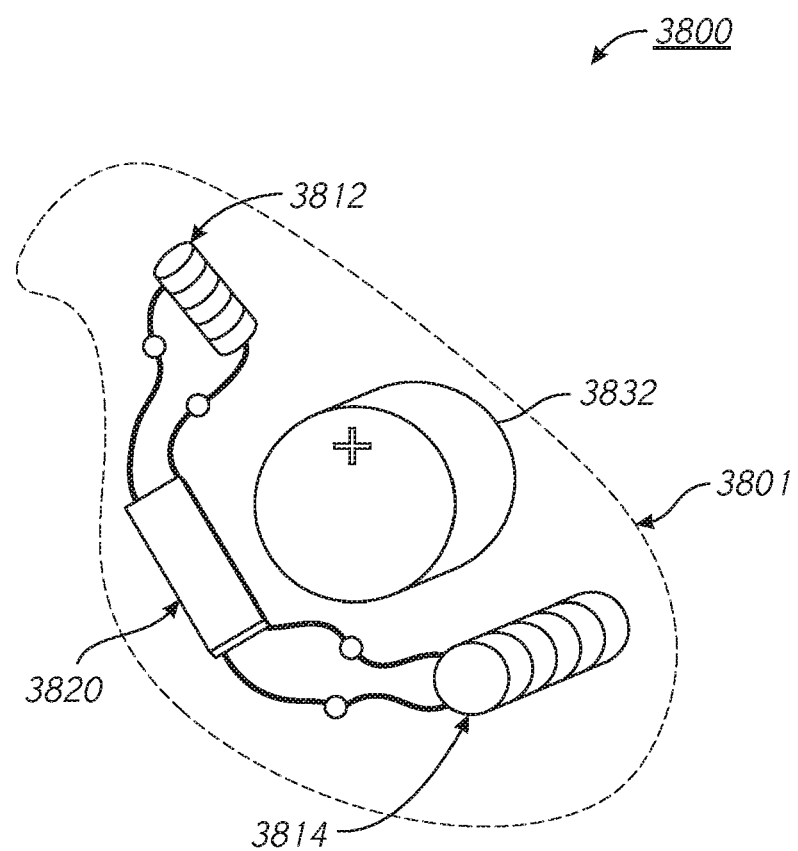
FIG. 38 is a schematic illustration of some of the components of yet another hearing aid in accordance with examples described herein.

FIG. 38 is a schematic illustration of a hearing aid system 3800 illustrating some of the components of yet another hearing aid 3801 in accordance with examples of the present disclosure. The hearing aid 3801 may include one or more of the components of any of the hearing aids described herein, for examples components of hearing aid 3201 or 3201'. Some of the components of the hearing aid have been omitted in the illustration so as not to obfuscate the features described herein.

In the embodiment shown in FIG. 38, the hearing aid 3801 includes a communication coil 3814, a power management circuit 3820, a rechargeable battery 3832 and an optional telecoil 3812. In some examples, a single coil may be used (e.g., a communication coil) which is capable of at least receiving audio frequency signals and transmitting audio frequency signals for performing audio functions of the hearing aid, and receiving a wireless power frequency signals for charging the hearing aid.

In the embodiment in FIG. 38, the telecoil 3812, similar to telecoil 3212, may be configured to receive both audio and power signals. The received audio signals are coupled to audio processing circuitry (not shown in this figure) for generating audio outputs. The communication coil 3814 may be configured as a multi-function coil, for example with the capability of receiving both audio and power signals. In some examples, the communication coil 3814 may provide additional functionality such as data (e.g., image, audio, etc.) reception and transmission. The communication coil may be configured to provide the function of wireless communication to another computing system (e.g., a personal computer, a base unit) external to the hearing aid, which computing system may be used to program the hearing aid.

In some examples, the telecoil may be omitted and the audio, power, and other communication functions may be provided by the communication coil.

The communication coil 3814 and/or telecoil 3812 are connected to the power managed circuit 3820. The power management circuit 3820 and battery 3832 may be part of the power supply circuitry of the hearing aid. The power management circuit may isolate the wireless power signals received by the receiving coil (e.g., the communication coil 3814 and/or the telecoil 3812) and may couple those signals to the battery for recharging the battery. In some examples, the power management circuit 3820 may include a switch circuit which configured to isolate the receiving coil from the audio processing circuitry. The switch circuit may include a resistor-capacitor circuit (RC circuit) or a filter (e.g., a high-pass filter, a band-pass filter or the like), which may decouple signals received by the coil (e.g., telecoil or communication coil) above a certain frequency (e.g., above the upper bound of the audio frequency F1) from the audio processing circuitry. In this manner, interference with the audio function provided by either coil may be avoided. Any of the coils (e.g., telecoil 3812, communication coil 3814) be implemented using a core of a magnetic material (e.g. ferrite) with one or more wire windings (e.g. stranded wire, Litz wire, copper wire, or combinations thereof) wound around the core in accordance with any of the examples herein.

The above detailed description of examples is not intended to be exhaustive or to limit the method and system for wireless power transfer to the precise form disclosed above. While specific embodiments of, and examples for, the method and systems for wireless power transfer are described above for illustrative purposes, various equivalent modifications are possible within the scope of the system, as those skilled in the art will recognize. For example, while processes or blocks are presented in a given order, alternative embodiments may perform routines having operations, or employ systems having blocks, in a different order, and some processes or blocks may be deleted, moved, added, subdivided, combined, and/or modified. While processes or blocks are at times shown as being performed in series, these processes or blocks may instead be performed in parallel, or may be performed at different times. It will be further appreciated that one or more components of base units, electronic devices, or systems in accordance with specific examples may be used in combination with any of the components of base units, electronic devices, or systems of any of the examples described herein.

What is claimed is:

1. A hearing aid system comprising:
   a hearing aid comprising:
      a microphone configured to detect ambient sounds;
      audio processing circuitry including an amplifier operatively coupled to the microphone to receive signals corresponding to the ambient sounds and amplify the signals, and a speaker configured to receive the amplified signals and generate an amplified sound corresponding to the amplified signal;
      power supply circuitry configured to power the microphone, the amplifier, and the speaker;
      a receiver comprising at least one coil operatively coupled to the audio processing circuitry and the power supply circuitry, wherein the at least one coil comprises a magnetic metal core with a wire winding, and wherein the at least one coil is configured to receive wireless signals; and
      a switching circuit configured to generate first signals responsive to wireless signals in a first frequency range and couple the first signals to the audio processing circuitry and further configured to generate second signals responsive to wireless signals in a second frequency range and couple the second signals to the power supply circuitry; and
   a mobile charging unit capable of wirelessly charging the hearing aid, wherein the mobile charging unit provides an omnidirectional or near omnidirectional zone of wireless charging near and/or around the mobile charging unit, and wherein the mobile charging unit is capable of wirelessly charging the hearing aid when the hearing aid is distance-separated from the mobile charging unit.

2. The system of claim 1, wherein the at least one coil comprises a telecoil, a communication coil, or a combination of the two.

3. The system of claim 1, wherein the second frequency range includes signals having higher frequencies than signals in the first frequency range.

4. The system of claim 3, wherein the first frequency range includes signals having a frequency of 10 KHz or below and wherein the second frequency range includes signals having a frequency greater than 10 KHz.

5. The system of claim 4, wherein the second frequency range includes signals having a frequency above 100 KHz.

6. The system of claim 1, wherein the switching circuit includes a filter configured to isolate the first signals from the second signals.

7. The system of claim 6, wherein the filter comprises a low-pass filter configured to direct the first signals to the audio processing circuitry and a high-pass filter configured to direct the second signals to the power supply circuitry.

8. The system of claim 1, wherein the power supply circuitry comprises a battery, and wherein power supply circuitry is configured to recharge the battery responsive to the second signals.

9. The system of claim 1, wherein the at least one coil is further configured to receive data, transmit data, or both, and wherein the hearing aid further comprises memory for storing the data.

10. The system of claim 1, wherein the magnetic metal core is a ferrite core.

11. A hearing aid system comprising:
    a hearing aid comprising:
       a microphone configured to detect ambient sounds;
       audio processing circuitry including an amplifier operatively coupled to the microphone to receive signals corresponding to the ambient sounds and amplify the signals, and a speaker configured to receive the amplified signals and generate an amplified sound corresponding to the amplified signal;
       power supply circuitry configured to power the microphone, the amplifier, and the speaker;
       a receiver comprising at least one coil operatively coupled to the audio processing circuitry and the power supply circuitry, wherein the at least one coil comprises a magnetic metal core with a wire winding, and wherein the at least one coil is configured to receive wireless signals; and
       a switching circuit configured to generate first signals responsive to wireless signals in a first frequency range and couple the first signals to the audio processing circuitry and further configured to generate second signals responsive to wireless signals in a second frequency range and couple the second signals to the power supply circuitry; and
    a base unit that comprises a transmitter configured to transmit radio signals in the second frequency range, and wherein:
       the transmitter of the base unit comprises a transmitter coil having a transmitter impedance;
       the at least one coil of the receiver has a receiver impedance; and
       the transmitter impedance and the receiver impedance are optimally matched for:
          a particular distance separation between the transmitter and the receiver, and nonoptimized for all other separation distances; or
          a particular relative orientation between the transmitter and the receiver, and nonoptimized for all other relative orientations.

12. The system of claim 11, wherein transmitter impedance and the receiver impedance are optimally matched for at least two particular distance separations between the transmitter and the receiver, and non-optimized for all other separation distances.

13. The system of claim 12, wherein the transmitter coil comprises a magnetic metal core.

14. The system of claim 13, wherein the core of the transmitter has a volume that is 10 times or larger than a volume of the core of the telecoil.

15. The system of claim 13, wherein a wire winding of the transmitter coil has a winding length that is 10 times or larger than a winding length of the wire winding of the telecoil.

16. The system of claim 11, wherein the system is a weak resonant system having a Q value below 100.

17. The system of claim 11, wherein the transmitter is configured to transmit wireless power at a frequency in a range of 100 kHz to 200 kHz.

18. The system of claim 11, wherein the transmitter is configured to transmit wireless power at a frequency within a range of 125 kHz+/−5 kHz.

19. The system of claim 11, wherein the transmitter is configured to transmit wireless power at a frequency within a range of 6.75 MHz+/−5 MHz.

20. The system of claim 11, wherein the base unit is further configured to transmit data to the hearing aid.

21. The system of claim 11, wherein the base unit is a first base unit devoid of a battery, and wherein the system further comprises a second base unit including a battery, the second base unit configured to couple power wirelessly to the first base unit using a different frequency range or modulation scheme than the frequency range or modulation scheme used when coupling signals between the first base unit and the hearing aid.

* * * * *